(12) United States Patent
Matsui et al.

(10) Patent No.: US 7,822,196 B2
(45) Date of Patent: Oct. 26, 2010

(54) BLOCK CIPHER APPARATUS USING AUXILIARY TRANSFORMATION

(75) Inventors: Mitsuru Matsui, Tokyo (JP); Toshio Tokita, Tokyo (JP); Junko Nakajima, Tokyo (JP); Masayuki Kanda, Tokyo (JP); Shiho Moriai, Tokyo (JP); Kazumaro Aoki, Tokyo (JP)

(73) Assignees: Mitsubishi Denki Kabushiki Kaisha, Tokyo (JP); Nippon Telegraph and Telephone Corporation, Tokyo (JP)

( * ) Notice: Subject to any disclaimer, the term of this patent is extended or adjusted under 35 U.S.C. 154(b) by 1309 days.

(21) Appl. No.: 11/260,129

(22) Filed: Oct. 28, 2005

(65) Prior Publication Data

US 2006/0050874 A1    Mar. 9, 2006

Related U.S. Application Data

(62) Division of application No. 09/959,853, filed as application No. PCT/JP01/01796 on Mar. 8, 2001.

(30) Foreign Application Priority Data

Mar. 9, 2000    (JP) .............................. 2000-064614

(51) Int. Cl.
*H04L 9/06* (2006.01)
*H04L 9/18* (2006.01)

(52) U.S. Cl. .......................... 380/28; 380/29
(58) Field of Classification Search .................. 380/28, 380/29, 44, 45, 46
See application file for complete search history.

(56) References Cited

U.S. PATENT DOCUMENTS

| 5,351,299 | A | 9/1994 | Matsuzaki et al. |
| 5,594,797 | A | 1/1997 | Alanara et al. |
| 5,623,549 | A | 4/1997 | Ritter |
| 5,673,319 | A | 9/1997 | Bellare et al. |
| 6,028,939 | A | 2/2000 | Yin |
| 6,058,476 | A | 5/2000 | Matsuzaki et al. |
| 6,201,869 | B1 | 3/2001 | Matsui et al. |
| 6,246,768 | B1 | 6/2001 | Kim et al. |
| 6,269,163 | B1 | 7/2001 | Rivest et al. |
| 6,459,792 | B2 | 10/2002 | Ohmori et al. |
| 6,819,764 | B1 | 11/2004 | Shimizu et al. |
| 6,891,950 | B1 | 5/2005 | Oomori et al. |
| 2002/0015493 | A1 | 2/2002 | Rose |

FOREIGN PATENT DOCUMENTS

| EP | 0896451 | 2/1999 |
| JP | 2641285 | 2/1990 |
| JP | 09-090870 A | 4/1997 |
| JP | 9-269727 | 10/1997 |

OTHER PUBLICATIONS

Schneier, Applied Cryptography Second Edition, pp. 268-271 (1996).
Kanda et al., "E2- A New 128-Bit Block Cipher", IEICE Trans. Fundamentals, vol. E83-A, No. 1, Jan. 2000.
Daemen et al., "AES Proposal: Rijndael" AES Proposal pp. 1-45, (1999) XP001060386.

(Continued)

*Primary Examiner*—Kimyen Vu
*Assistant Examiner*—Edward Zee
(74) *Attorney, Agent, or Firm*—Birch, Stewart, Kolasch and Birch, LLP

(57) ABSTRACT

It is desired to share one circuit by an encryption unit 200 and a decryption unit 500. A normal data transformation unit (FL) 251 and an inverse data transformation unit ($FL^{-1}$) 273 are located at point symmetry on a non-linear data transformation unit 220, and a normal data transformation unit (FL) 253 and an inverse data transformation unit ($FL^{-1}$) 271 are located at point symmetry on the non-linear data transformation unit 220. Therefore, the encryption unit 200 and the decryption unit 500 can be configured using the same circuits.

15 Claims, 47 Drawing Sheets

OTHER PUBLICATIONS

Schneier B, "Applied Cryptography, Description of DES" p. 270-277, (1996).

Schneier et al., Description of a New Variable-length Key, 64-Bit Block Dipher (Blowfish), Lecture Notes in Computer Science, vol. 809, pp. 191-204, 1993.

"On the Role of the Position of Random Functions in Provable Security of Generalized Feistel Ciphers" Fumihiko Sano, et al., SCIS 97, The 1997 Symposium on Cryptography and Information Security Fukuoka, Japan, Jan. 29-Feb. 1, 1997.

Applied Cryptography (Second Edition) John Wiley & Sons, Inc., pp. 336-339, 1995.

Kazumaro Aoki, et al, "128 Bit Block Angou Camellia" Denshi Joho Tsuushin Gakkai Gijutsu Kenkyu Hokoku (ISEC2000-6), vol. 100, No. 76, May 18, 2000, pp. 47-75.

Kazumaro Aoki, et al, "128 Bit Clock Angou Camellia no Jissou Hyouka", Denshi Joho Tsushin Gakkai Gitjutsu Kenkyu Hokoku (ISEC2000-73), vol. 100, No. 324, Sep. 22, 2000 pp. 131-138.

Mitsuru Matsui, "New BLock Encryption Algorithm MISTY," Eli Biham Ed., Fast Software Encryption, 4th International Workshop, FSE'97, Haifa, Israel, Jan. 1997 Proceedings, pp. 54-68.

"NEC, Mitsubishi Electric Corporation Has Developed Particular cipher Algorithm," Nikkei Electronics, Nikkei BP, No. 648, Nov. 6, 1995, pp. 20-21.

"What is Common Key Block Cipher? Would you be kind to tell me about MISTY Ciphers?" Electronics, Ohm, May 1996, p. 67.

S. Moriai, "Addition of the Camellia Encryption Algorithm to TLS," Oct. 2000.

"Camellia Submission of Call for cryptographic Primitives to NESSIE," Sep. 2000.

J. Nakajima,et al., "A Description of the Camellia encryption Algorithm," Aug. 2000.

K. Aoki, et al, "Camellia—A 128 Bit Block Cipher Suitable for Multiple Platforms," 7th Annual Workshop on Selected Areas in cryptography, Aug. 2000.

Cryptographic Techniques Overview—pp. 2, 2000.

K. Aoki, et al. Specification of Camellia—a 128-Bit Block Cipher Jul. 12, 2000 pp. 1-31.

K. Aoki, et al. "Camellia: A 128-Bit Block Cipher Suitable for Multiple Platforms" Jul. 12, 2000 Appendix pp. 1-36.

Specification of E2—a 128-bit Block Cipher, Nippon Telegraph and Telephone Corporation, publ. Jun. 14, 1998, pp. 1-14.

Gendai Ango Riron (Modern Cipher Theory), The Institute of Electronics, Information and Communication Engineers, publ. Nov. 15, 1997, Fig. 3.3. pp. 46.

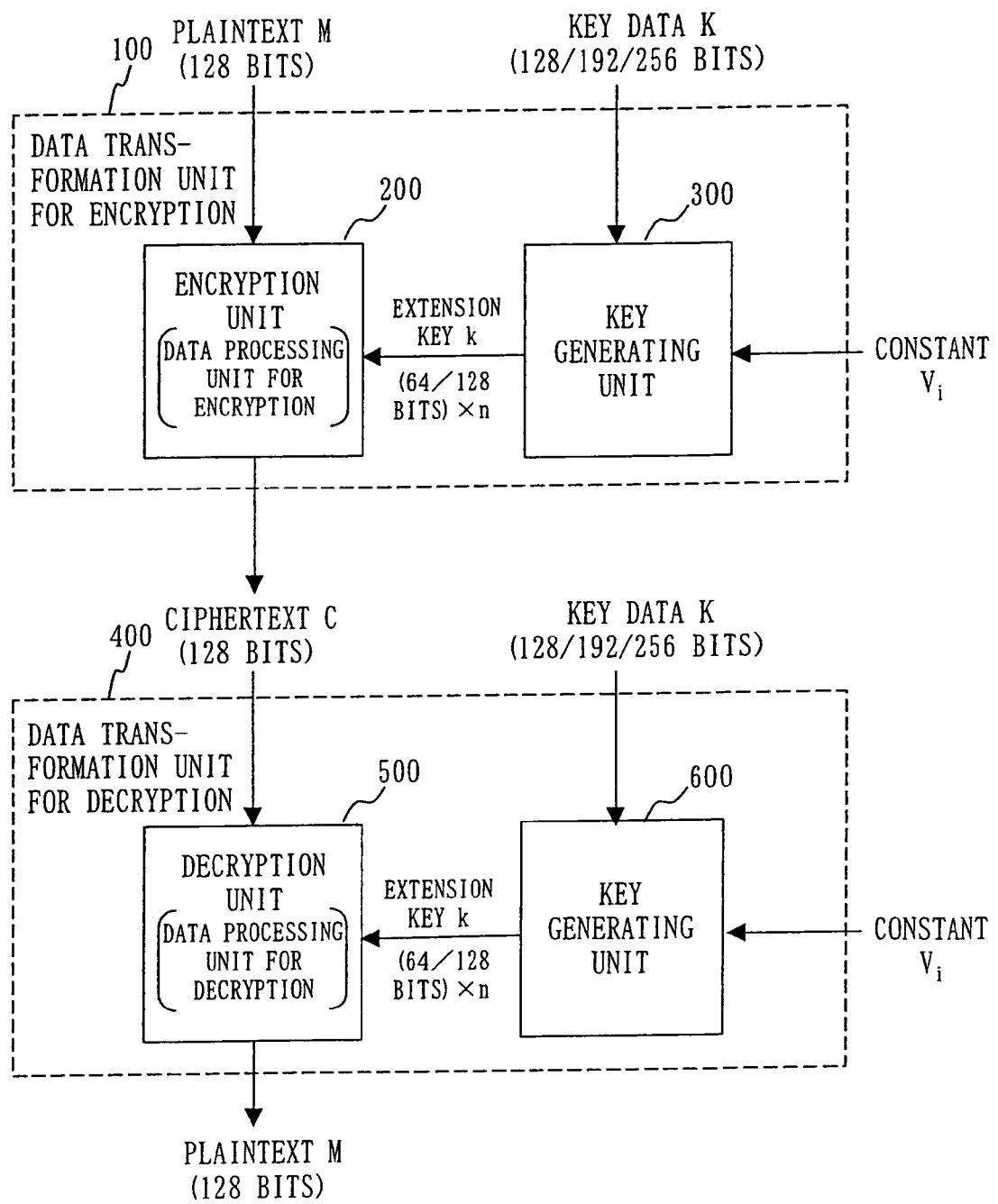

Fig. 2

(b) : 1 BYTE (8 BITS)
(w) : 4 BYTES (32 BITS)
(l) : 8 BYTES (64 BITS)
(q) : 16 BYTES (128 BITS)

M : PLAINTEXT DATA
C : CIPHERTEXT DATA
K : KEY
T : TRANSFORMATION TABLE $\left.\begin{array}{l} kw_1, kw_2 \\ k_1, k_2, \ldots, k_{24} \\ kl_1, kl_2, \ldots, kl_6 \end{array}\right\}$ EXTENSION KEYS F   : NON-LINEAR FUNCTION UNIT
FL  : NORMAL DATA TRANSFORMATION UNIT
$FL^{-1}$: INVERSE DATA TRANSFORMATION UNIT $L_0, L_1, \ldots, L_{24}$    LEFT DATA
$R_0, R_1, \ldots, R_{24}$    RIGHT DATA
$V_1, V_2, \ldots, V_6$      CONSTANT EX. 1   M(q) SHOWS PLAINTEXT DATA OF 16 BYTES (128 BITS)
EX. 2   $kw_1$(q) SHOWS EXTENSION KEY OF 16 BYTES (128 BITS)
EX. 3   $k_1$ (l) SHOWS EXTENSION KEY OF 8 BYTES (64 BITS)
EX. 4   $L_0$ (l) SHOWS LEFT DATA OF 8 BYTES (64 BITS)

Fig. 10

| Fig 3 | $FL251 \Leftrightarrow FL^{-1}\ 273$<br>$FL253 \Leftrightarrow FL^{-1}\ 271$ |
|---|---|
| Fig 4 | $FL251 \Leftrightarrow FL^{-1}\ 275$<br>$FL253 \Leftrightarrow FL^{-1}\ 273$<br>$FL255 \Leftrightarrow FL^{-1}\ 271$ |

Fig. 19

| CLOCK | 128-BIT KEY | | | | 192/256-BIT KEY | | | |
|---|---|---|---|---|---|---|---|---|
| | SHIFT REGISTER A CONTROL TABLE | | SHIFT REGISTER B CONTROL TABLE | | SHIFT REGISTER A CONTROL TABLE | SHIFT REGISTER B CONTROL TABLE | SHIFT REGISTER C CONTROL TABLE | SHIFT REGISTER D CONTROL TABLE |
| | TOTAL NO. OF SHIFTING BITS | SHIFTING BITS | TOTAL NO. OF SHIFTING BITS | SHIFTING BITS | | | | |
| 1 | $z_0 = 0$ | | $z_0 = 0$ | +15 | | OMITTED | | |
| 2 | $z_1 = 15$ | +15 | $z_1 = 15$ | +15 | | | | |
| 3 | | +15 | $z_2 = 30$ | +15 | | | | |
| 4 | $z_2 = 45$ | +15 | $z_3 = 45$ | +15 | | | | |
| 5 | $z_3 = 60$ | +17 | $z_4 = 60$ | +17 | | | | |
| 6 | $z_4 = 77$ | +17 | | +17 | | | | |
| 7 | $z_5 = 94$ | +17 | $z_5 = 94$ | +17 | | | | |
| 8 | $z_6 = 111$ | +17 | $z_6 = 111$ | +17 | | | | |
| 9 | $z_7 = 128$ | | $z_7 = 128$ | | | | | |

Fig. 21

| | | | |
|---|---|---|---|
| input whitening | kw1 | key [0] | key [1] |
| 1ST STAGE | k1 | key [2] | |
| 2ND STAGE | k2 | key [3] | |
| 3RD STAGE | k3 | key [4] | |
| 4TH STAGE | k4 | key [5] | |
| 5TH STAGE | k5 | key [6] | |
| 6TH STAGE | k6 | key [7] | |
| FL, FL$^{-1}$ | kl1 , kl2 | key [10] | key [11] |
| 7TH STAGE | k7 | key [12] | |
| 8TH STAGE | k8 | key [13] | |
| 9TH STAGE | k9 | key [14] | |
| 10TH STAGE | k10 | key [17] | |
| 11TH STAGE | k11 | key [18] | |
| 12TH STAGE | k12 | key [19] | |
| FL, FL$^{-1}$ | kl3 , kl4 | key [20] | key [21] |
| 13TH STAGE | k13 | key [24] | |
| 14TH STAGE | k14 | key [25] | |
| 15TH STAGE | k15 | key [26] | |
| 16TH STAGE | k16 | key [27] | |
| 17TH STAGE | k17 | key [28] | |
| 18TH STAGE | k18 | key [29] | |
| output whitening | kw2 | key [30] | key [31] |

Fig. 23

| | | | |
|---|---|---|---|
| input whitening | kw1 | key [0] | key [1] |
| 1ST STAGE | k1 | key [6] | |
| 2ND STAGE | k2 | key [7] | |
| 3RD STAGE | k3 | key [10] | |
| 4TH STAGE | k4 | key [11] | |
| 5TH STAGE | k5 | key [12] | |
| 6TH STAGE | k6 | key [13] | |
| FL, FL$^{-1}$ | kl1, kl2 | key [18] | key [19] |
| 7TH STAGE | k7 | key [22] | |
| 8TH STAGE | k8 | key [23] | |
| 9TH STAGE | k9 | key [24] | |
| 10TH STAGE | k10 | key [25] | |
| 11TH STAGE | k11 | key [28] | |
| 12TH STAGE | k12 | key [29] | |
| FL, FL$^{-1}$ | kl3, kl4 | key [32] | key [33] |
| 13TH STAGE | k13 | key [34] | |
| 14TH STAGE | k14 | key [35] | |
| 15TH STAGE | k15 | key [38] | |
| 16TH STAGE | k16 | key [39] | |
| 17TH STAGE | k17 | key [40] | |
| 18TH STAGE | k18 | key [41] | |
| FL, FL$^{-1}$ | kl5, kl6 | key [44] | key [45] |
| 19TH STAGE | k19 | key [50] | |
| 20TH STAGE | k20 | key [51] | |
| 21TH STAGE | k21 | key [52] | |
| 22TH STAGE | k22 | key [53] | |
| 23TH STAGE | k23 | key [56] | |
| 24TH STAGE | k24 | key [57] | |
| output whitening | kw2 | key [62] | key [63] |

Fig. 39
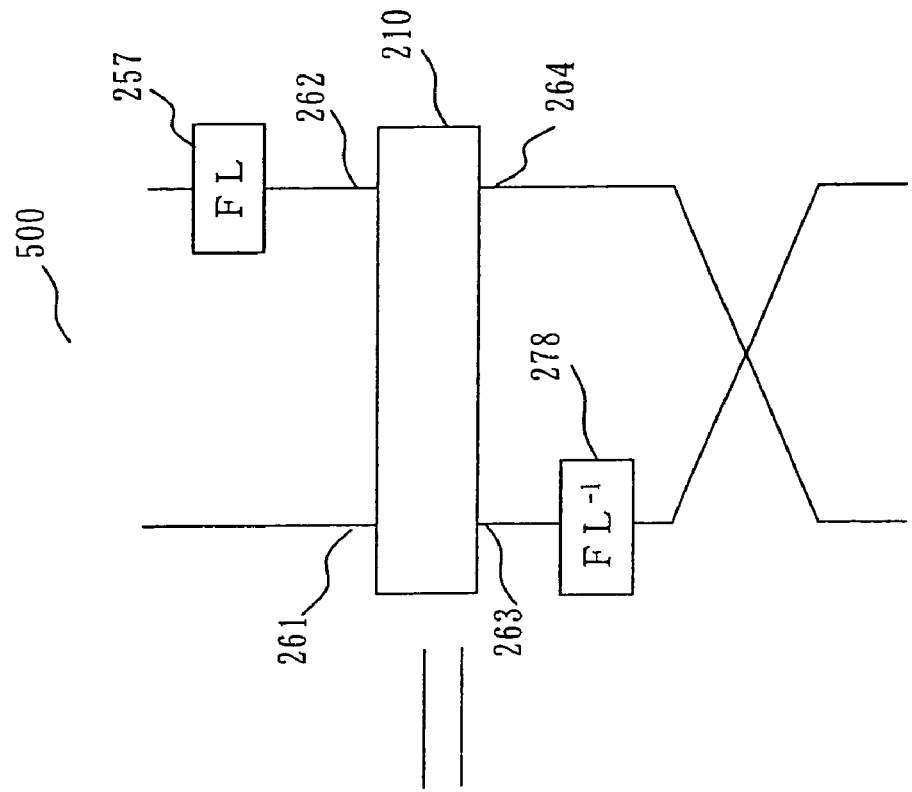
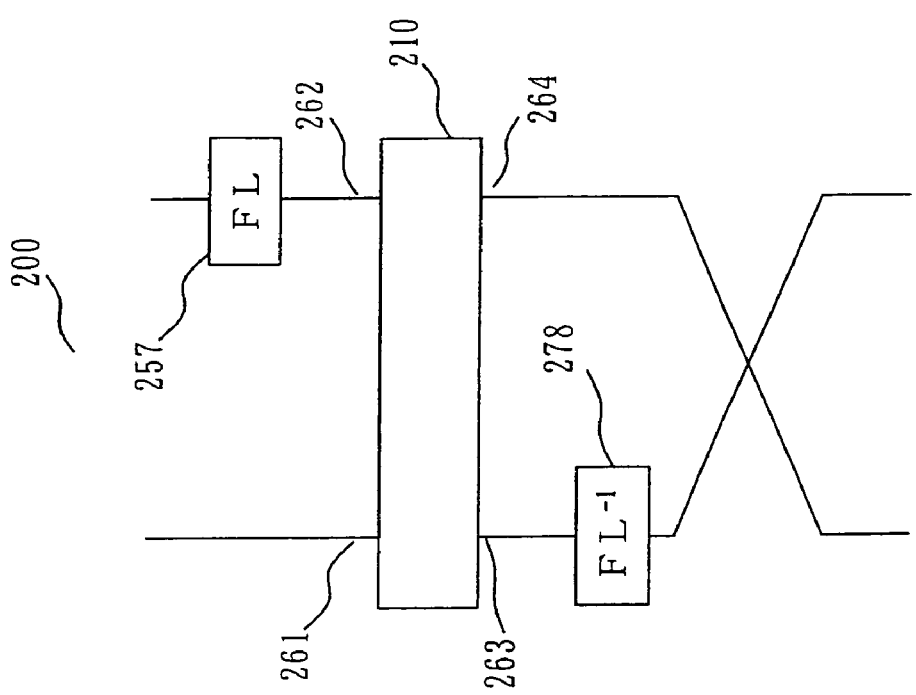

BLOCK CIPHER APPARATUS USING AUXILIARY TRANSFORMATION

CROSS-REFERENCE TO RELATED APPLICATIONS

This application is a Divisional of co-pending application Ser. No. 09/959,853 filed on Jan. 8, 2002, and for which priority is claimed under 35 U.S.C. §120. Application Ser. No. 09/959,853 is the national phase of PCT International Application No. PCT/JP01/01796 filed on Mar. 8, 2001, under 35 U.S.C. §371. The entire contents of each of the above-identified applications are hereby incorporated by reference.

TECHNICAL FIELD

The present invention relates to a data transformation apparatus, data transformation methods, and storage media in which data transformation methods are recorded, for encryption, decryption, and data diffusion in order to protect digital information on information communications.

BACKGROUND ART

FIG. 25 represents an encryption function which is used in DES described in "Gendai Ango Riron (Modern Cipher Theory)" (The Institute of Electronics, Information and Communication Engineers, published on Nov. 15, 1997, page 46).

As shown in FIG. 25, eight S-boxes are used. These eight S-boxes are mutually different tables. Each table outputs 4-bit data from 6-bit input data.

FIG. 26 shows non-linear transformation function which is described in "Specification of E2—a 128-bit Block Cipher" (Nippon Telegraph and Telephone Corporation, published on Jun. 14, 1998, page 10).

As shown in FIG. 26, each S-function unit consists of eight S-boxes.

Conventional encryption devices use multiple S-boxes. Since some ciphers are equipped with mutually different tables, memory usage is increased as compared to ones equipped with one S-box. Since, on the other hand, other ciphers use only one S-box, the security of the cipher is decreased.

As shown in FIG. 7, when a normal data transformation unit (FL) 250 is inserted in the encryption unit, it is required to provide an inverse data transformation unit (FL$^{-1}$) 270 in a decryption unit to decrypt the ciphertexts. Since, generally, the normal data transformation unit (FL) 250 and the inverse data transformation unit (FL$^{-1}$) 270 are mutually different circuits, causes a problem that the encryption unit and the decryption unit cannot provide the same configuration.

Furthermore, in generating extension keys, complex operations are required in order to generate the extension keys having higher security. There is another problem in case of generating the extension keys that the number of bits of key data to be input as an initial value should be fixed.

The present invention aims to provide systems in which circuits for encryption and decryption are the same, and in which circuit area, program size and memory usage which are used for non-linear transformation computation can be reduced, and furthermore, the extension keys can be generated using a simpler configuration.

DISCLOSURE OF THE INVENTION

According to one embodiment of the present invention, a data transformation apparatus includes a data processing unit configured to receive input data and key data, and perform at least one of encryption and decryption of the input data using the key data. The data processing unit comprises a non-linear transformation unit configured to receive at least part of the input data as data to be transformed, and perform a non-linear transformation of the data to be transformed.

The non-linear transformation unit includes first, second, and third transformation units.

The first transformation unit is configured to: receive a part of the data to be transformed as first partial data, transform the first partial data by performing a lookup of a transformation table based on a value of the first partial data to obtain a transformed value of the first partial data, and output the transformed value of the first partial data;

The second transformation unit is configured to: receive at least another part of the data to be transformed as second partial data, transform the second partial data by performing a lookup of the transformation table based on a value of the second partial data to obtain a corresponding value of the second partial data, and perform an operation on the corresponding value of the second partial data to obtain a transformed value of the second partial data, and output the transformed value of the second partial data; and The third transformation unit configured to: receive a part of the data to be transformed, which is different from the first and second partial data, as third partial data, transform the third partial data by performing an operation on a value of the third partial data to obtain a corresponding value of the third partial data, and performing a lookup of the transformation table based on the corresponding value of the third partial data, to obtain a transformed value of the third partial data, and output the transformed value of the third partial data.

The non-linear transformation unit is implemented using at least one of a computer processor and a logical operation circuit.

According to another embodiment of the present invention, a data transformation apparatus includes a data processing unit configured to receive key data and input data, and perform at least one of encryption and decryption of the input data using the key data; a key generating unit configured to generate the key data to be used by the data processing unit, and supply the key data to the data processing unit; and a non-linear function unit configured to receive at least part of the input data as data to be transformed.

The non-linear function unit includes: a key function unit configured to perform a logical operation of the data to be transformed, or data which is derived from the data to be transformed, and the key data; an S function unit configured to convert the data to be transformed, or data which is derived from the data to be transformed, into other data; and a P function unit configured to perform a logical operation among pieces of the data to be transformed, or data which is derived from the data to be transformed, The key function unit is placed within the non-linear function unit at one of the following: before the S function unit and the P function unit, after the S function unit and the P function unit, and between the S function unit and the P function unit.

The P function unit receives eight pieces of 4n-bit data $z_1$, $z_2, \ldots z_8$ as the data to be transformed or data which is derived from the data to be transformed, n being an integer greater than 1.

The P function unit includes: a circuit which calculates the XOR of at least two of the four pieces of data $z_1$, $z_2$, $z_3$, $z_4$ to obtain a 4n-bit operation result $U_1$; a circuit which calculates the XOR of at least two of the four pieces of data $z_5$, $z_6$, $z_7$, $Z_8$ to obtain a 4n-bit operation result $U_2$; a circuit which calculates the XOR of $U_1$ and $U_2$ to obtain the 4n-bit operation result $U_3$; a rotational circuit which performs a rotational shift on $U_1$; and a circuit which calculates the XOR of an output of the rotational circuit and $U_3$ to obtain a 4n-bit operation result $U_4$.

The data transformation apparatus divides $U_3$ and $U_4$ into four pieces of data, respectively, to output eight pieces of n-bit data $z'_1, z'_2, \ldots z'_8$.

According to another embodiment of the present invention, a data transformation apparatus includes: a data processing unit configured to receive key data and input data, and perform at least one of encryption and decryption of the input data using the key data; a key generating unit for generating key data to be used by the data processing unit and supplying the key data to the data processing unit; a non-linear function unit configured to receive at least part of the input data as data to be transformed, and perform a non-linear transformation of the data to be transformed.

The non-linear transformation unit includes the following units connected in series: a key function unit configured to perform a logical operation of data input thereto based on the key data; an S function unit configured to convert data input thereto; and a P function unit configured to perform a logical operation among pieces of data input thereto.

The key function unit is placed one of before the S function unit and the P function unit and after the S function unit and the P function unit in the non-linear function unit. Depending on the placement of the key function unit, the logical operation performed by either the key function unit or the P function unit produces transformed data which is output by the non-linear transformation unit.

The non-linear function unit is implemented using at least one of a computer processor and a logical operation circuit.

According to another embodiment of the present invention, a data transformation apparatus having a data processing unit configured to receive key data and input data, and perform at least one of encryption and decryption of the input data using the key data, further includes: a non-linear function unit including a P function unit which performs a logical operation among pieces of data to be transformed.

The P function unit inputs eight pieces of 4n-bit data (n being an integer greater than 1) $z_1, z_2, \ldots, z_8$, and includes: a circuit which performs an XOR operation of at least two of the four pieces of data $z_1, z_2, z_3, z_4$ to obtain 4n-bit operation result $U_1$; a circuit which performs an XOR operation of at least two of the four pieces of data $z_5, z_6, z_7, z_8$ to obtain 4n-bit operation result $U_2$; a circuit which performs an XOR operation of $U_1$ and $U_2$ to obtain 4n-bit operation result $U_3$; a rotational circuit which performs a rotational shift on $U_1$; and a circuit which performs an XOR operation of output from the rotational circuit and $U_3$ to obtain 4n-bit operation result $U_4$.

The data transformation apparatus divides $U_3$ and $U_4$ into four pieces of data, respectively, and outputs eight pieces of n-bit data $z'_1, z'_2, \ldots, z'_8$.

According to another embodiment of the present invention, a data transformation apparatus includes: a key generating unit configured to output key data based on input key data; and a data processing unit configured to receive input data, and perform at least one of encryption and decryption of the input data based on the output key data using a key function process.

The data processing unit divides at least part of the input data into first and second data. The data processing unit includes: a non-linear function unit configured to perform a non-linear transformation on the first data to produce first transformed data during a first round of transformation by the data processing unit; a first XOR circuit configured to perform an XOR operation on the second data and the output key data to produce second transformed data during the first round of transformation by the data processing unit; and a second XOR circuit configured to perform an XOR operation on the first transformed data and the second transformed data during the first round of transformation by the data processing unit.

The key generating unit is further configured to process the output key data in order to generate modified key data, and supply the modified key data to the non-linear function unit.

During a second round of data transformation by the data processing unit, the first XOR circuit is configured to perform an XOR operation on the first data and the modified key data such that, during the first and second rounds of data transformation by the data processing unit, the key function process of the data processing unit is performed outside of the non-linear function unit.

According to another embodiment of the present invention, a data transformation method includes executing a data processing process which receives key data and input data, and performs at least one of encryption and decryption of the input data using the key data. The data processing process comprises a non-linear transformation process which receives at least part of the input data as data to be transformed, and performs a non-linear transformation of the data to be transformed. The non-linear transformation process includes first, second, and third transformation processes.

The first transformation process includes: receiving a part of the data to be transformed as first partial data, transforming the first partial data by performing a lookup of a transformation table based on a value of the first partial data to obtain a transformed value of the first partial data, and outputting the transformed value of the first partial data.

The second transformation process includes: receiving at least another part of the data to be transformed as second partial data, transforming the second partial data by performing a lookup of the transformation table based on a value of the second partial data to obtain a corresponding value of the second partial data, and performing an operation on the corresponding value of the second partial data to obtain a transformed value of the second partial data, and outputting the transformed value of the second partial data.

The third transformation process includes: receiving a part of the data to be transformed, which is different from the first and second partial data, as third partial data, transforming the third partial data by performing an operation on a value of the third partial data to obtain a corresponding value of the third partial data, and performing a lookup of the transformation table based on the corresponding value of the third partial data, to obtain a transformed value of the third partial data.

According to another embodiment of the present invention, a data transformation method includes: executing a key generating process which generates key data; executing a data processing process which receives input data and the key data, and performs at least one of encryption and decryption of the input data using the key data; and executing a non-linear function process.

The non-linear function process includes: a key function process which performs a logical operation of data to be transformed, or data which is derived from the data to be transformed, and the key data; an S function process which converts the data to be transformed, or data which is derived from the data to be transformed, into other data; and a P function process which performs a logical operation among pieces of data to be transformed, or data which is derived from the data to be transformed.

The key function process is executed within the non-linear process at one of the following: before the S function process and the P function process, after the S function process and the P function process, and between the S function process and the P function process in the non-linear function process, The P function process receives eight pieces of 4n-bit data $z_1, z_2, \ldots z_8$ as the data to be transformed or data which is derived from the data to be transformed, n being an integer greater than 1. The P function process includes: calculating the XOR of at least two of the four pieces of data $z_1, z_2, z_3, z_4$ to obtain a 4n-bit operation result $U_1$; calculating the XOR of at least two of the four pieces of data $z_5, z_6, z_7, z_8$ to obtain a 4n-bit operation result $U_2$; calculating the XOR of $U_1$ and $U_2$ to obtain the 4n-bit operation result $U_3$; performing a rotational shift on $U_1$; and calculating the XOR of an output of the rotational circuit and $U_3$ to obtain a 4n-bit operation result $U_4$.

The data transformation process divides $U_3$ and $U_4$ into four pieces of data, respectively, to output eight pieces of n-bit data $z'_1, z'_2, \ldots z'_8$.

According to another embodiment of the present invention, a data transformation method includes: executing a key generating process which generates key data; executing a data processing process which receives input data and the key data, and performs at least one of encryption and decryption of the input data using the key data; and executing a non-linear function process which receives at least part of the input data as data to be transformed, and performs a non-linear transformation of the data to be transformed, the non-linear function process.

The non-linear function includes the following processes: a key function process which performs a logical operation of data based on the key data; an S function process for which converts data; and a P function process which performs a logical operation among pieces of data.

The non-linear function process is executed according to one of the following sequences: the key function process is executed before the S function process and the P function process, the key function process being applied to the data to be transformed, the S function process and P function process being sequentially applied to data obtained as a result of the key function process, the P function process producing transformed data which is output by the non-linear function process; and the key function process is executed after the S function process and the P function process, the S function process and the P function process being sequentially applied to the data to be transformed, the key function process being applied to data obtained as a result of the S function and P function processes, the key function process producing transformed data which is output by the non-linear function process.

According to another exemplary embodiment, a data transformation method includes: executing a key generating process which outputs key data, the second key data being generated by processing the first key data; and executing a data processing process which receives input data, and performs at least one of encryption and decryption of the input data based on the output key data using a key function process.

The data processing process divides at least part of the input data into first and second data. The data processing process includes: a non-linear function process which performs a non-linear transformation on the first data to produce first transformed data during a first round of transformation by the data processing process; a first XOR process which performs an XOR operation on the second data and the output key data to produce second transformed data during the first round of transformation by the data processing process; and a second XOR process which performs an XOR operation on the first transformed data and the second transformed data during the first round of transformation by the data processing process.

The key generating process processes the output key data in order to generate modified key data, and supply the modified key data to the non-linear function process.

During a second round of data transformation by the data transformation process, the first XOR process performs an XOR operation on the first data and the modified key data such that, during the first and second rounds of data transformation by the data processing process, the key function process of the data processing process is performed outside of the non-linear function process.

Further embodiments of the present invention include programs embodied on a computer-readable storage medium which, when executed, cause a computer to perform the above data transformation methods.

BRIEF EXPLANATION OF THE DRAWINGS

FIG. 1 shows a data transformation unit for encryption 100 and a data transformation unit for decryption 400.

FIG. 2 shows notations.

FIG. 10 shows relation between the normal data transformation unit (FL) 251 and the inverse data transformation unit $(FL^{-1})$ 271 which are placed at point symmetry.

FIG. 19 shows a configuration of a control table of a shift control unit 345.

FIG. 21 shows correspondence between the shift register A 341, the shift register B 342 and extension keys.

FIG. 23 shows correspondence between the shift registers A 341 through D 344 and extension keys.

FIG. 39 shows another configuration of the encryption unit 200 or the decryption unit 500.

BEST MODE FOR CARRYING OUT THE INVENTION

Embodiment 1

Figure 3:
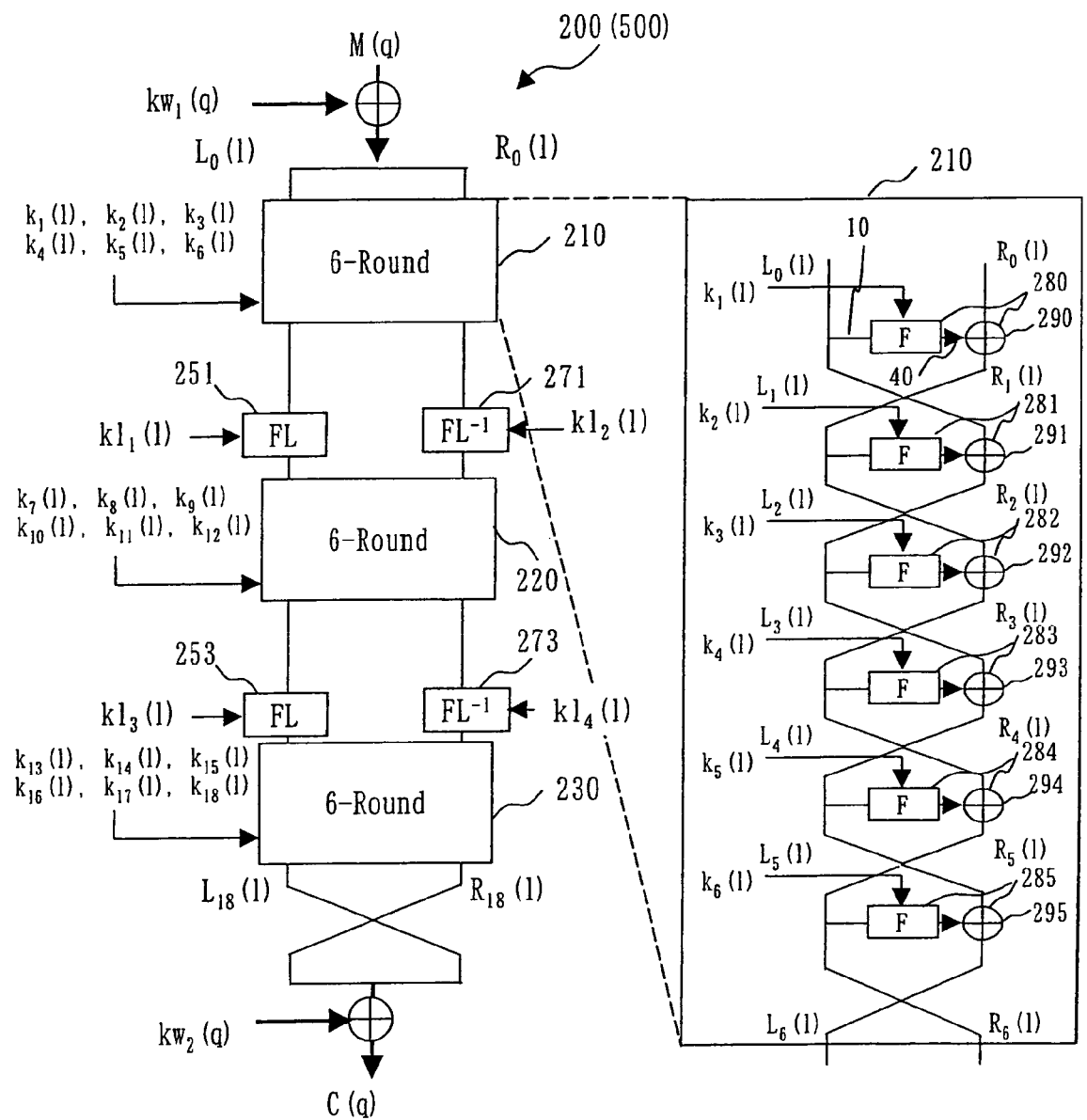
FIG. 3 shows a configuration of an encryption unit 200 or a decryption unit 500.

FIG. 1 shows a data transformation unit for encryption 100 and a data transformation unit for decryption 400 in this embodiment.

The data transformation unit for encryption 100 is, for example, an encryption device which outputs 128-bit ciphertexts from 128-bit input plaintexts. The data transformation unit for decryption 400 is a decryption device which outputs 128-bit plaintexts from 128-bit input ciphertexts. The data transformation unit for encryption 100 consists of an encryption unit 200 and a key generating unit 300. The encryption unit 200 is a data processing unit for encrypting plaintexts. The key generating unit 300 generates multiple (n) 64-bit or 128-bit extension keys using constants $V_i$ from 128-bit, 192-bit or 256-bit input key data, and supply them to the encryption unit 200. The data transformation unit for decryption 400 consists of a decryption unit 500 and a key generating unit 600. The decryption unit 500 is a data processing unit for decrypting ciphertexts. The key generating unit 600 is the same as or similar to the above key generating unit 300. Furthermore, since the encryption unit 200 and the decryption unit 500 can run the same procedure, they can share one circuit or one program, though the encryption unit 200 and the decryption unit 500 are illustrated separately in the figures. Similarly, the key generating units 300 and 600 can share one circuit or one program. That is, one circuit or one program can be shared by the data transformation unit for encryption 100 and the data transformation unit for decryption 400.

FIG. 2 shows meanings of notations used for the following figures or descriptions.

In FIG. 3 and the subsequent figures, a left half of data is called "left data L" and a right half of data is called "right data R". Furthermore, the data which are input to non-linear data transformation units 210, 220, 230, and 240 are called "input data", the internal data of the non-linear data transformation units 210, 220, 230, and 240 are called "intermediate data", and data which are output from the non-linear data transformation units 210, 220, 230, and 240 are called "output data".

FIG. 3 shows an example of the encryption unit 200 or the decryption unit 500.

FIG. 3 shows a configuration in which 6-round non-linear data transformation unit 210, 6-round non-linear data transformation unit 220, and 6-round non-linear data transformation unit 230 are cascade. The normal data transformation unit (FL) 251 and the inverse data transformation unit (FL$^{-1}$) 271 are inserted between the 6-round non-linear data transformation unit 210 and the 6-round non-linear data transformation unit 220. Furthermore, the normal data transformation unit (FL) 253 and the inverse data transformation unit (FL$^{-1}$) 273 are inserted between the 6-round non-linear data transformation unit 220 and the 6-round non-linear data transformation unit 230. Inside the 6-round non-linear data transformation unit 210, 6 rounds of non-linear data transformation units are provided. For example, a non-linear data transformation unit 280 consists of a non-linear function unit F and an XOR (exclusive OR) circuit 290. In this way, in case of FIG. 3, 18 rounds of non-linear data transformation units are provided in total.

The non-linear data transformation unit 210 is equipped with a first non-linear data transformation unit 280 and a second non-linear data transformation unit 281. For arbitrary two pieces of input data, right input data $R_0$ and left input data $L_0$, the former performs the first non-linear transformation on the left input data $L_0$ using a first extension key $k_1$, outputs an XORed result of the output data of the first non-linear transformation and the right input data $R_0$ as the first left intermediate data $L_1$, and outputs the left input data $L_0$ as the first right intermediate data $R_1$. The latter performs the second non-linear transformation on the first left intermediate data $R_1$ using a second extension key $k_2$, outputs an XORed result of the output data of the second non-linear transformation and the first right intermediate data $R_1$ as the second left intermediate data $L_2$, and outputs the first left intermediate data $L_1$ as the second right intermediate data $R_2$. The non-linear data transformation unit 210, in which the first non-linear data transformation unit 280 through the sixth non-linear data transformation unit 285 are cascade, outputs the final right intermediate data $R_6$ and the left intermediate data $L_6$ as the output data after transformation.

Figure 4:
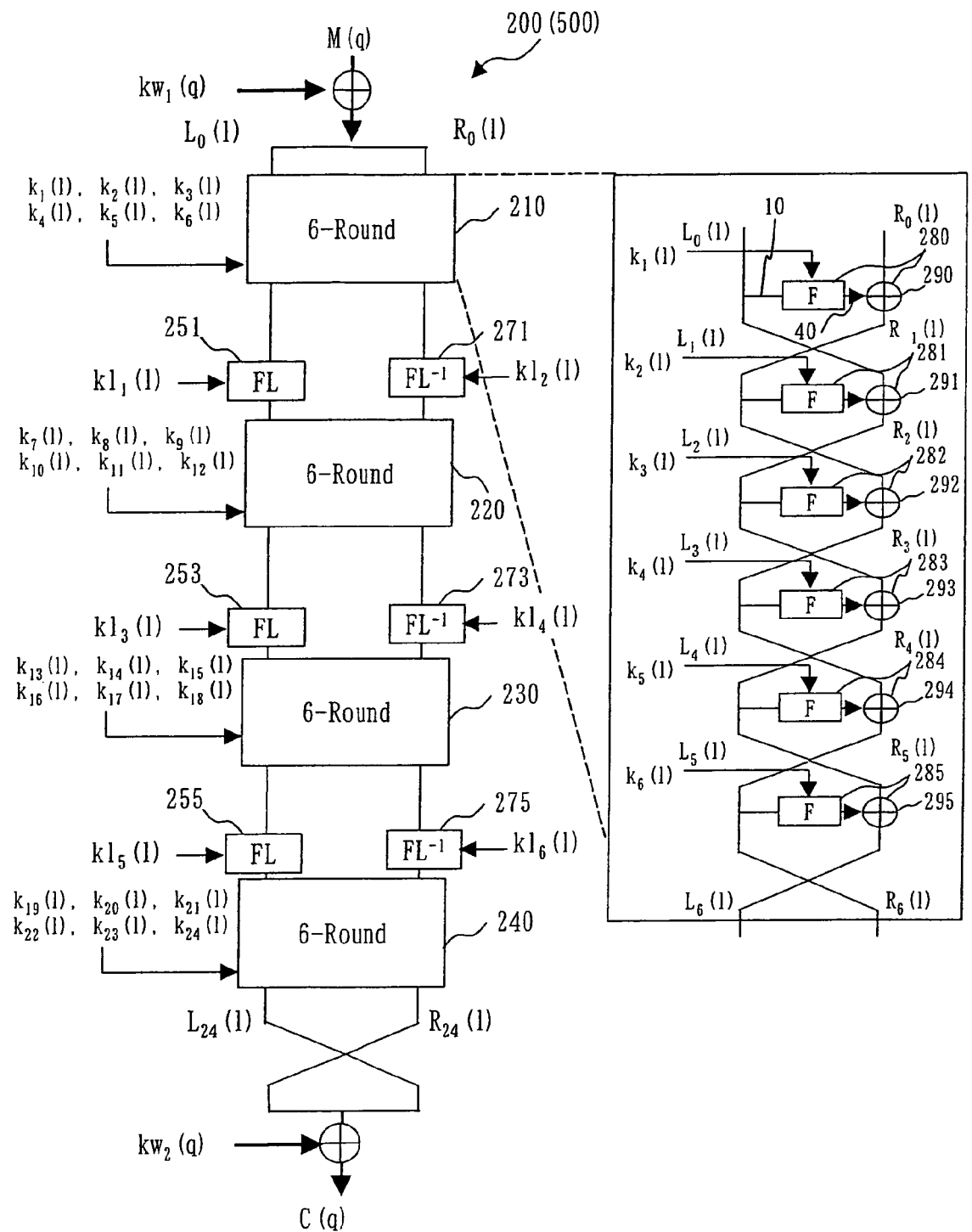
FIG. 4 shows another configuration of the encryption unit 200 or the decryption unit 500.

FIG. 4 shows a configuration in which a normal data transformation unit (FL) 255, an inverse data transformation unit ($FL^{-1}$) 275, and a 6-round non-linear data transformation unit 240 are added to the encryption unit 200 shown in FIG. 3. In total, data transformation is performed by 24 rounds of non-linear data transformation units.

Figure 5:
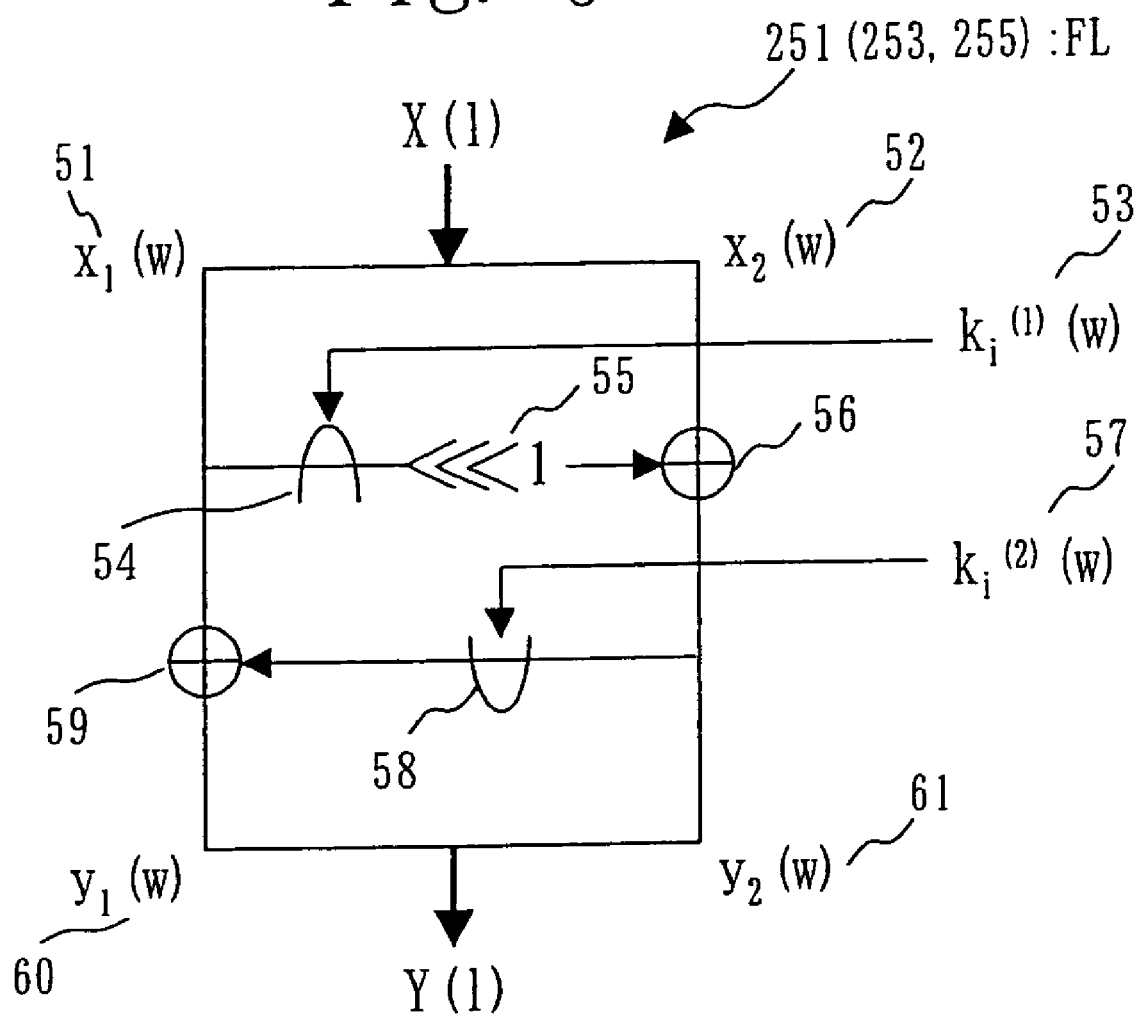
FIG. 5 shows a configuration of a normal data transformation unit (FL) 251.

FIG. 5 shows the normal data transformation unit (FL) 251.

FIG. 5 shows that the normal data transformation unit (FL) 251 divides input data into two pieces of data, left input data 51 and right input data 52, performs logical operations for the both pieces of the data, and generates output data from the left output data 60 and the right output data 61. The left input data 51 is ANDed with an extension key 53 at an AND circuit 54, and then, the ANDed data is left rotational shifted (also called "circular shifted") by 1 bit at a 1-bit left rotational shifting unit 55. The shifted data is XORed with the right input data 52 at an XOR circuit 56. The output from the XOR circuit 56 becomes right output data 61, and is ORed with an extension key 57 at an OR circuit 58. Then, the ORed result is XORed with the left input data 51 at an XOR circuit 59 to generate left output data 60.

Figure 6:
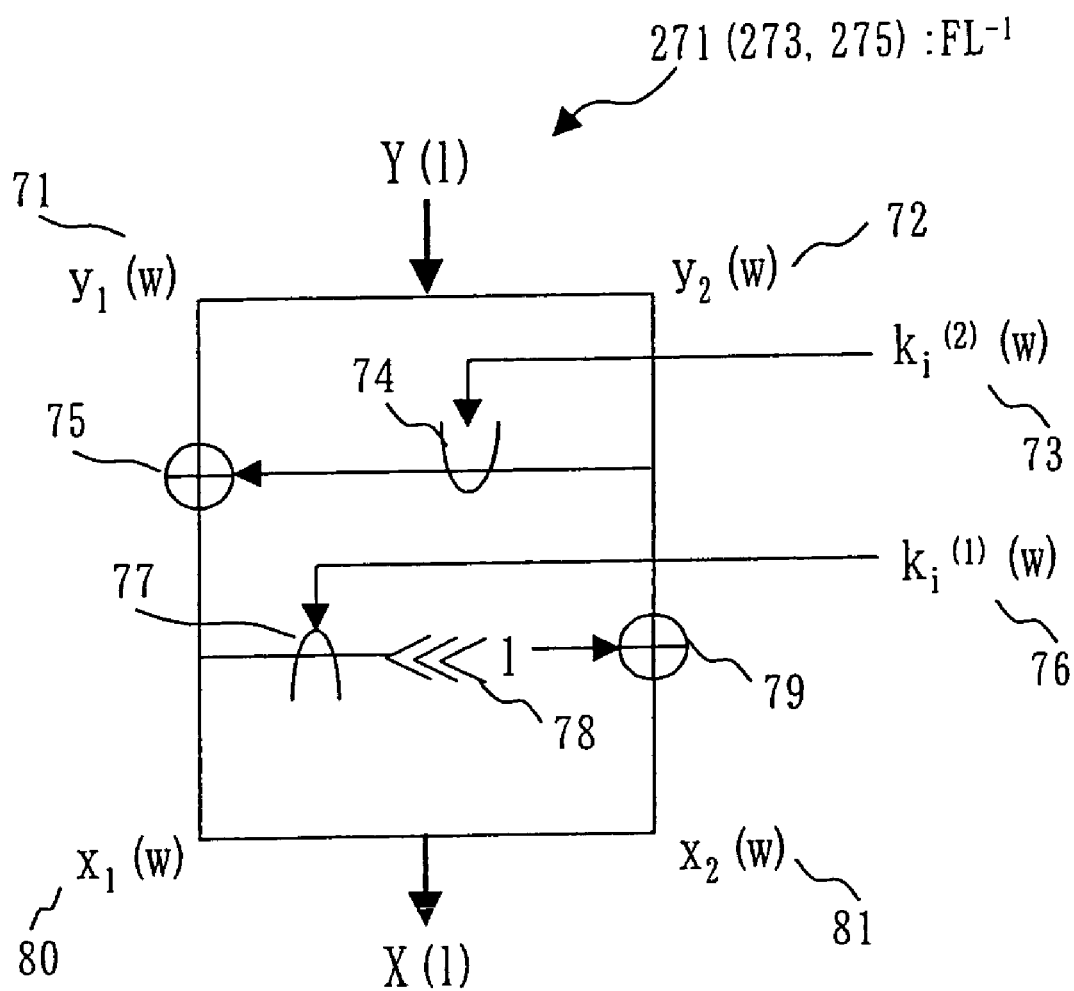
FIG. 6 shows a configuration of an inverse data transformation unit $(FL^{-1})$ 271.

FIG. 6 shows the inverse data transformation unit ($FL^{-1}$) 271.

FIG. 6 shows that the inverse data transformation unit ($FL^{-1}$) 271 divides input data into two pieces of data, left input data 71 and right input data 72, performs logical operations for the both pieces of the data, and generates output data from left output data 80 and right output data 81.

The right input data 72 is ORed with an extension key 73 at an OR circuit 74, and then, the ORed data is XORed with the left input data 71 at an XOR circuit 75. Then, the output from the XOR circuit 75 becomes left output data 80, and is ANDed with an extension key 76 at an AND circuit 77. After that, the ANDed result is left rotational shifted by 1 bit at a 1-bit left rotational shifting unit 78, and the shifted data is XORed with the right input data 72 at an XOR circuit 79. The output from the XOR circuit 79 becomes right output data 81.

The normal data transformation unit (FL) 251 shown in FIG. 5 and the inverse data transformation unit ($FL^{-1}$) 271 shown in FIG. 6 perform opposite operations each other. Accordingly, using the same extension key, the input data X of FIG. 5 can be obtained as output data X of FIG. 6 by making output data Y of FIG. 5 be input data Y of FIG. 6.

The relationship in which the input data to one unit can be obtained as output data from the other unit by making the output data from the one unit be input data to the other is called a relation between normal and inverse transformations. The normal data transformation unit (FL) 251 and the inverse data transformation unit ($FL^{-1}$) 271 are circuits which realize such relation between normal and inverse transformations.

Both of the 1-bit left rotational shifting unit 55 of FIG. 5 and the 1-bit left rotational shifting unit 78 of FIG. 6 perform left shift, however, both can execute right shift. Furthermore, the normal data transformation unit (FL) 251 and the inverse data transformation unit ($FL^{-1}$) 271 can be one of other configurations as long as they preserve the relation between normal and inverse transformations. For example, the number of shifts can be changed. Moreover, an AND circuit with "not" operation, an OR circuit with "not" operation, and/or an XOR circuit with "not" operation can be added. Namely, as follows are shown definitions of the AND circuit with "not" operation, the OR circuit with "not" operation, and the XOR circuit with "not" operation, represented by "andn", "orn", and "xorn", respectively.

x andn y: (not x) and y
x orn y: (not x) or y
x xorn y: (not x) and y

Some recent CPUs are provided with commands of "and", "or", and "xor" including "not". These commands can be performed at the same cost as "and", "or", and "xor".

Figure 7:
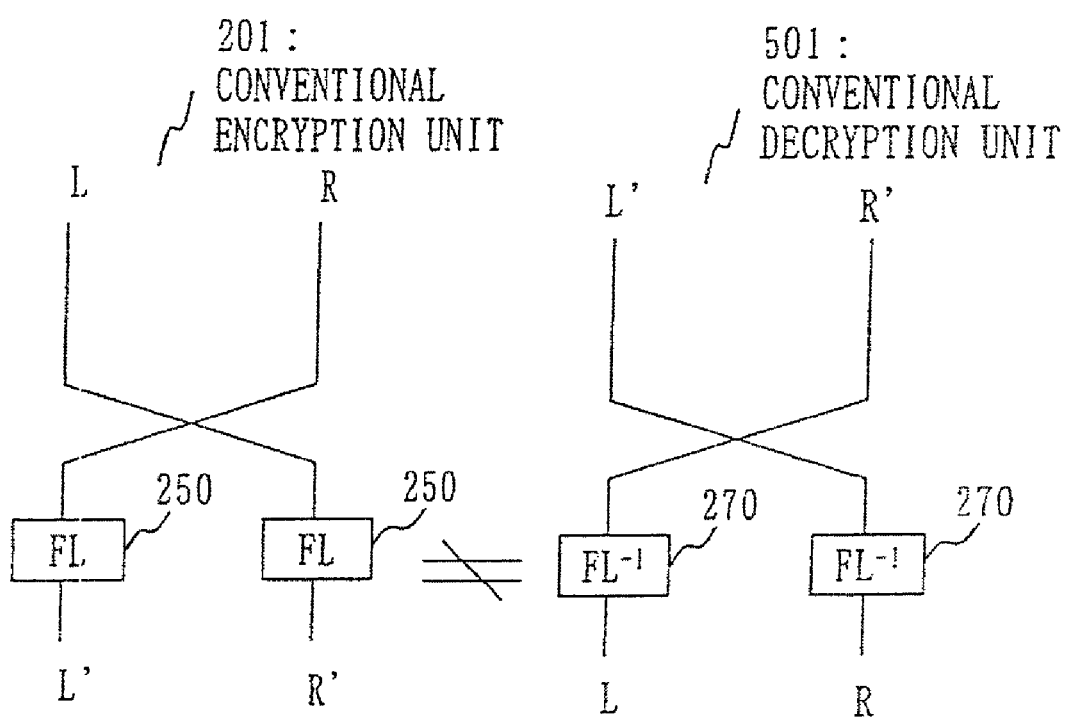
FIG. 7 shows a part of a conventional encryption unit and a conventional decryption unit.

FIG. 7 shows a conventional encryption unit 201 and a conventional decryption unit 501.

The conventional encryption unit 201 is equipped with two normal data transformation units FL. Thus, the decryption unit should be equipped with two inverse data transformation units $FL^{-1}$ in order to perform inverse operations. Therefore, since the encryption unit generally has a different configuration from the decryption unit, the encryption unit and the decryption unit cannot share the same circuit.

Figure 8:
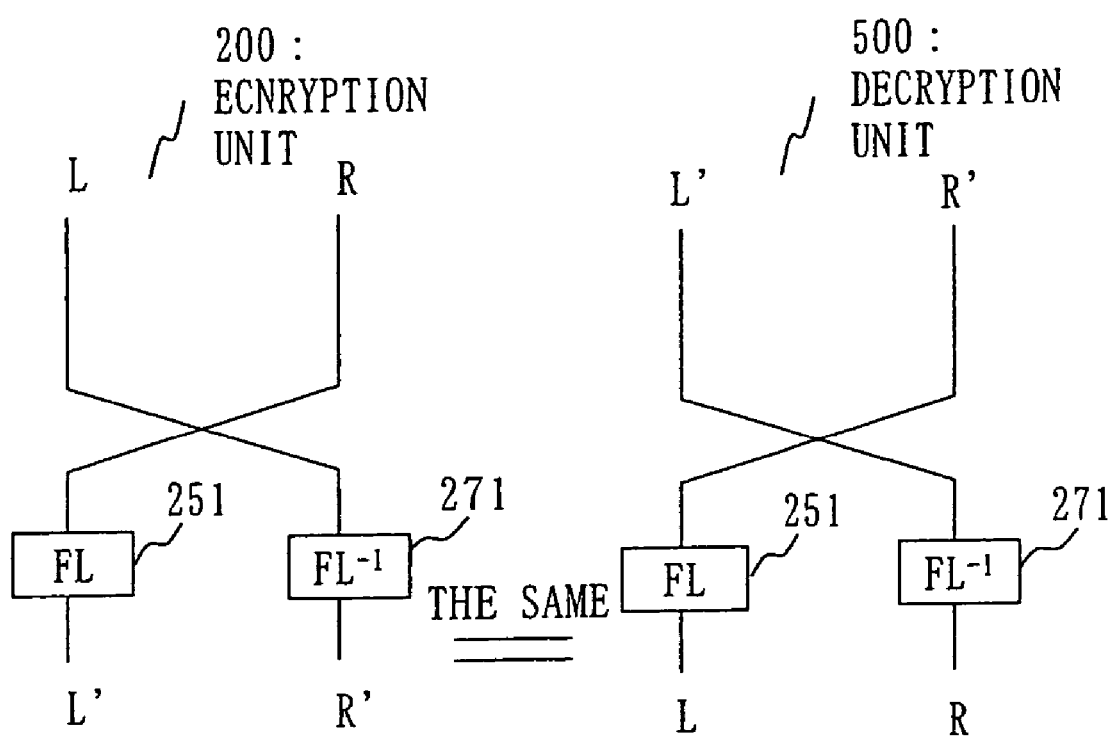
FIG. 8 shows a part of the encryption unit 200 and the decryption unit 500.

On the other hand, as shown in FIG. 8, in the present embodiment, the normal data transformation unit (FL) 251 and the inverse data transformation unit ($FL^{-1}$) 271 are located side by side in the encryption unit 200, so that the decryption unit having the same configuration can perform decryption. For example, the right data R is transformed by the normal data transformation unit (FL) 251 to get left data L', and the left data L is transformed by the inverse data transformation unit ($FL^{-1}$) 271 to get right data R'. In this case, the right data R can be obtained by inputting the left data L' to the inverse data transformation unit ($FL^{-1}$) 271, and the left data L can be obtained by inputting the right data R' to the normal data transformation unit (FL) 251.

As described above, the encryption unit 200 and the decryption unit 500 can be implemented by the same configuration, and the encryption unit 200 and the decryption unit 500 can share the circuit.

Figure 9:
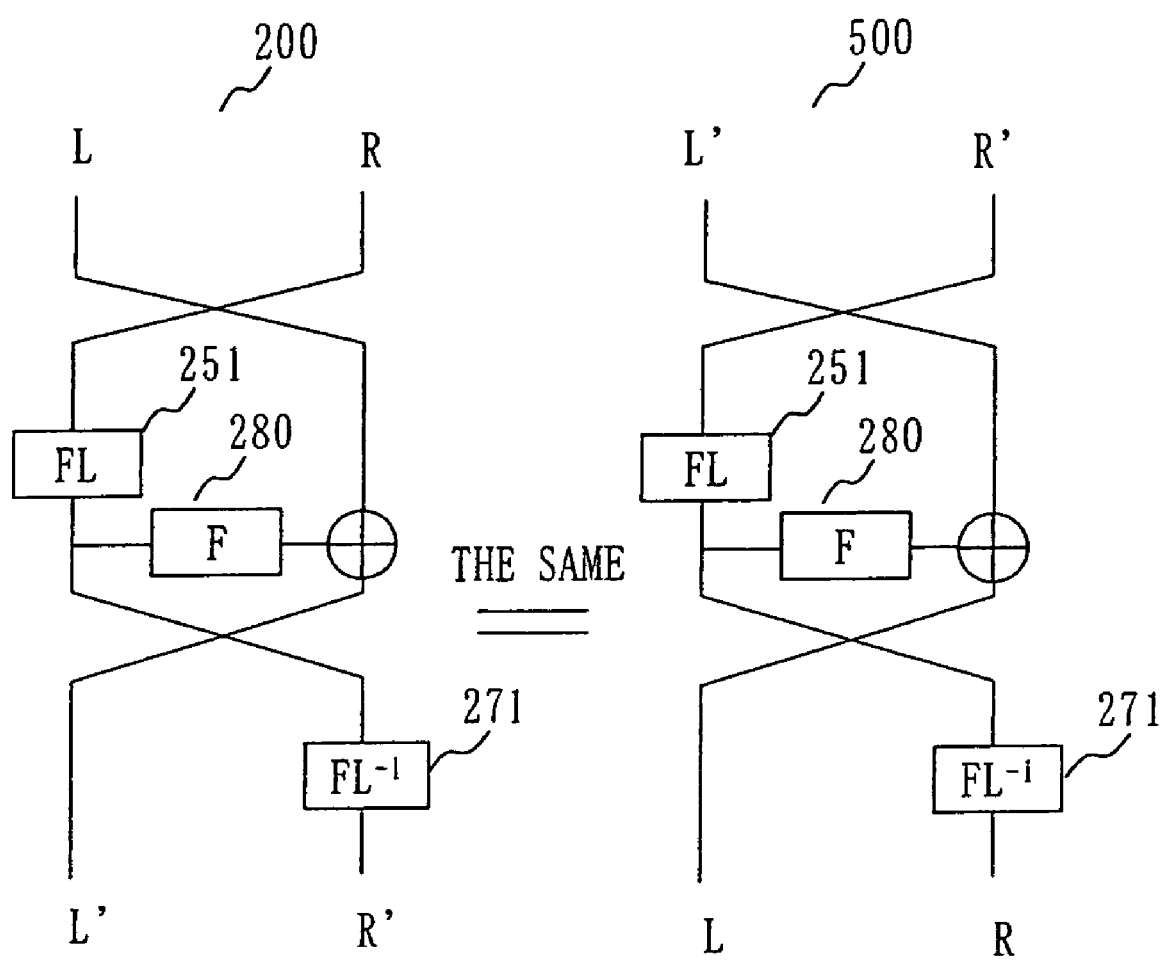
FIG. 9 shows the normal data transformation unit (FL) 251 and the inverse data transformation unit $(FL^{-1})$ 257 which are placed at point symmetry.

FIG. 9 shows a configuration in which the normal data transformation unit (FL) 251 and the inverse data transformation unit ($FL^{-1}$) 271 are located at point symmetry on the non-linear data transformation unit 280.

In this way, when the normal data transformation unit (FL) 251 and the inverse data transformation unit ($FL^{-1}$) 271 are located at point symmetry on the non-linear data transformation unit 280, the encryption and the decryption can be performed using the same configuration.

FIG. 10 shows correspondence between the data transformation unit (FL) and the inverse data transformation unit ($FL^{-1}$) placed at point symmetry.

As shown in FIG. 10, in case of FIG. 3, the normal data transformation unit (FL) 251 and the inverse data transformation unit ($FL^{-1}$) 271 are placed at point symmetry on the 6-round non-linear data transformation unit 220.

In FIGS. 3, 4, 8, and 9, the data transformation unit (FL) and the inverse data transformation unit ($FL^{-1}$) can be replaced with each other. Besides, in FIGS. 3, 4, 8, and 9, the right data R and the left data L can be replaced with each other.

Figure 36:
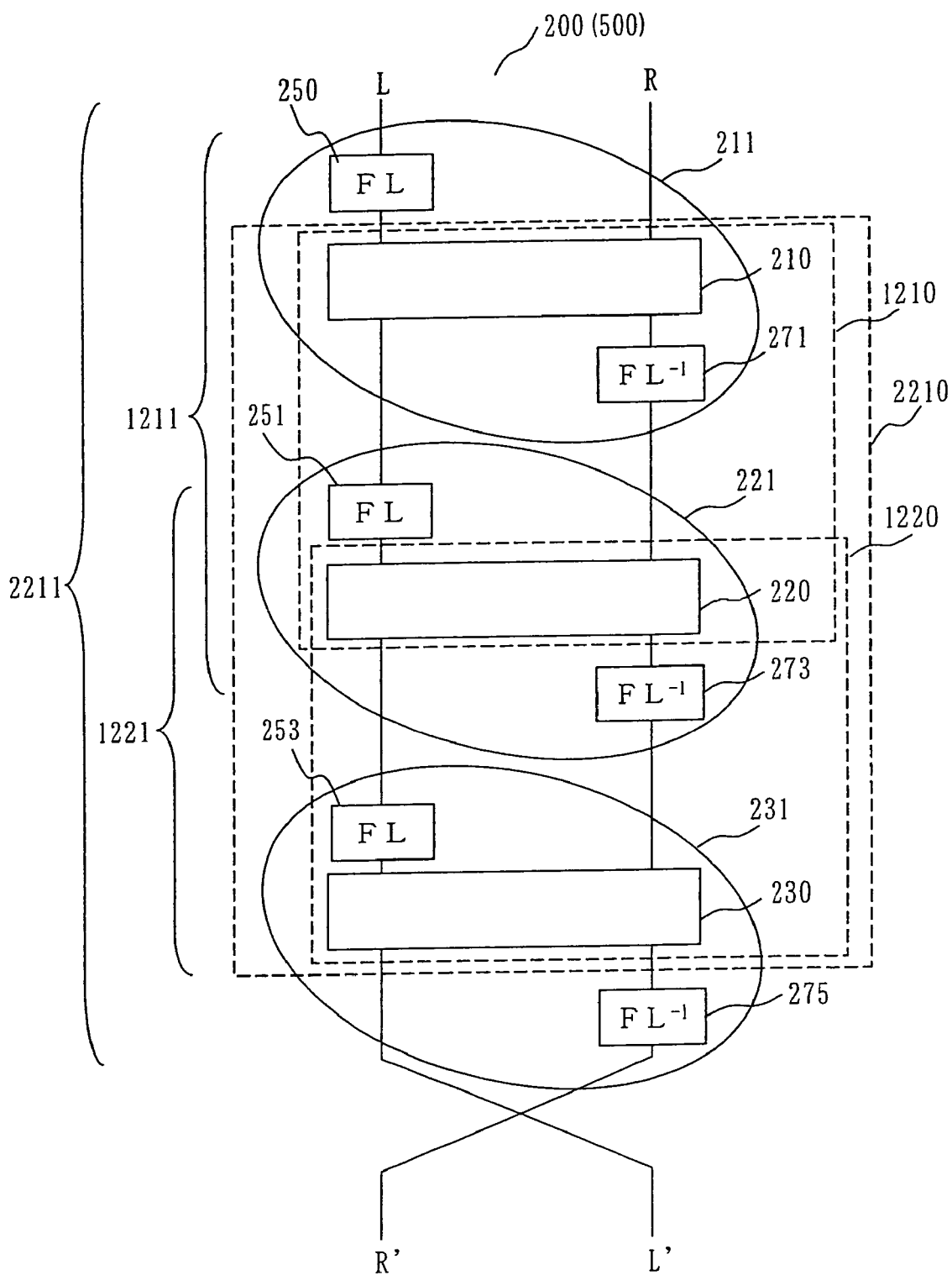
FIG. 36 shows another configuration of the encryption unit 200 or the decryption unit 500.

FIG. 36 shows a configuration in which the encryption unit 200 consists of the 6-round non-linear data transformation unit 210, and the 6-round non-linear data transformation unit 220, and the 6-round non-linear data transformation unit 230.

The 6-round non-linear data transformation unit 210, the 6-round non-linear data transformation unit 220, and the 6-round non-linear data transformation unit 230 are circuits that can be used for encryption and decryption.

Here, a normal/inverse data transformation unit 211 consists of the 6-round non-linear data transformation unit 210, and the normal data transformation unit (FL) 250, and the inverse data transformation unit ($FL^{-1}$) 271. The normal/inverse data transformation unit is a circuit that can be used for both encryption and decryption. Namely, the normal/inverse data transformation unit is one normal/inverse transformation circuit in which the input data to the unit can be obtained as the output data from the other unit by making the output data from the unit be the input data to the other unit.

A normal/inverse data transformation unit 221 also consists of the 6-round non-linear data transformation unit 220, and the normal data transformation unit (FL) 251, and the inverse data transformation unit ($FL^{-1}$) 273.

In addition, a normal/inverse data transformation unit 231 consists of the 6-round non-linear data transformation unit 230, and the normal data transformation unit (FL) 253, and the inverse data transformation unit ($FL^{-1}$) 275.

The encryption unit 200 is configured by cascading these normal/inverse data transformation units 211, 221, and 231. And this encryption unit 200 can be also used as the decryption unit 500.

Besides, if a set of the 6-round non-linear data transformation unit 210, the 6-round non-linear data transformation unit 220, the normal data transformation unit (FL) 251, and the inverse data transformation unit ($FL^{-1}$) 271 is assumed to be a non-linear data transformation unit 1210, the non-linear data transformation unit 1210 is a circuit that can be used for encryption and decryption. Here, a normal/inverse data transformation unit 1211 consists of the non-linear data transformation unit 1210, the normal data transformation unit (FL) 250, and the inverse data transformation unit ($FL^{-1}$) 273.

Further, if a set of the 6-round non-linear data transformation unit 220, the 6-round non-linear data transformation unit 230, and the normal data transformation unit (FL) 253, and the inverse data transformation unit ($FL^{-1}$) 273 is assumed to be a non-linear data transformation unit 1220, a normal/inverse data transformation unit 1221 consists of the non-linear data transformation unit 1220, the normal data transformation unit (FL) 251, and the inverse data transformation unit ($FL^{-1}$) 275.

The normal/inverse data transformation units 1211 and 1221 can be used for the decryption unit.

Further, if a set of the 6-round non-linear data transformation units 210 through 230 is assumed to be a non-linear data transformation unit 2210, the non-linear data transformation unit 2210 is a circuit that can be used for both encryption and decryption.

Here, the non-linear data transformation unit 2210, the normal data transformation unit (FL) 250, and the inverse data transformation unit ($FL^{-1}$) 275 form a normal/inverse data transformation unit 2211.

The normal/inverse data transformation unit 2211 can be used for the decryption unit.

As described above, the encryption unit 200 or the decryption unit 500 can be configured by cascading multiple normal/inverse data transformation units.

Further, in the encryption unit 200 or the decryption unit 500, the normal/inverse data transformation unit can be formed hierarchically by nesting the normal/inverse data transformation unit within the normal/inverse data transformation unit.

Figure 37:
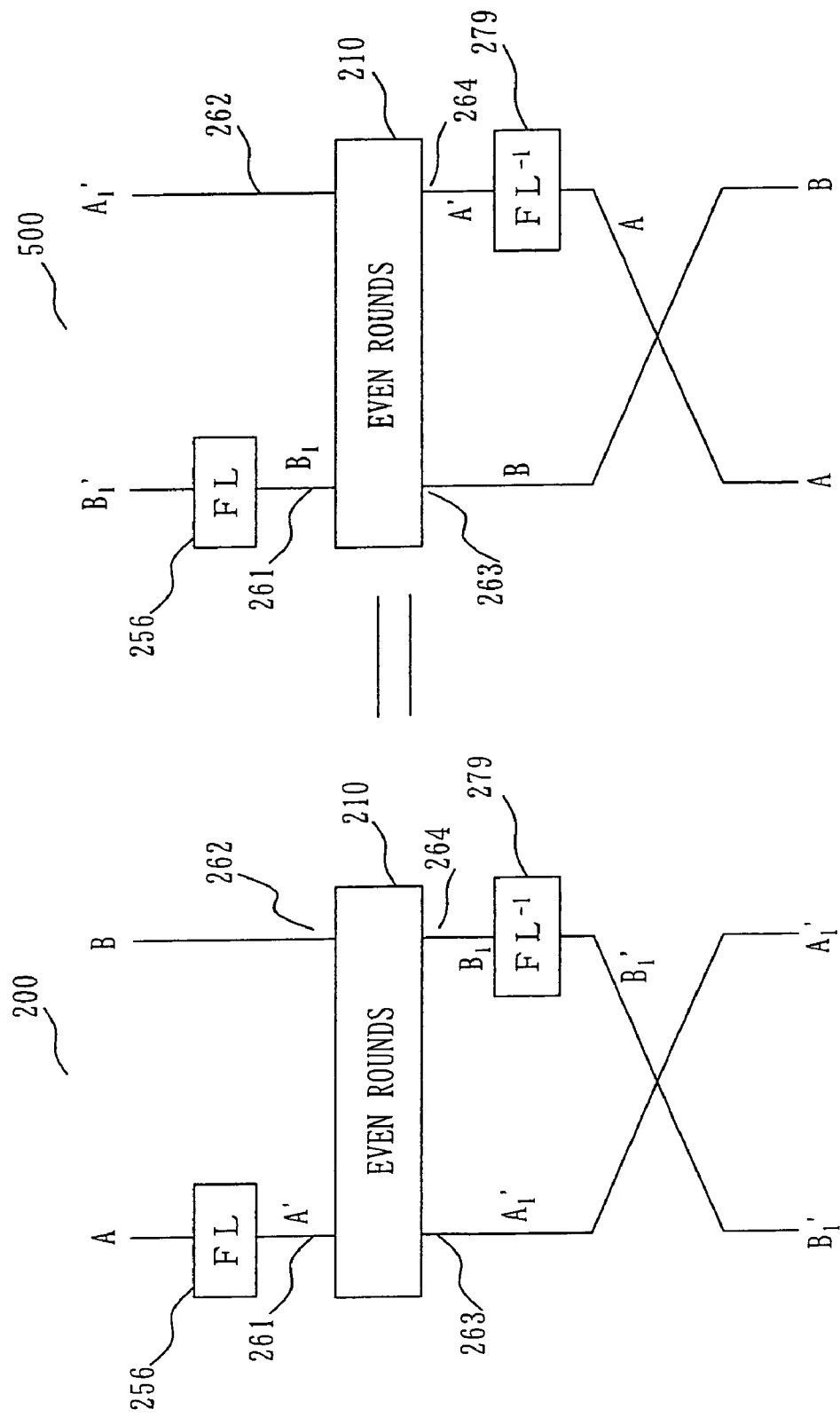
FIG. 37 shows another configuration of the encryption unit 200 or the decryption unit 500.

FIG. 37 shows a case in which the encryption unit 200 and the decryption unit have the same configuration including the 6-round non-linear data transformation unit 210.

In FIG. 37, the 6-round non-linear data transformation unit 210 includes even rounds of non-linear data transformation units 280 as shown in FIGS. 3 and 4. Data A is transformed into data A' by a first input normal data transformation unit 256, the data A' is input to a first input port 261, the data A input from the first input port 261 is output from a first output port 263 as data $A_1$'. Further, data B input from a second input port 262 is output from a second output port 264 as data $B_1$. The data $B_1$ output from the second output port 264 is transformed into data $B_1$' by a second output inverse data transformation unit 279.

The data $A_1$' output from the first output port 263 of the encryption unit 200 is input to the second input port 262 of the decryption unit 500 as the data $A_1$'. The data $B_1$' output from the second output inverse data transformation unit 279 is input to the first input normal data transformation unit 256 as the data $B_1$', and output as the data $B_1$.

The non-linear data transformation unit 210 inputs the data $B_1$ and outputs the data B. Further, the non-linear transformation unit 210 inputs the data $A_1$' and outputs the data A'. The second output inverse data transformation unit 279 inputs the data A' and outputs the data A.

Figure 38:
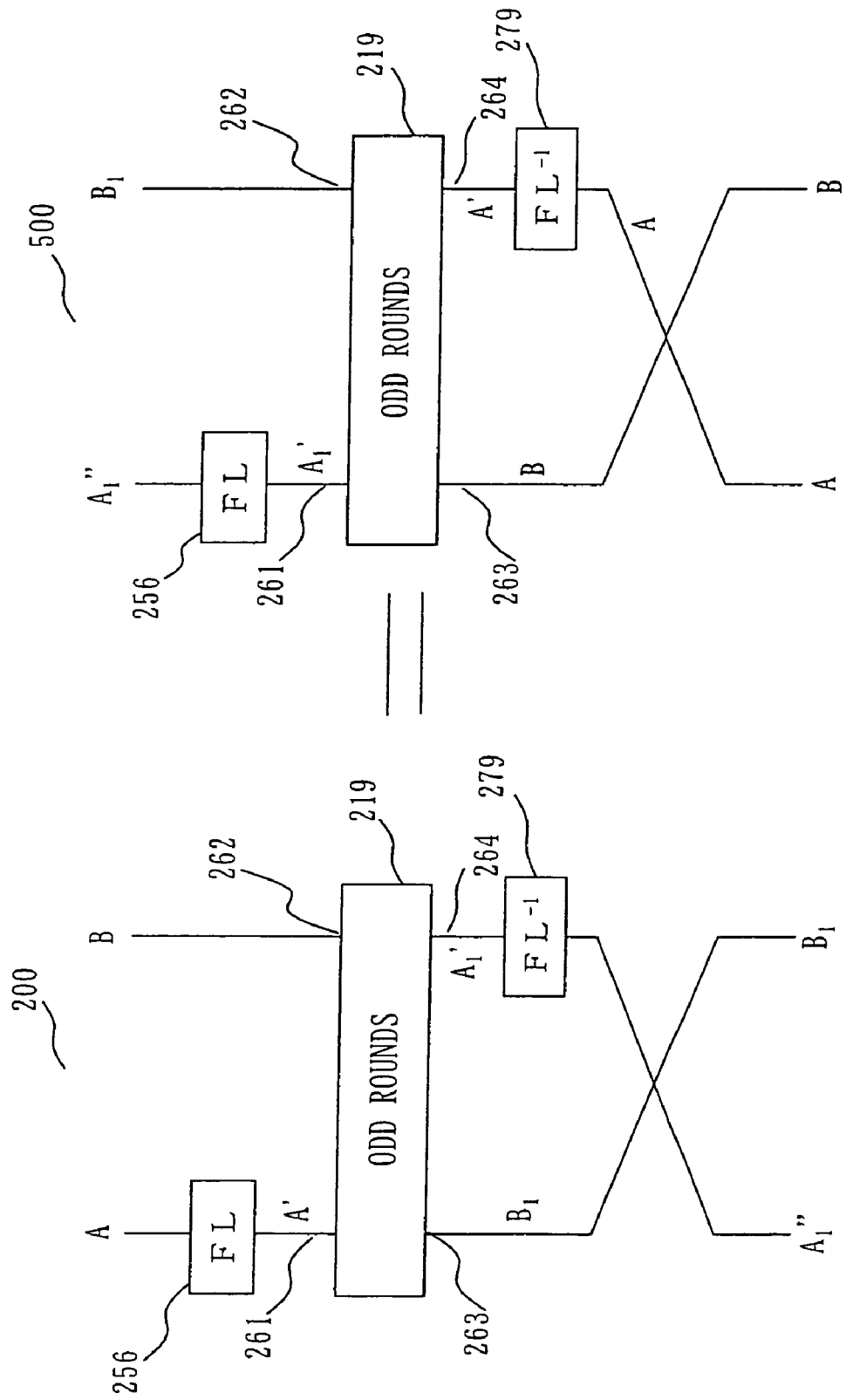
FIG. 38 shows another configuration of the encryption unit 200 or the decryption unit 500.

In FIG. 38, the odd-round non-linear data transformation unit 219 includes odd rounds of non-linear data transformation units 280. Accordingly, the data A' input from the first input port 261 is output from the second output port 264 as the data $A_1$'. Then the data $A_1$' is transformed by the second output inverse data transformation unit 279, and output as the data $A_1$". Further, the data B input to the second input port 262 is output from the first output port 263 as the data $B_1$.

The data $B_1$ output from the first output port 262 of the encryption unit 200 is input to the second input port 262 of the decryption unit 500 as the data $B_1$. The data $A_1$" output from the second output inverse data transformation unit 279 of the encryption unit 200 is input to the decryption unit 500 as the data $A_1$" and input to the first input normal data transformation unit 256.

In cases of FIGS. 37 and 38, the encryption unit 200 and the decryption unit 500 have the same configuration, performing encryption and decryption.

FIG. 39 shows a case in which the second input normal data transformation unit 257 is provided at the second input port 262, and the first output inverse data transformation unit 278 is provided at the first output port 263.

Figure 40:
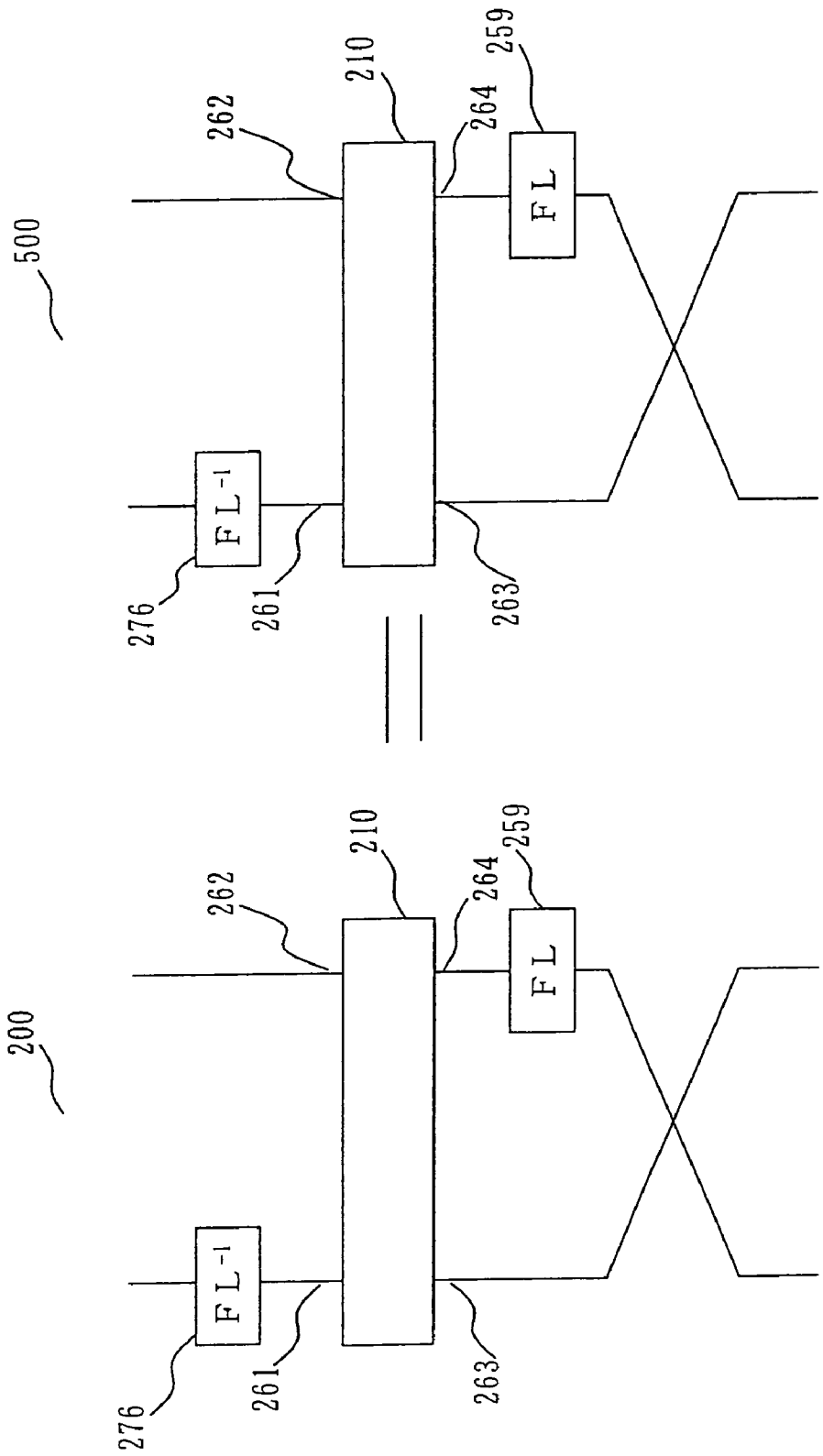
FIG. 40 shows another configuration of the encryption unit 200 or the decryption unit 500.

FIG. 40 shows a case in which the first input inverse data transformation unit 276 is provided at the first input port 261, and the second output normal data transformation unit 259 is provided at the second output port 264.

Figure 41:
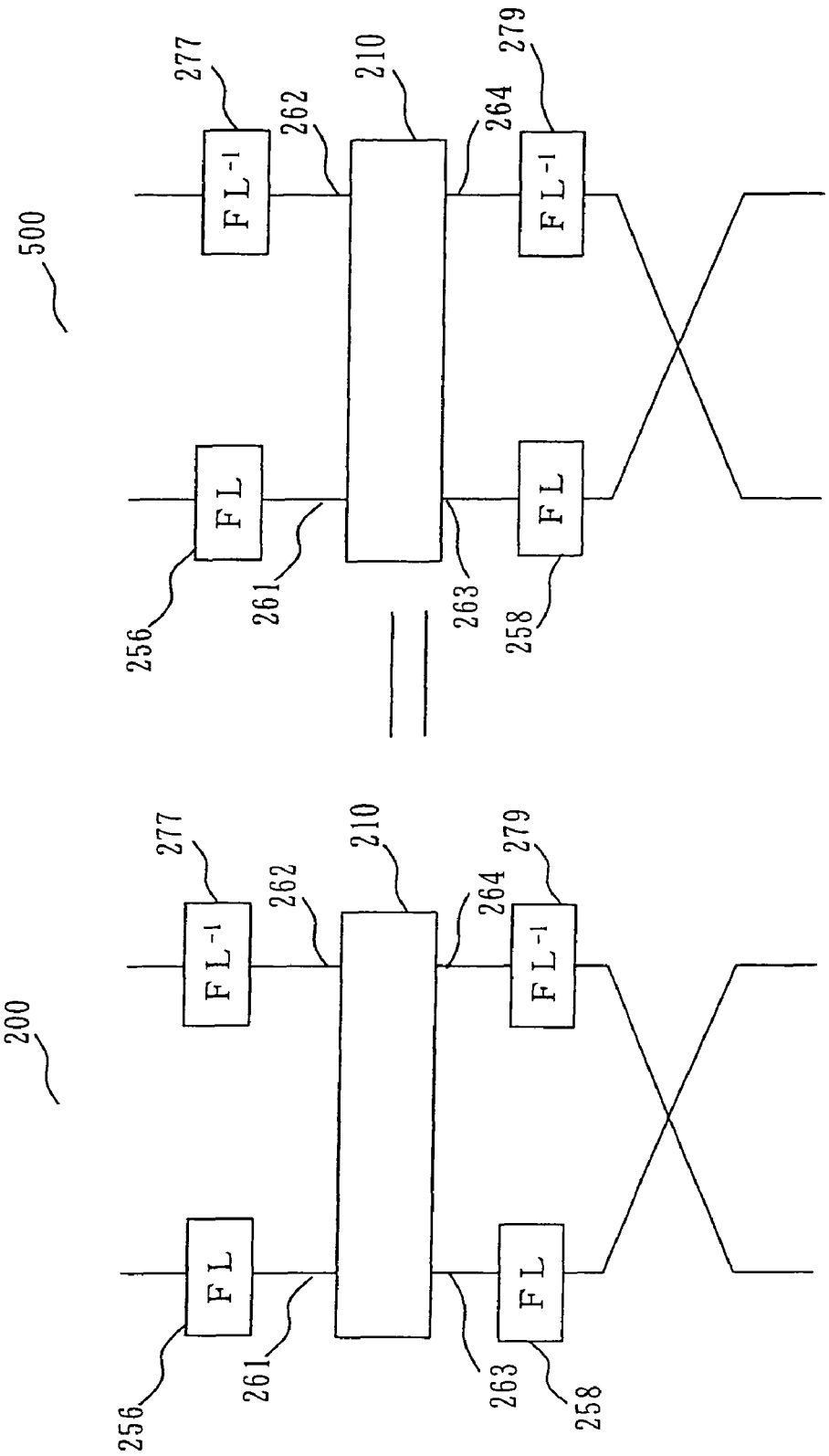
FIG. 41 shows another configuration of the encryption unit 200 or the decryption unit 500.

FIG. 41 shows a case in which the normal/inverse data transformation units 256, 258 are provided at the left input/output ports 261, 263, and the inverse data transformation units 277, 279 are provided at the right input/output ports 262, 264.

Figure 42:
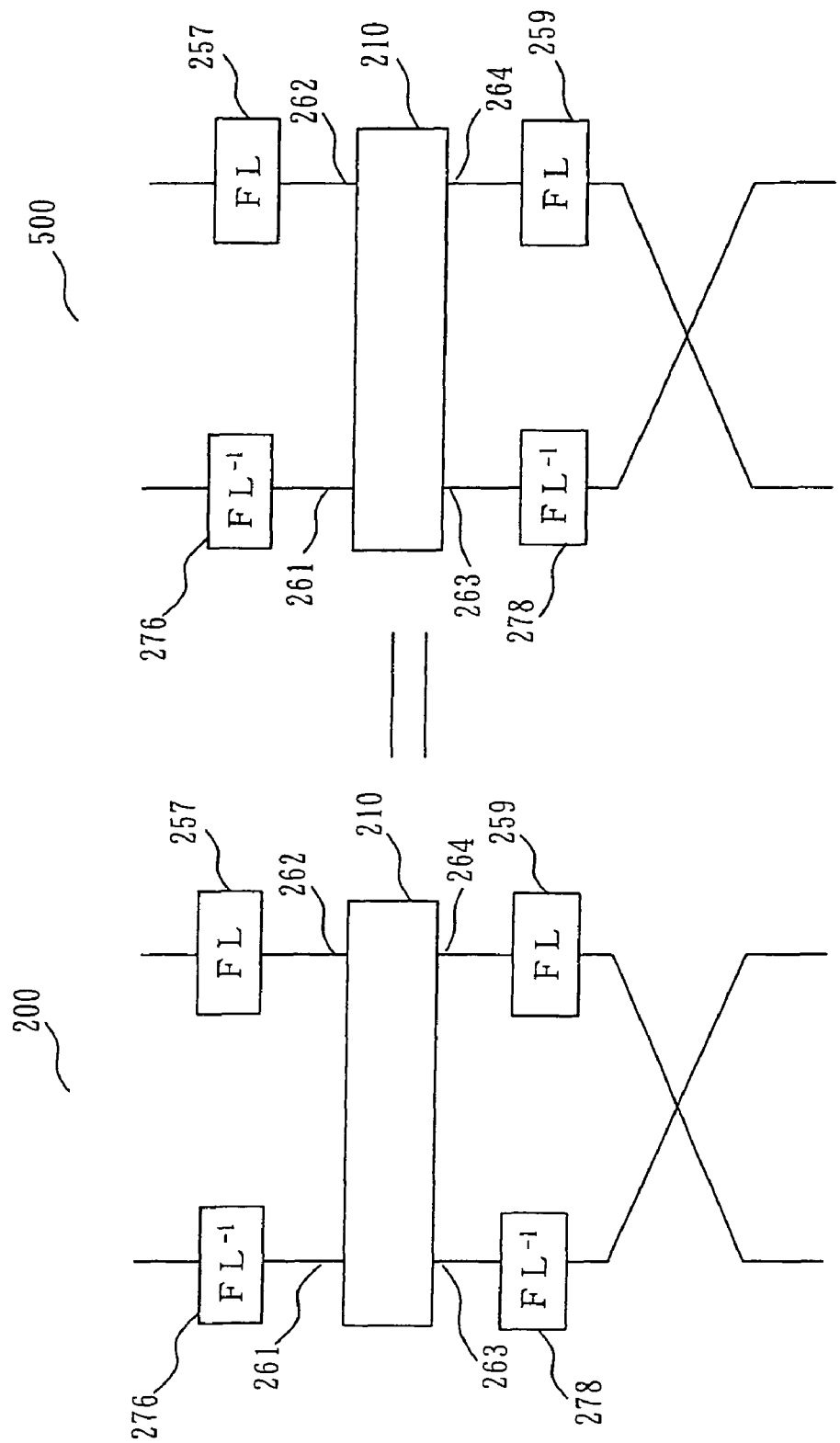
FIG. 42 shows a configuration in which the units of FIG. 39 and FIG. 40 are combined.

FIG. 42 shows a case in which FIGS. 39 and 40 are combined.

Another case can be implemented by combining FIGS. 37 and 39, which is not shown in the figure. Further, FIGS. 38 and 39 can be combined. Further, the 6-round (even-round) non-linear data transformation unit 210 can be replaced with the odd-round non-linear data transformation unit 219 in FIGS. 37, 39 through 42, which are not shown in the figures. In cases of FIGS. 39 through 42, the encryption unit and the decryption unit can be implemented by the same configuration.

Embodiment 2

Figure 11:
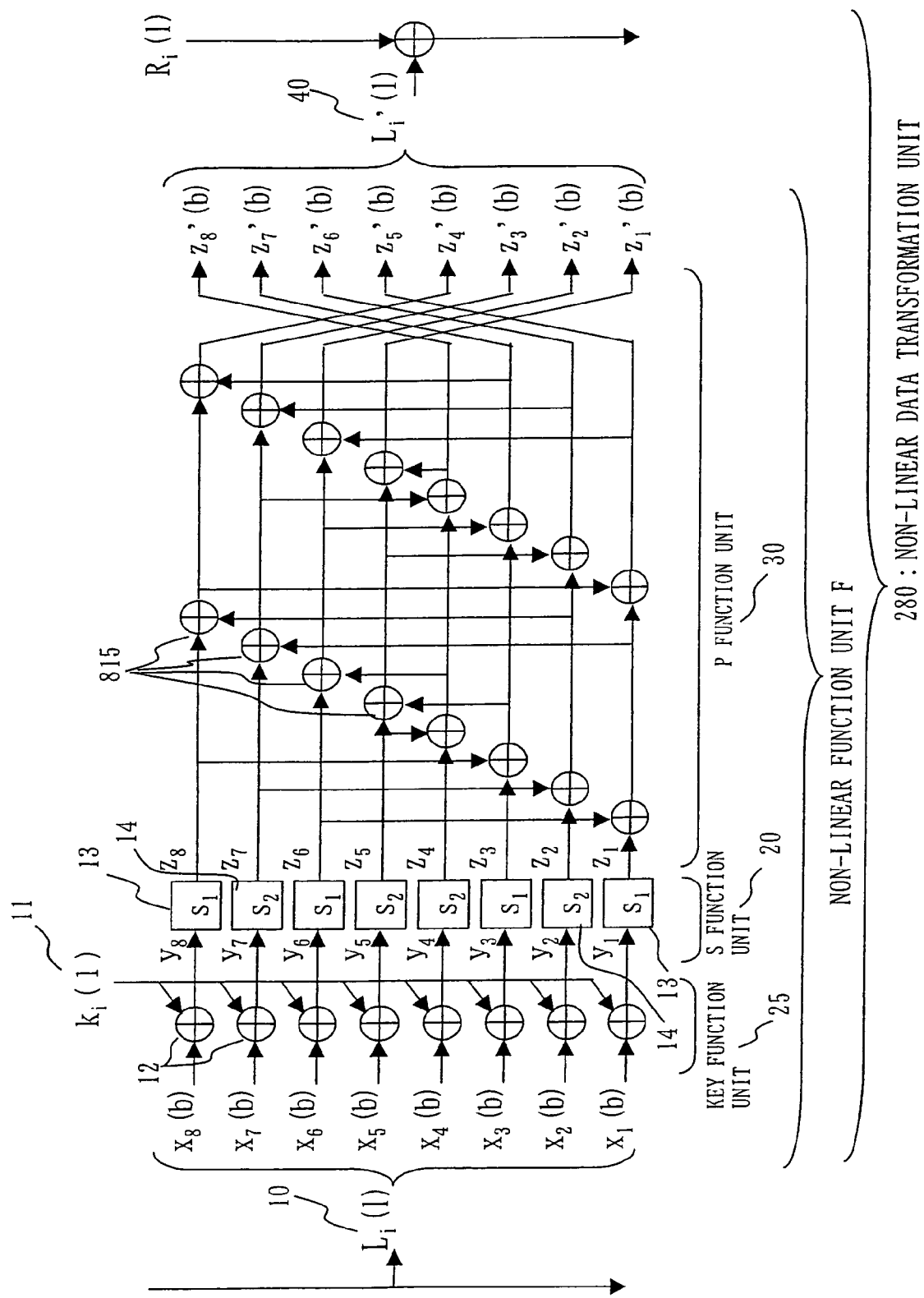
FIG. 11 shows a non-linear function unit F.

FIG. 11 shows a configuration of a non-linear function unit F of the non-linear data transformation unit 280.

The non-linear function unit F inputs F function input data 10, performs non-linear transformation, and outputs F function output data 40. The F function input data 10 having 64 bits is divided into eight pieces of data, and processed in the unit of 8 bits. Each 8-bit data is input to each of eight XOR circuits 12 of a key function unit 25, XORed with an extension key 11, and performed non-linear transformation using substitution at an S function unit 20. Then, at a P function unit 30, two pieces of 8-bit data are XORed by sixteen XOR circuits 815, and the 64-bit F function output data 40 is output. In the S function unit 20, four S-box first transformation units 13 and four S-box second transformation units 14 are provided.

Figure 12:
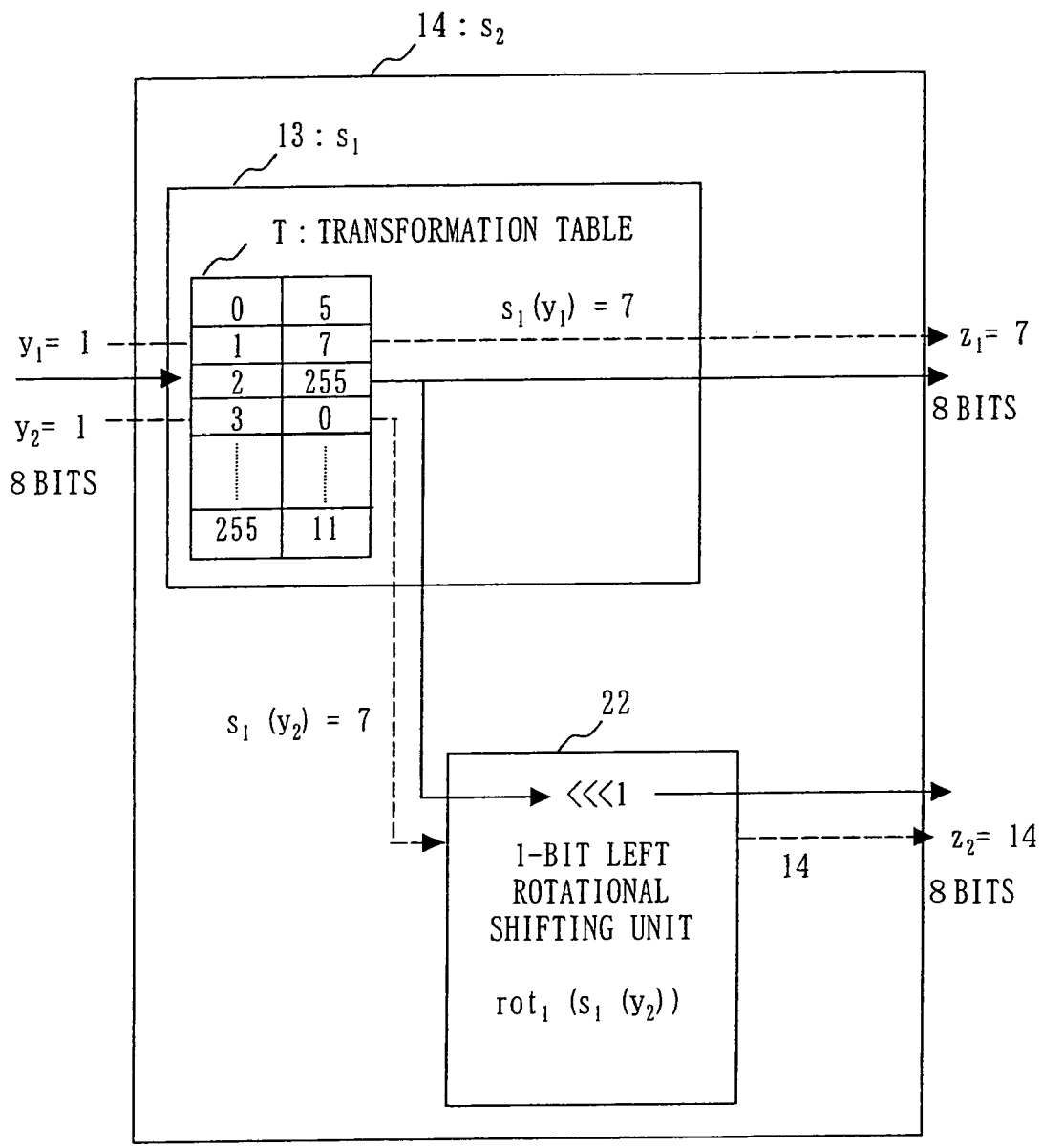
FIG. 12 shows a configuration of an S-box first transformation unit 13 and an S-box second transformation unit 14.

FIG. 12 shows an implementation example of the S-box first transformation unit 13 and the S-box second transformation unit 14.

Inside the S-box first transformation unit 13, a transformation table T is provided. The transformation table T previously stores values of 0 through 255 arbitrarily (at random) corresponding to values of 0 through 255. The transformation table T inputs values of 0 through 255 and outputs the value (value of 0 through 255) corresponding to each value. For example, when 1 is input, the transformation table T outputs 7. The transformation table T performs non-linear transformation determined under consideration of security, e.g., checking if the function is bijective or not, the maximum differential probability is sufficiently small or not, and so on.

The S-box second transformation unit 14 includes the S-box first transformation unit 13 and a 1-bit left rotational shifting unit 22 (in the figure, "<<<" of "<<<1" shows the left rotational left shift and "1" shows 1 bit). The 1-bit left rotational shifting unit 22 performs left rotational shift by 1 bit to an output from the S-box first transformation unit 13. For example, when 1 is input, the S-box first transformation unit 13 outputs 7, and 1-bit left rotational shifting unit 22 outputs 14.

If the S-box first transformation unit 13 and the S-box second transformation unit 14 are configured as shown in FIG. 12, one can obtain an effect, which is similar to the case in which two kinds of the transformation tables T are provided, though it is not required to have two kinds of transformation tables T. By including only one transformation table T, the memory usage required for storing the transformation table T can be decreased, and the circuit scale can be reduced.

Figure 27:
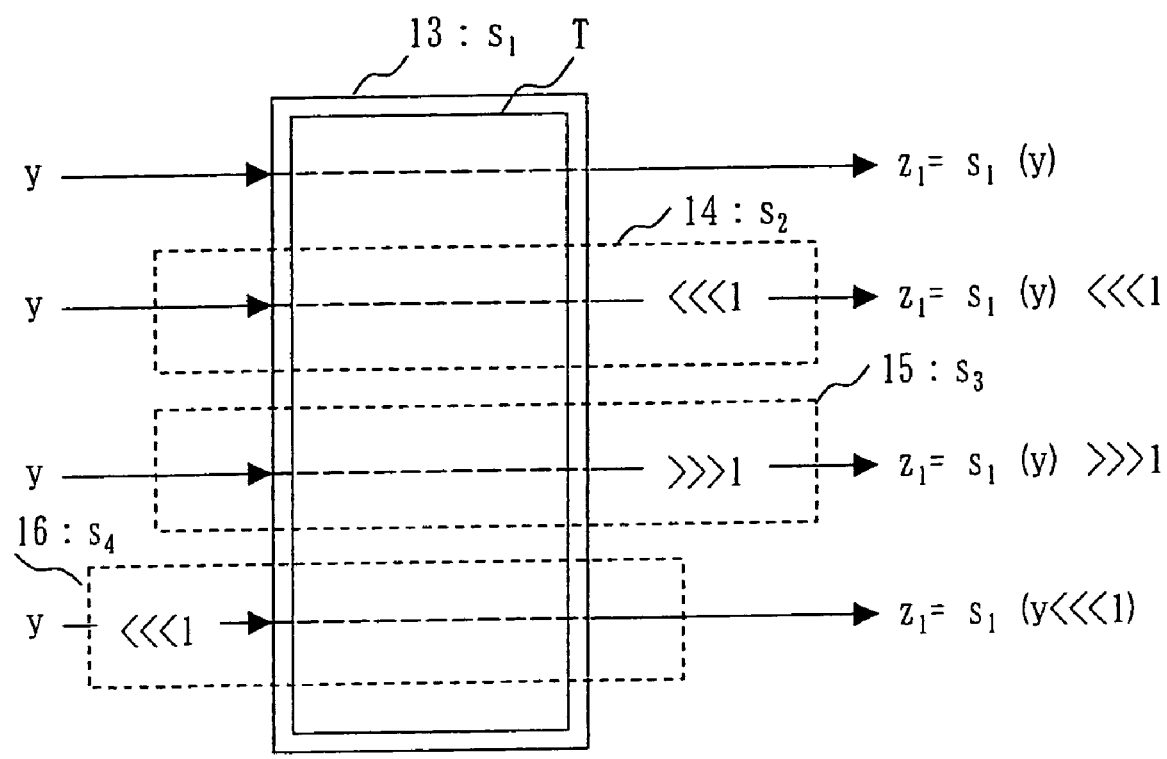
FIG. 27 shows another example of S-box transformation units.

Further, as shown in FIG. 27, by providing a 1-bit right rotational shifting unit (">>>1" of the S-box third transformation unit 15 in FIG. 27) as well as, or, instead of the 1-bit left rotational shifting unit 22, a similar effect can be obtained to a case in which a different transformation table T is further provided. In another way, it is also possible to transform input data y using the transformation table T after shifting the input data y by the 1-bit left rotational shifting unit ("<<<1" of the S-box fourth transformation unit 16 in FIG. 27) provided for the input data y. FIG. 27 shows cases of $s(y)$, $s(y)<<<1$, $s(y)>>>1$, $s(y<<<1)$, but cases of $s(y>>>1)$, $s(y<<<1)<<<1$, $s(y<<<1)>>>1$, $s(y>>>1)<<<1$, $s(y>>>1)>>>1$ are also applicable. By making the shifted amount 11 bit, it sometimes becomes possible to perform faster than cases of shifting by 3 bits or 5 bits in case that CPUs, etc. have only 1-bit shift command. Further, when this shifting process is performed by hardware which performs only 1-bit shifting, it sometimes becomes possible to perform faster. Further, the shifting is not limited to performed by 1 bit, but an arbitrary number of bits such as 2 bits, 3 bits can be used. By shifting by an arbitrary number of bits, it sometimes becomes possible to obtain a similar effect to providing different kinds of tables.

Figure 28:
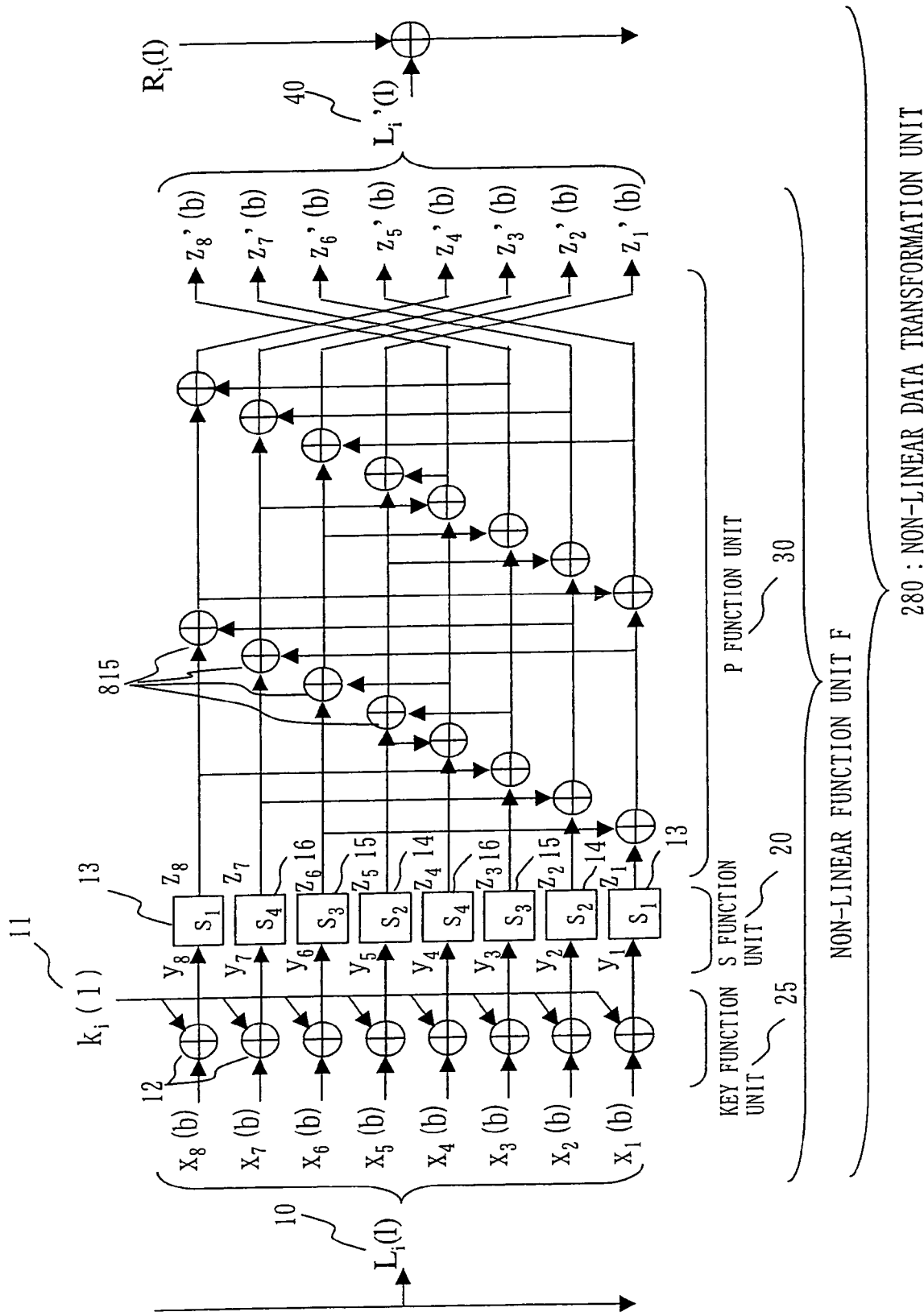
FIG. 28 shows a non-linear function unit F which is equipped with the first through fourth S-box transformation units.

FIG. 28 shows an S function unit 20 using the four S-box first through fourth transformation units 13, 14, 15, 16 shown in FIG. 27.

Figure 31:
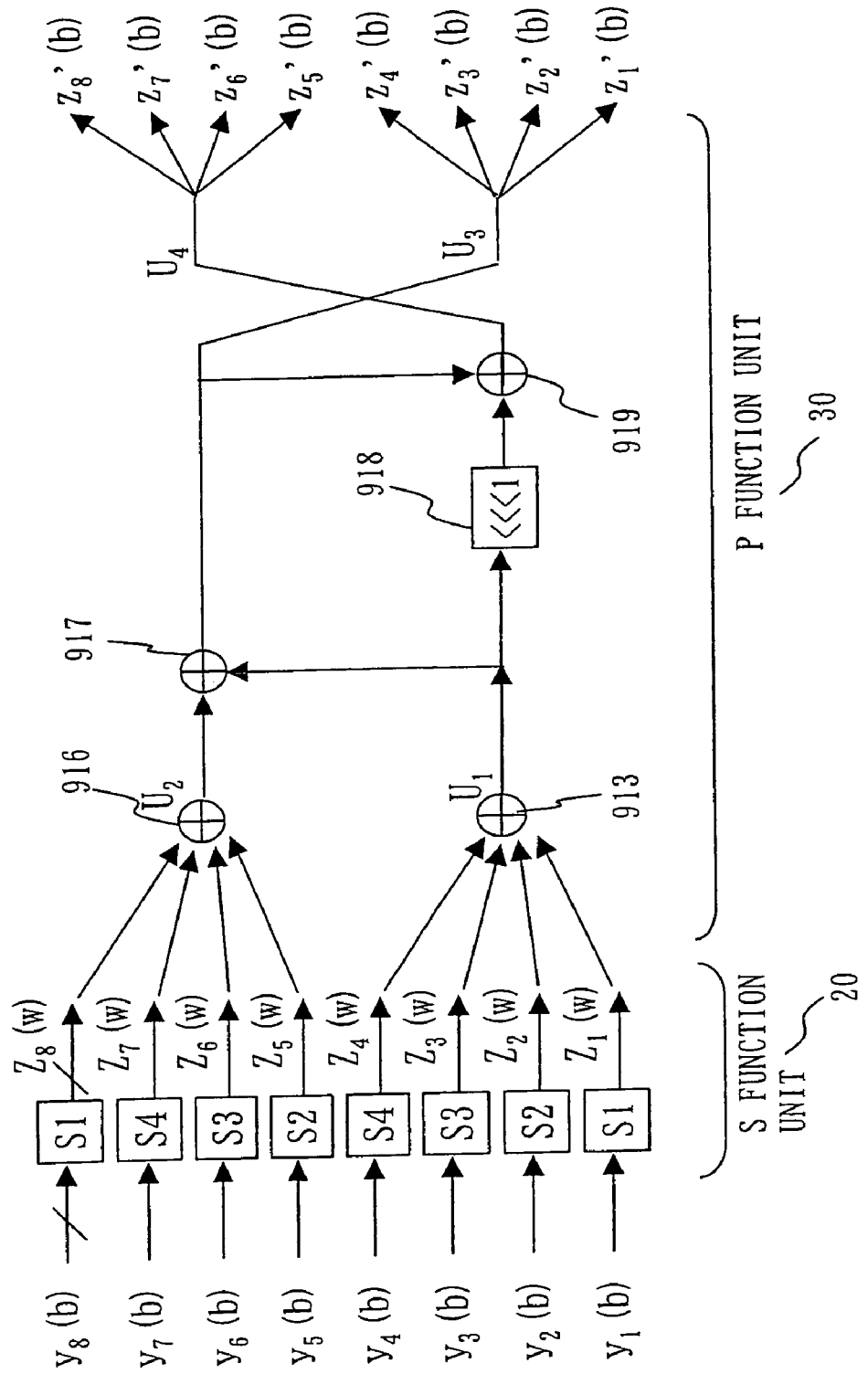
FIG. 31 shows another configuration of a P function unit 30.

Another configuration of the P function unit 30 is shown in FIG. 31.

From 8-bit input data $y_1$, $y_2$, $y_3$, $y_4$, 32-bit data $Z_1$, $Z_2$, $Z_3$, $Z_4$ are obtained by referring to S1, S2, S3, S4, respectively, and they are XORed at a circuit 913. From 8-bit input data $y_5$, $y_6$, $y_7$, $y_8$, 32-bit data $Z_5$, $Z_6$, $Z_7$, $Z_8$ are obtained by referring to S2, S3, S4, S1, respectively, and they are XORed at a circuit 916. This XORed result $U_2$ and the former XORed result $U_1$ are XORed at a circuit 917 to output $z_1'$, $z_2'$, $z_3'$, $z_4'$. Then, the XORed result $U_1$ from the circuit 913 is shifted to the left by 1 byte (in FIG. 31, "<<<1" represents 1-byte rotational shift, not 1-bit rotational shift) at a circuit 918. The shifted result is XORed with the output from the circuit 917 to output $z_5'$, $z_6'$, $z_7'$, $z_8'$.

Figure 33:
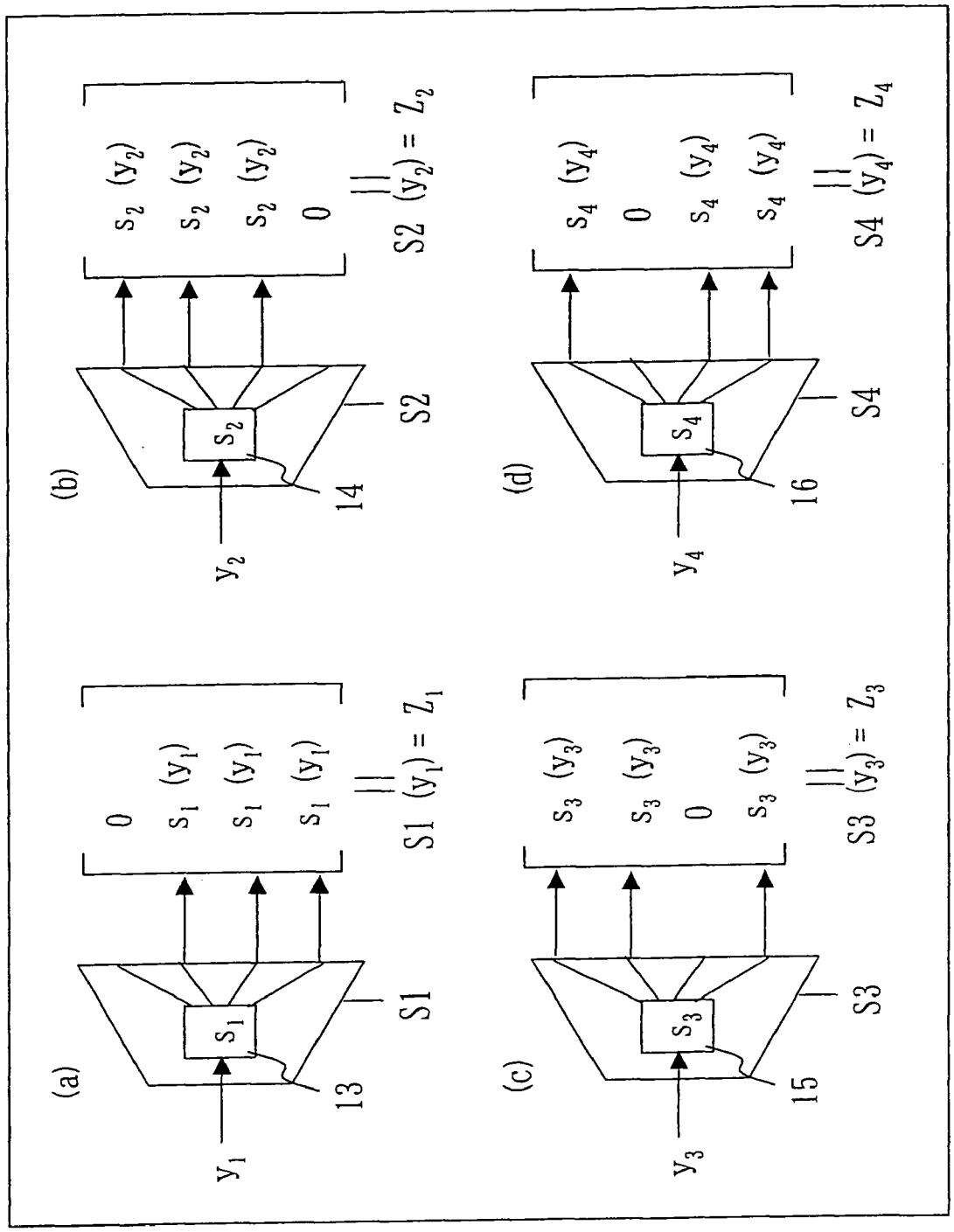
FIG. 33 shows configurations and operations of S1 through S4 of FIG. 31.

As shown in (a) through (d) of FIG. 33, S1 is configured using the S-box first transformation unit 13, S2 is configured using the S-box second transformation unit 14, S3 is configured using the S-box third transformation unit 15, S4 is configured using the S-box fourth transformation unit 16. The 8-bit output data from each transformation unit is copied four times to make 32-bit data, and further, 32-bit data is masked to output only three pieces of the data (24-bit).

The 1-byte rotational shift of the circuit 918 is a cyclic shifting by a unit of bit length (8 bits=1 byte) which is processed by the S-box.

Figure 32:
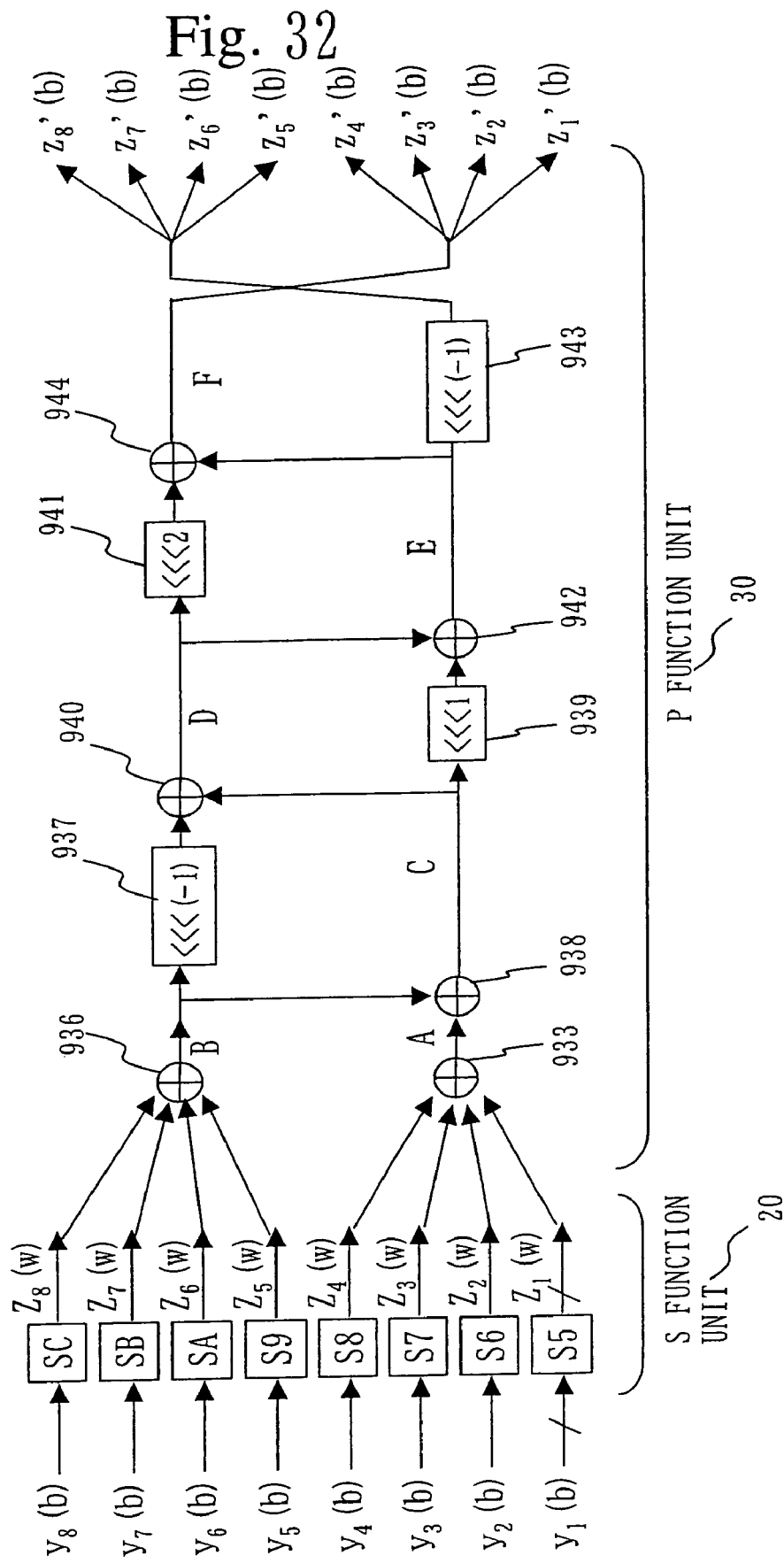
FIG. 32 shows another configuration of the P function unit 30.

FIG. 32 shows the P function unit whose configuration is equivalent to FIG. 31, but implementation is different.

From 8-bit input data $y_1$, $y_2$, $y_3$, $y_4$, 32-bit data $Z_1$, $Z_2$, $Z_3$, $Z_4$ are obtained by referring to S5, S6, S7, S8, and they are XORed at a circuit 933 to output an operation result A. From 8-bit input data $y_5$, $y_6$, $y_7$, $y_8$, 32-bit data $Z_5$, $Z_6$, $Z_7$, $Z_8$ are obtained by referring to S9, SA, SB, SC, and they are XORed at a circuit 936 to output an operation result B. The operation result B is shifted rotationally to the right by 1 byte (in FIG. 32, similarly to FIG. 31, shifting is performed by a unit of bit length (8 bits=1 byte) which is processed by the S-box, not 1 bit) at a circuit 937 and the operation result B and the operation result A are XORed at a circuit 938. This operation result C is shifted rotationally to upper (left) by 1 byte at a circuit 939, and the operation result C is also XORed with the operation result A at a circuit 940. This operation result D is shifted rotationally to upper (left) by 2 byte at a circuit 941, and the operation result D is also XORed with the output from the circuit 939 at a circuit 942. This operation result E is shifted rotationally (to the right) by 1 byte at a circuit 943, and the operation result E is also XORed with the output from the circuit 941 at a circuit 944. Output F from the circuit 944 is output as $z_1'$, $z_2'$, $z_3'$, $z_4'$, and output from the circuit 943 is output as $z_5'$, $z_6'$, $z_8'$.

S5 and SC are configured using the S-box first transformation unit 13 and a logical shift, S6 and S9 are configured using the S-box second transformation unit 14 and a logical shift, S7 and SA are configured using the S-box third transformation unit 15 and a logical shift, S8 and SB are configured using the S-box fourth transformation unit 16 and a logical shift. The logical shift is used for outputting 8-bit output data from each transformation unit to a predetermined location within the 32-bit output data. The logical shift is set to shift to the left by 0 byte in S5 and SA, 1 byte in S6 and SB, 2 bytes in S7 and SC, 3 bytes in S8 and S9. Namely, assuming 8-bit output from the transformation unit as z, 32-bit output can be represented as [0,0,0,z] (0 shows each of eight bits is 0) in S5 and SA, [0,0,z,0] in S6 and SB, [0,z,0,0] in S7 and SC, [z,0,0,0] in S8 and S9.

It is possible to implement using substitution tables whose input is 8-bit and output is 32-bit, which is calculated for directly producing predetermined output.

Figure 26:
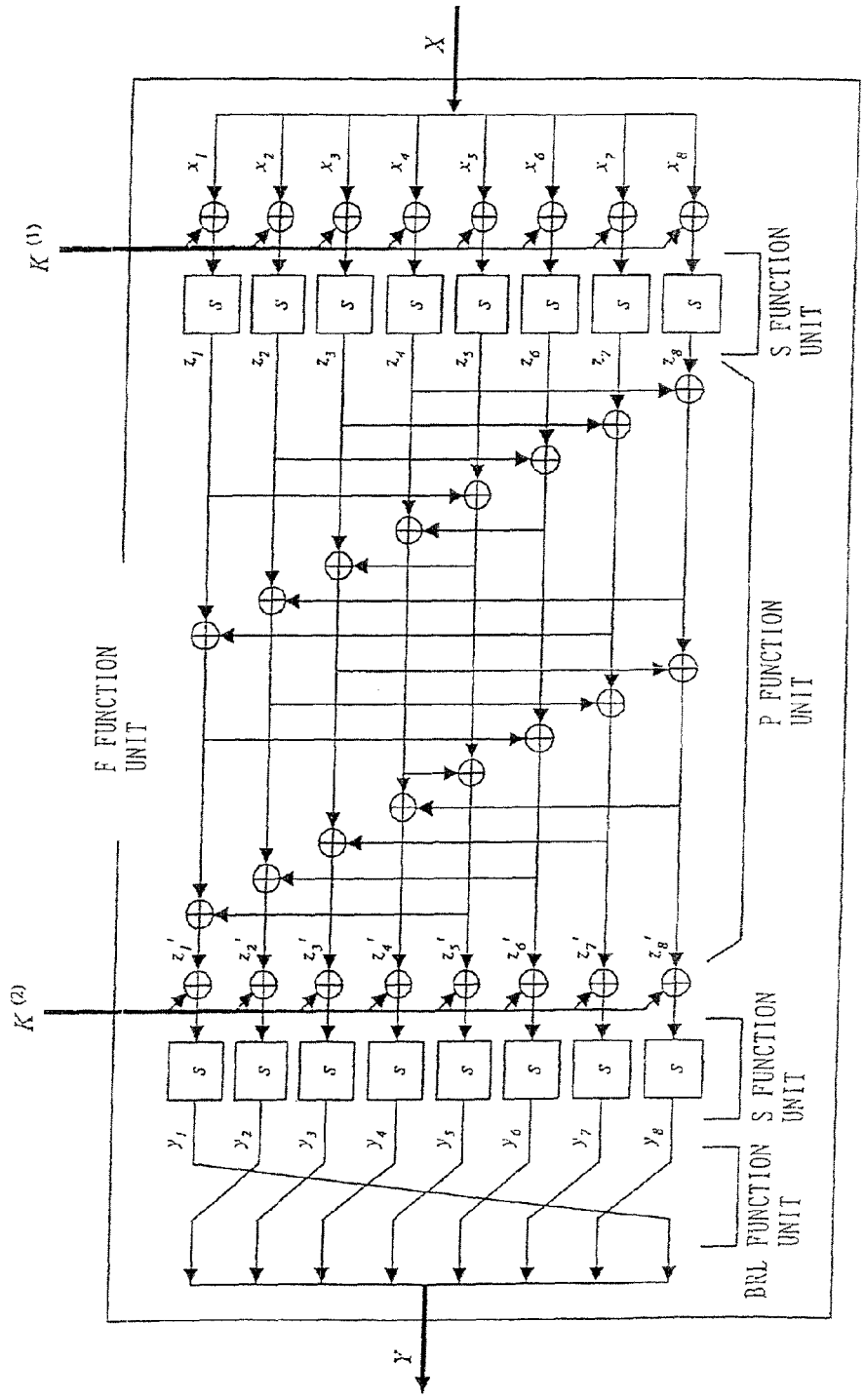
FIG. 26 shows a configuration of the non-linear function of 128-bit block cipher E2.

In cases of FIGS. 31 and 32, the apparatus can be provided, which performs transformation at higher speed than the transformation used for the conventional E2 cipher shown in FIG. 26, and further on which flexible implementation is possible.

In FIG. 11, when the S-boxes of the S function unit 20 are configured respectively by different kinds of S-boxes, eight transformation tables T are required. On the other hand, when the S-boxes are configured as shown in FIG. 12, the memory usage required for storing the transformation tables T can be reduced to at least a half.

Further, eight pieces of 8-bit data are input time-divisionally to the S-box first transformation unit 13 and the S-box second transformation unit 14 shown in FIG. 12, so that the conventional eight respective S-boxes can be replaced by the S-box first transformation unit 13 and the S-box second transformation unit 14.

Figure 13:
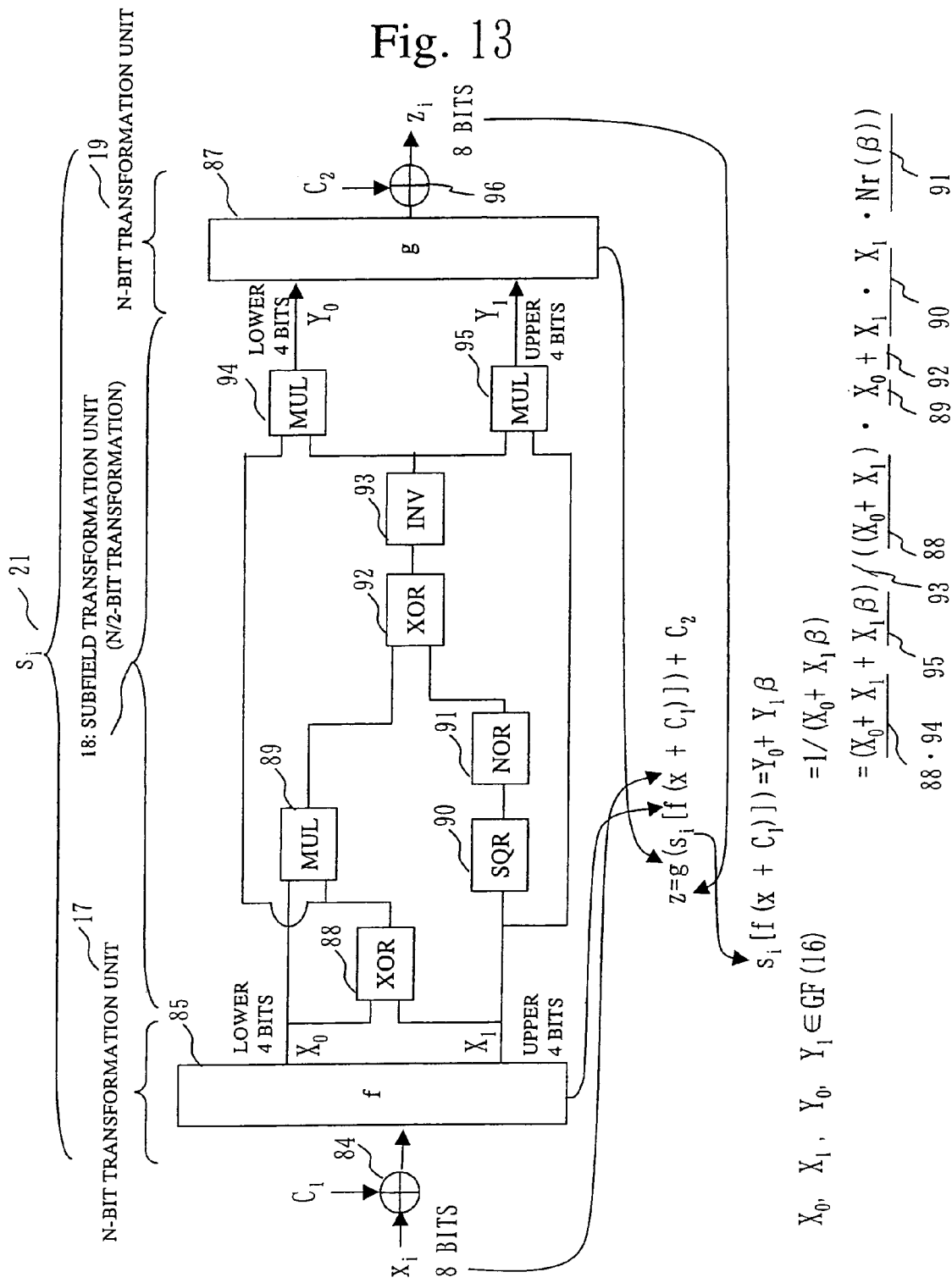
FIG. 13 shows a configuration of an S-box transformation unit 21.

FIG. 13 shows another example of the S-box of the S function unit 20.

The concrete configuration is explained in detail in Matsui and Sakurai, "Galois Field division circuit and shared circuit for multiplication and division" (Japanese Patent Registration No. 2641285 [May 2, 1997]).

Figure 14:
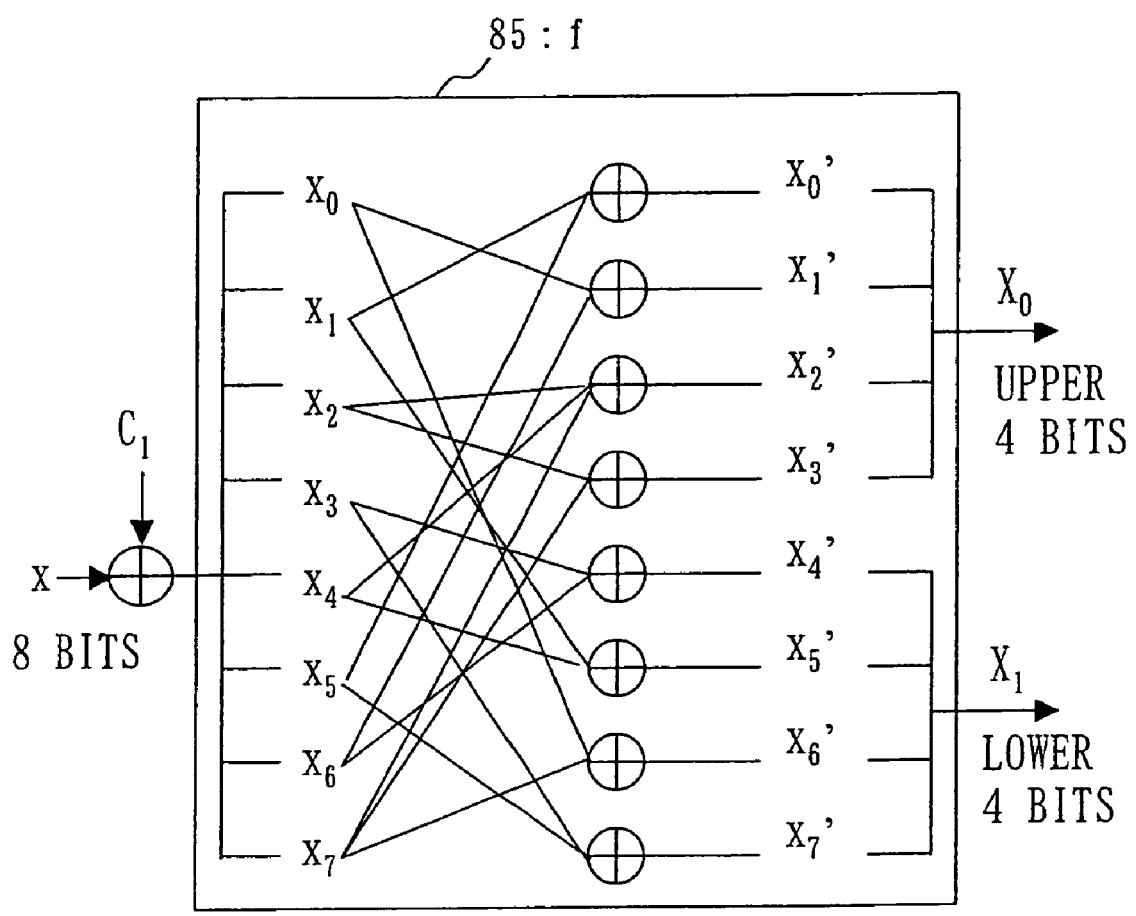
FIG. 14 shows a configuration of a linear transformation unit 85.
Figure 15:
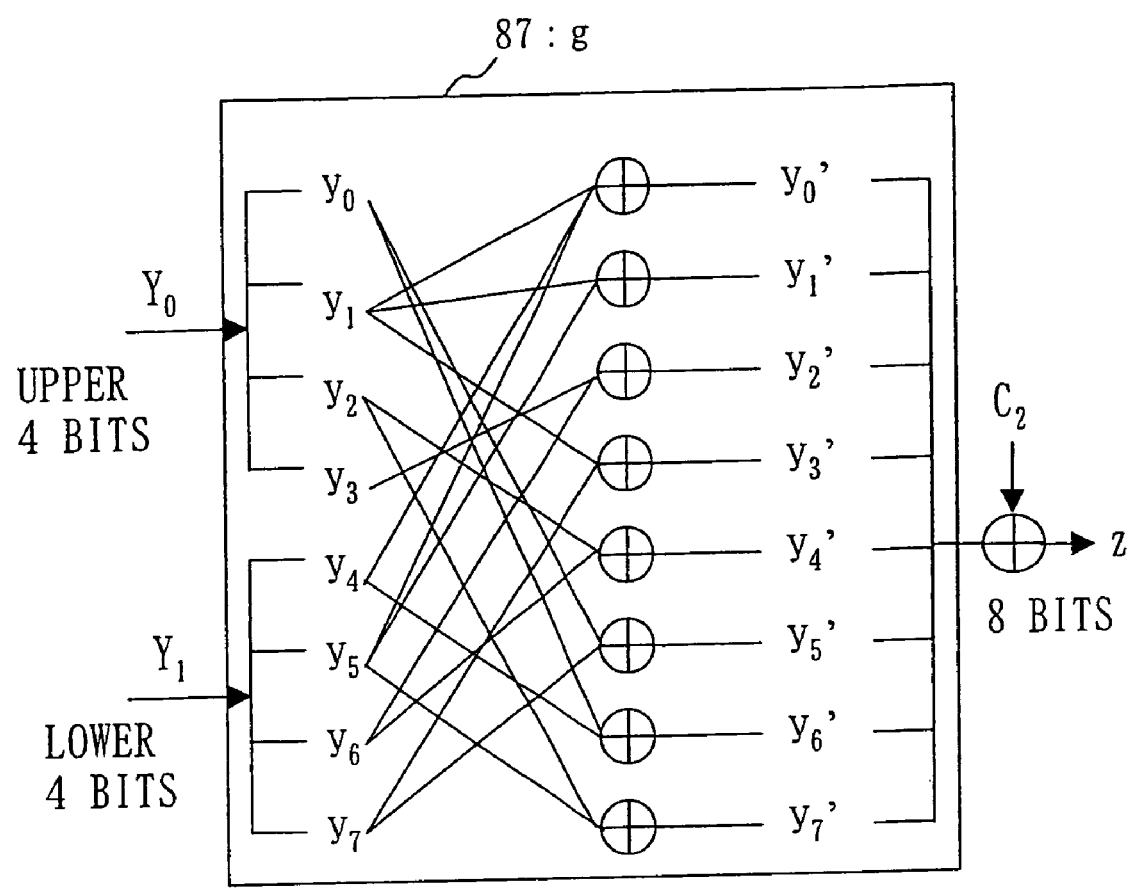
FIG. 15 shows a configuration of a linear transformation unit 87.

8-bit data is input to the S-box transformation unit 21, and 8-bit data is output. The S-box transformation unit 21 is configured by an N-bit (here, N=8) linear transformation unit 17, a subfield transformation unit 18, and an N-bit linear transformation unit 19. The N-bit linear transformation unit 17 performs operations of 8-bit data. The subfield transformation unit 18 performs operations of only 4-bit data which are elements of Galois Field GF ($2^4$). The N-bit linear transformation unit 19 performs an operation of 8-bit data. A linear transformation unit 85 of the N-bit linear transformation unit 17 is a circuit which performs the linear transformation shown in FIG. 14. A linear transformation unit 87 is a circuit which performs the linear transformation shown in FIG. 15.

The linear transformation unit 85 can be replaced by a circuit which performs an affine transformation (a linear transformation can be considered as one style of affine transformations). Similarly, the linear transformation unit 87 can be replaced by a circuit which performs another affine transformation. The linear transformation unit 85 transforms 8-bit data (X) into 8-bit data (X'). The obtained 8-bit data (X') is assumed to be an element of Galois Field ($2^8$). The upper 4-bit data and the lower 4-bit data ($X_1$ and $X_0$) of data X' are respectively assumed as elements of the subfield Galois Field ($2^4$) and output to the subfield transformation unit 18. Here, for example, let an element β of GF ($2^8$) be an element which satisfies the irreducible polynomial $X^8+X^6+X^5+X^3+1=0$, and $\alpha=\beta^{238}$, a base of the subfield GF ($2^4$) can be represented as [1, $\alpha$, $\alpha^2$, $\alpha^3$]. If the elements of GF ($2^4$), $X_0$, $X_1$, are represented using this, the following relationship can be established as $X'=X_0+\beta X_1$. (For details, refer to Matsui and Sakurai, "Galois Field division circuit and shared circuit for multiplication and division" (Japanese Patent Registration No. 2641285 [May 2, 1997])). The subfield transformation unit 18 is configured only by operation units each of which performs operations of 4-bit data.

Here, as an example of extracting "subfield", the subfield GF ($2^m$) where n=2m can be considered for given GF ($2^n$). In this example, n=8, m=4.

The subfield transformation unit 18 is an inverse element circuit using the subfield constructed by the circuit shown in "Galois Field division circuit and shared circuit for multiplication and division" (U.S. Pat. No. 2,641,285 [May 2, 1997]). As an operation result of this inverse element circuit, upper 4-bit data and lower 4-bit data ($Y_1$ and $Y_0$), each of which can be assumed as an element of GF ($2^4$), are output to the linear transformation unit 87 as 8-bit data Y which can be assumed as an element of GF ($2^8$), where $Y=Y_0+/3 Y_1$. As explained above, this inverse element circuit is a circuit for computing $Y=Y_0+13 Y_1=1/(X_0+X_1)$. Further, there are some ways of taking a "basis", such as a "polynomial basis" and a "normal basis", in representing the element of "finite field" (how to take a basis) in the inverse element circuit.

A first characteristic of the S-box transformation unit 21 shown in FIG. 13 is to compute data with a bit width (4 bits) which is a half of the bit width (8 bits) of the data input for the non-linear transformation. Namely, the inverse element circuit is characterized by performing operations of only 4-bit data.

Although the computation speed may be decreased by performing only 4-bit operations. This case has an advantage in that a scale of a whole circuit can be much smaller than a case of performing operations of 8-bit data.

Further, a second characteristic of the S-box transformation unit 21 is that the N-bit linear transformation unit 17 and the N-bit linear transformation unit 19, where N=8, are provided at both sides of the subfield transformation unit 18. When the S-box transformation unit 21 is implemented using the subfield transformation unit 18, there is an advantage that a scale of the whole circuit can be reduced and the configuration becomes simpler compared with a case employing a transformation table T storing random values, while on the contrary, the security may be decreased. Accordingly, the linear transformations or the affine transformations are performed at both sides of the subfield transformation unit 18, so that the reduction of the security level due to implementing using the subfield transformation unit 18 can be recovered.

In FIG. 13, the linear transformations are performed at both sides of the subfield transformation unit 18, however, the linear transformation can be performed only at one side. In another way, the linear transformation can be performed at one side, and the affine transformation can be performed at the other side.

Figure 29:
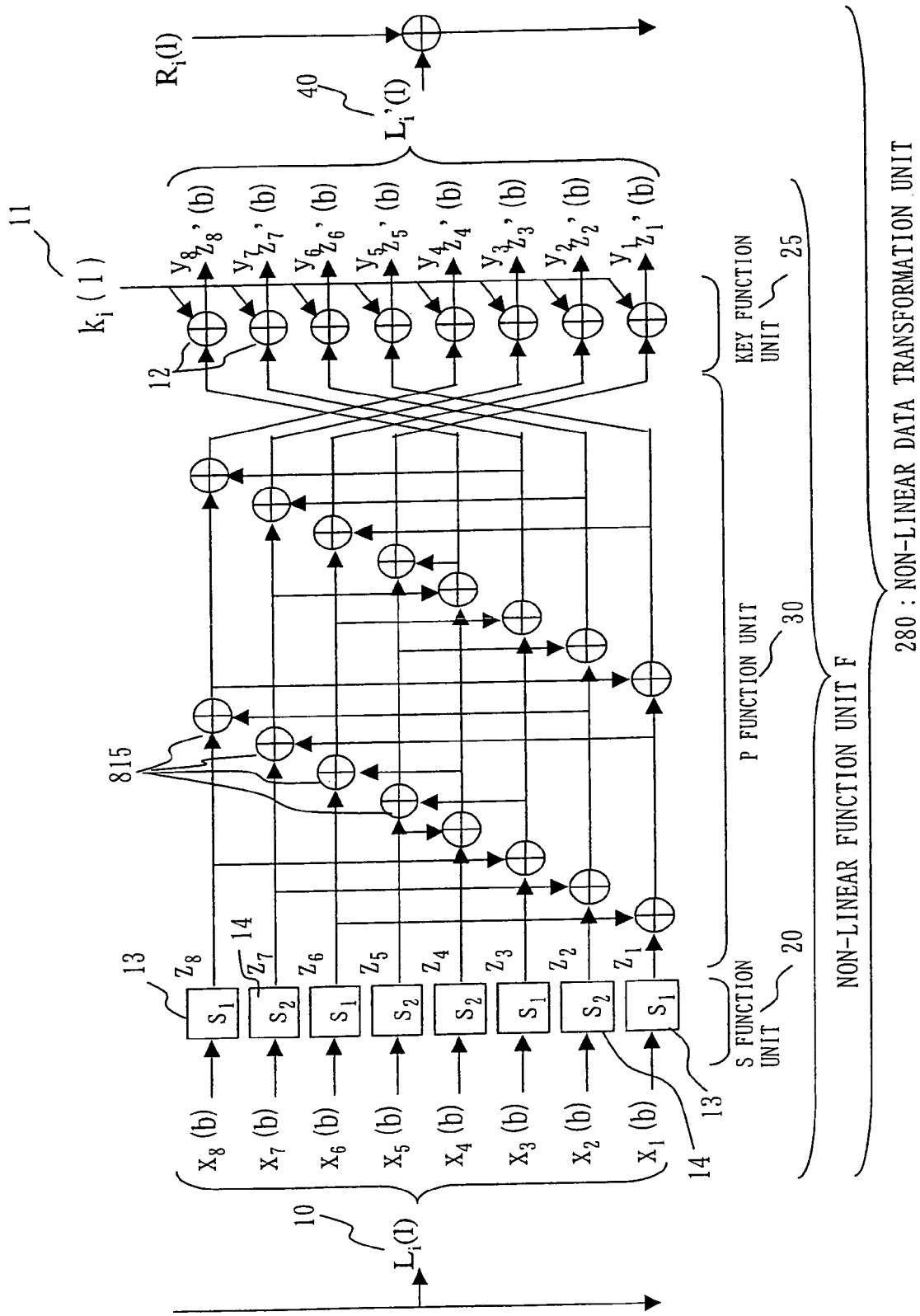
FIG. 29 shows another non-linear function unit F in which a location of the key function unit 25 is moved.

FIG. 29 shows a case in which the key function unit 25 shown in FIG. 11, that is, the key function unit 25 placed before the S function unit 20 and the P function unit 30, is now placed after the S function unit 20 and the P function unit 30.

Figure 30:
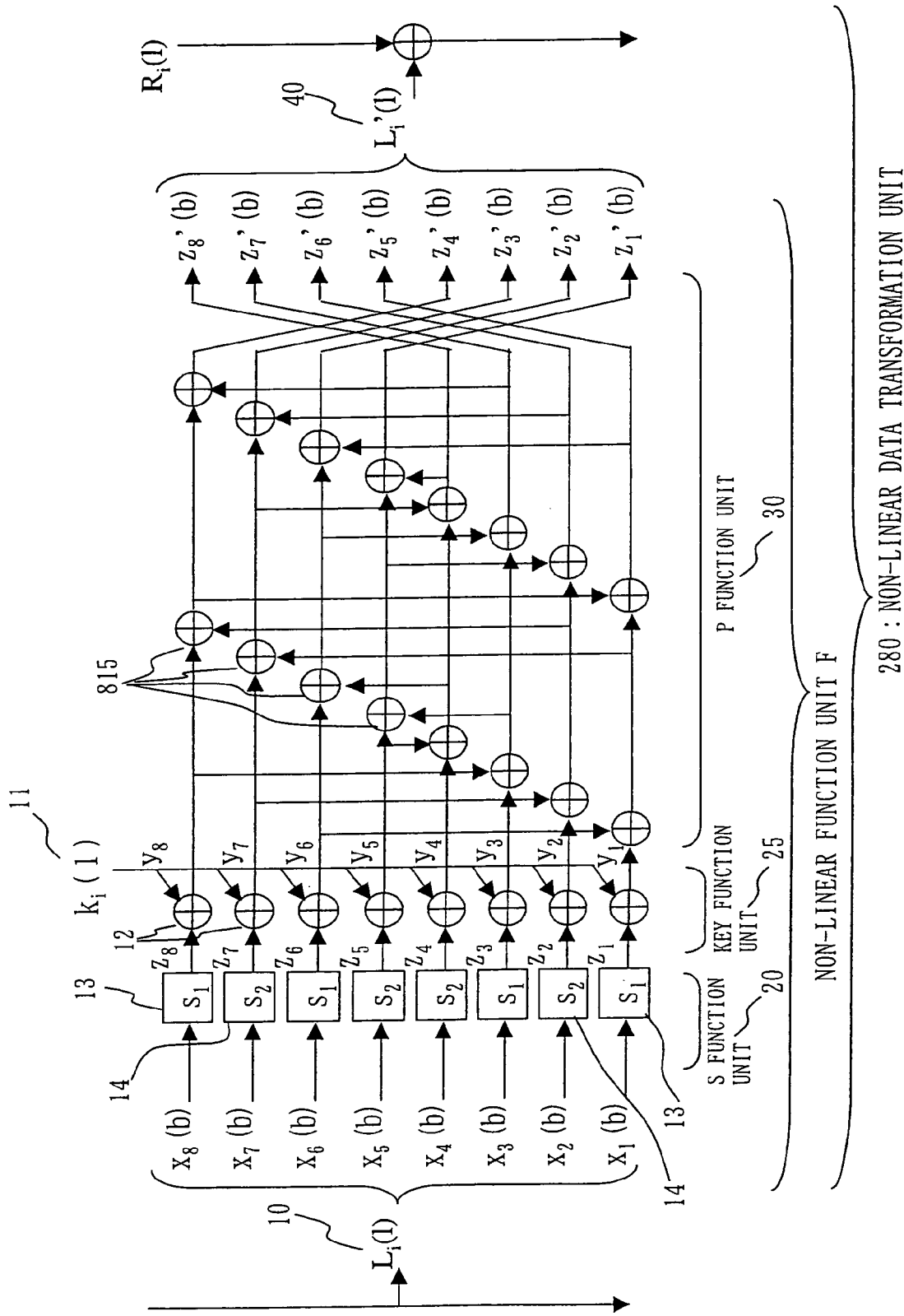
FIG. 30 shows another non-linear function unit F in which a location of the key function unit 25 is moved.

FIG. 30 shows a case in which the key function unit 25 is placed between the S function unit 25 and the P function unit 30.

By employing the configuration shown in FIG. 29 or FIG. 30, one can have an effect that an implementation provides a higher-speed operation than the configuration shown in FIG. 11 does. Further, by modifying the generation of the extension keys, the same output can be obtained using the configuration shown in FIG. 29 or FIG. 30 from the same input as the configuration of FIG. 11. In the conventional F function unit shown in FIG. 26, two S functions are provided, in each of which first an operation with the extension key is performed and then an operation of the S function is performed. On the contrary, in the case shown in FIG. 29, a key function unit 25 is placed at the final stage of the F function. In the case shown in FIG. 30, the key function unit 25 is placed between the S function unit 20 and the P function unit 30.

Figure 43:
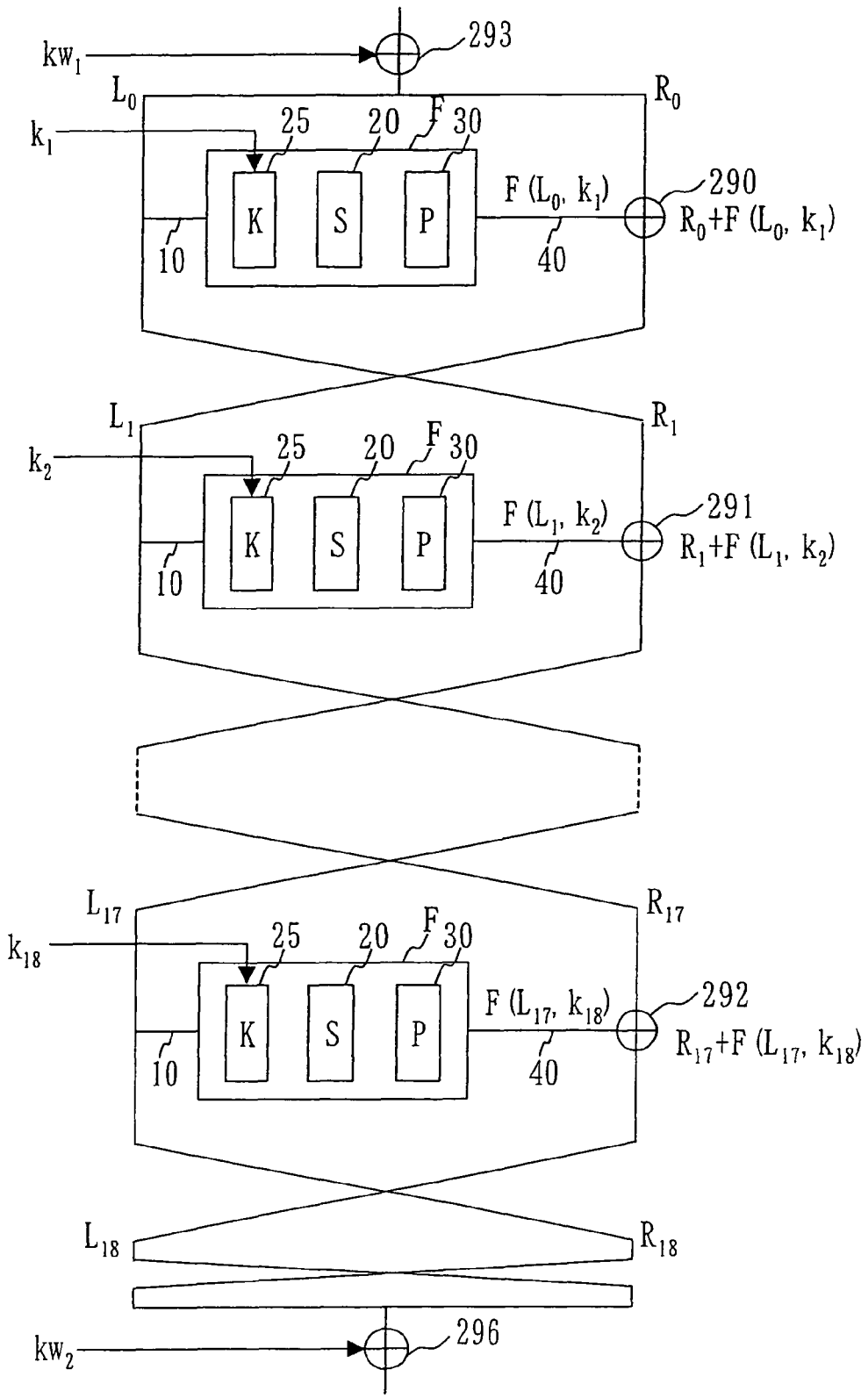
FIG. 43 shows a configuration of the encryption unit 200 or the decryption unit 500, which is shown in FIG. 3, using the non-linear function unit F shown in FIG. 28.

FIG. 43 shows a case in which the non-linear transformation unit F shown in FIG. 28 is employed in the encryption unit 200 or the decryption unit 500 shown in FIG. 3.

Left data is input to the non-linear transformation unit F as F function input data 10, and F function output data 40 is output. The F function output data 40 is XORed with right data, and the XORed result becomes left data of the next round. When the left data is input to the non-linear transformation unit F as the F function input data 10, at the same time, the left data is used as right data of the next round. In the configuration shown in FIG. 43, operations of the key function unit 25, the S function unit 20, and the P function unit 30 are performed in the non-linear transformation unit F, so the operation load becomes large within the non-linear transformation unit F. An example case in which a higher-speed processing can be achieved by distributing the operation load of the non-linear transformation unit F will be explained below referring to the figures.

Figure 44:
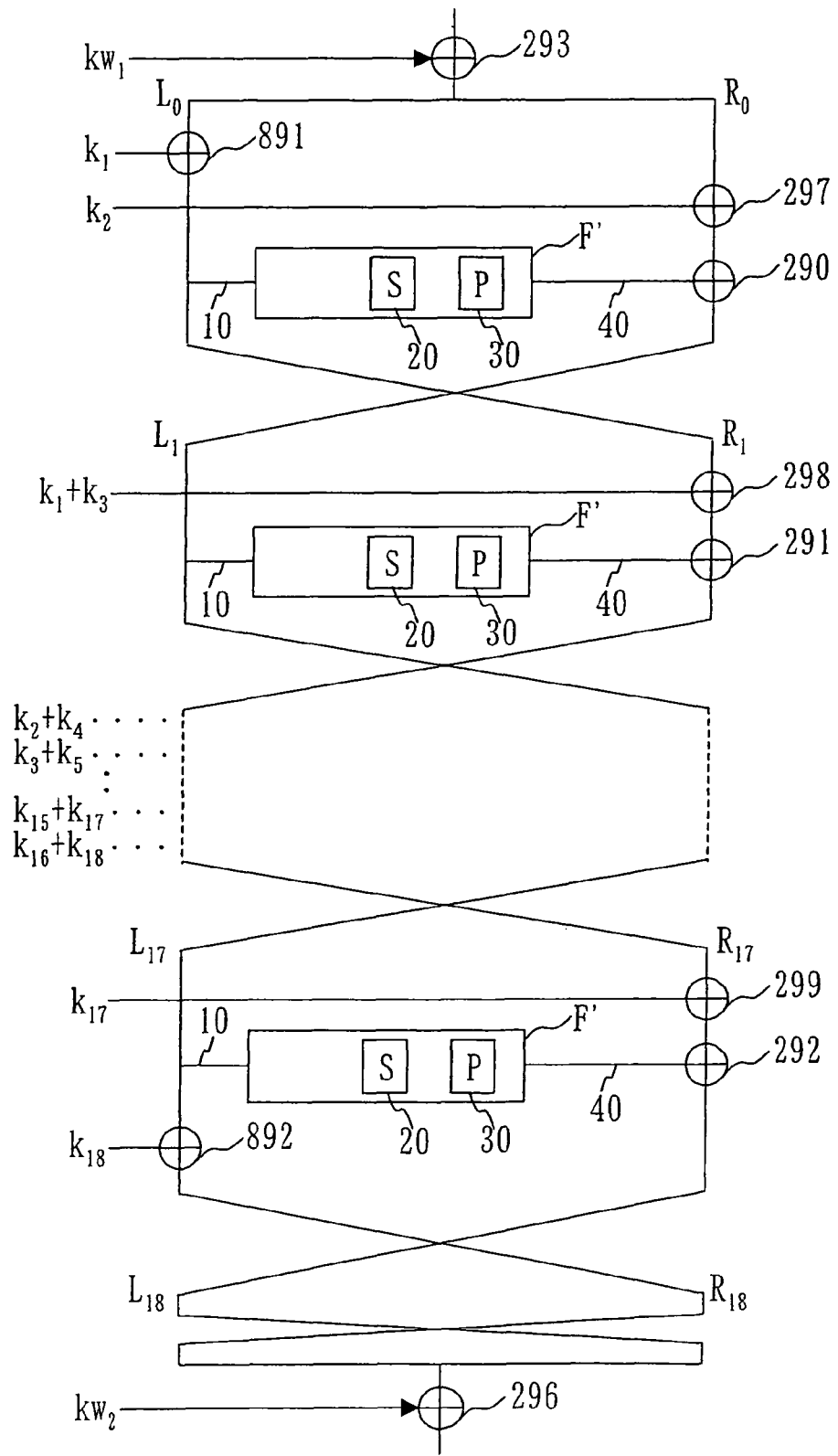
FIG. 44 shows a modified configuration of FIG. 43 by using a non-linear function unit F' in which the key function unit 25 of the non-linear function unit F is removed.

FIG. 44 shows a case in which the non-linear transformation unit F' is used. The non-linear transformation unit F' is one where the key function unit 25 is removed from the non-linear transformation unit F shown in FIG. 43. The extension key $k_1$ is XORed with left data $L_0$ at an XOR circuit 891. Further, the extension key $k_2$ is XORed with right data $R_0$ at an XOR circuit 297. The left data is input to the non-linear transformation unit F' as the F function input data 10, and transformed by the S function unit 20 and the P function unit 30. Output from the XOR circuit 297 and the F function output data 40 are XORed at an XOR circuit 290 to output left data $L_1$.

On the other hand, the key generating units 300, 600 perform an XOR operation of the extension keys $k_1$ and $k_2$ and output the modified extension key $k_1 + k_3$. The output $R_1$ of the XOR circuit 891 and the extension key $k_1 + k_3$ are XORed at an XOR circuit 298 to output the right data. The key generating units 300, 600 modify the extension keys to generate and output $k_1+k_3, k_2+k_4, k_3+k_5, \ldots, k_{16}+k_{18}$. The key generating units 300, 600 supply the modified extension keys to the processes other than the non-linear function process (F) to operate with the data. As a result, left data $L_{18}$ and right data $R_{18}$ become the same as the left data $L_{18}$ and the right data $R_{18}$ in case of FIG. 43.

The modified extension keys are supplied to the processes other than the non-linear function process (F) and operated with the data, and consequently, the operations with the key data can be performed outside the non-linear function unit F', namely, at the XOR circuits 297 and 298, while the operations of the S function unit 20 and the P function unit 30 are performed in the non-linear function unit F'. Therefore, the operations of the key function unit 25 are eliminated from the non-linear function unit F, and the load of the non-linear function unit F is distributed, which enables a high-speed implementation.

Figure 45:
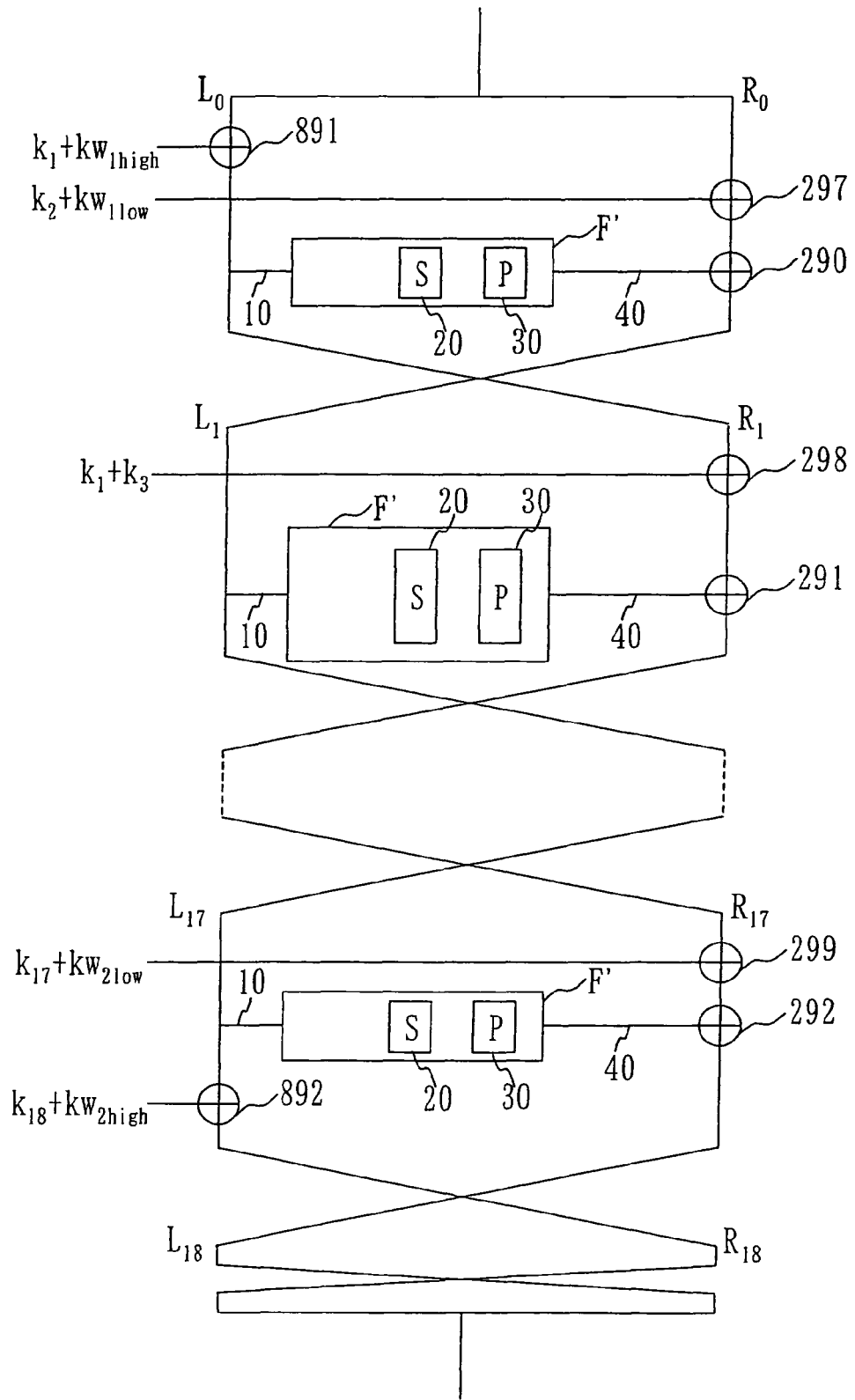
FIG. 45 shows a modified configuration of FIG. 44 by merging the whitening extension keys with the extension keys.

FIG. 45 shows a case in which operations of the whitening extension key $kw_1$ are performed as well as operations of the other extension keys in the configuration shown in FIG. 44. FIG. 45 shows a case in which the key generating unit previously performs an XOR operation of a part of the whitening extension key $kw_{1high}$ and the first extension key $k_1$ (namely, the key generating unit modifies the extension key) and supplies the operation result to the XOR circuit 891.

The figure also shows a case in which the key generating unit previously performs an XOR operation of a part of the whitening extension key $kw_{1low}$ and the second extension key $k_2$ (namely, the key generating unit modifies the extension key) and supplies the operation result to the XOR circuit 297.

In this way, the operation at the XOR circuit 293 shown in FIG. 44 can be eliminated. Further, in a case shown in FIG. 45, the key generating unit performs an XOR operation of a part of the whitening extension key $kw_{2low}$ and the extension key $k_{17}$ (namely, the key generating unit modifies the extension key) and supplies the operation result to the XOR circuit 299. Yet further, the key generating unit performs an XOR operation of the other part of the whitening extension key $kw_{2high}$ and the extension key $k_{18}$ (namely, the key generating unit modifies the extension key) and supplies the operation result to the XOR circuit 892.

In this way, the operation of the XOR circuit 296 shown in FIG. 44 is eliminated.

Figure 46:
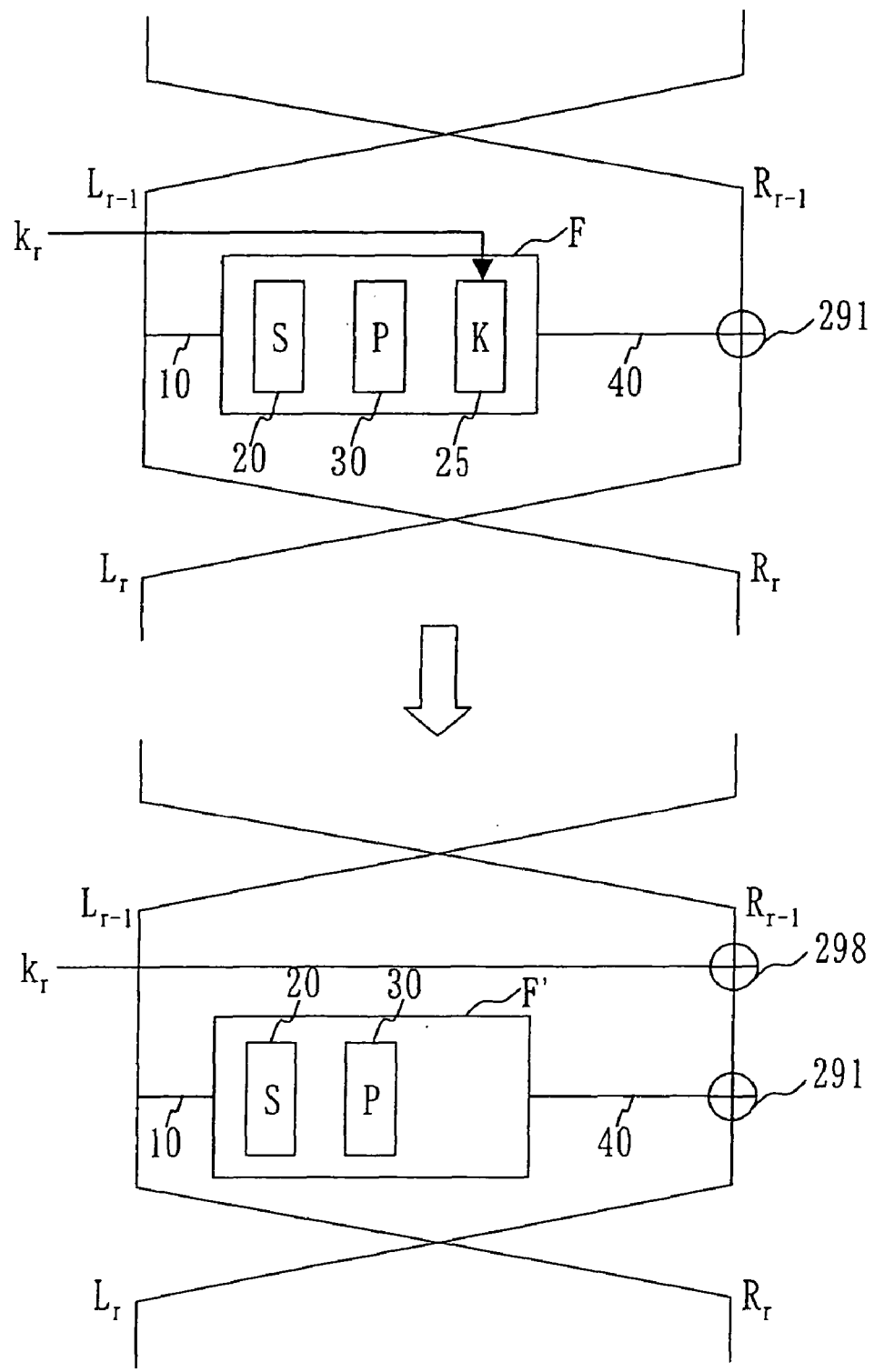
FIG. 46 shows a modified configuration in which the key function unit 25 is removed from the non-linear function unit F and in which an extension key k is supplied to an XOR circuit 298, when the non-linear function unit F is configured as shown in FIG. 29.

FIG. 46 shows a case in which the key function unit 25 is removed from the non-linear function unit F, and instead, the key generating unit supplies the extension key k to the XOR circuit 298 when the non-linear function unit F is configured as shown in FIG. 29.

Figure 47:
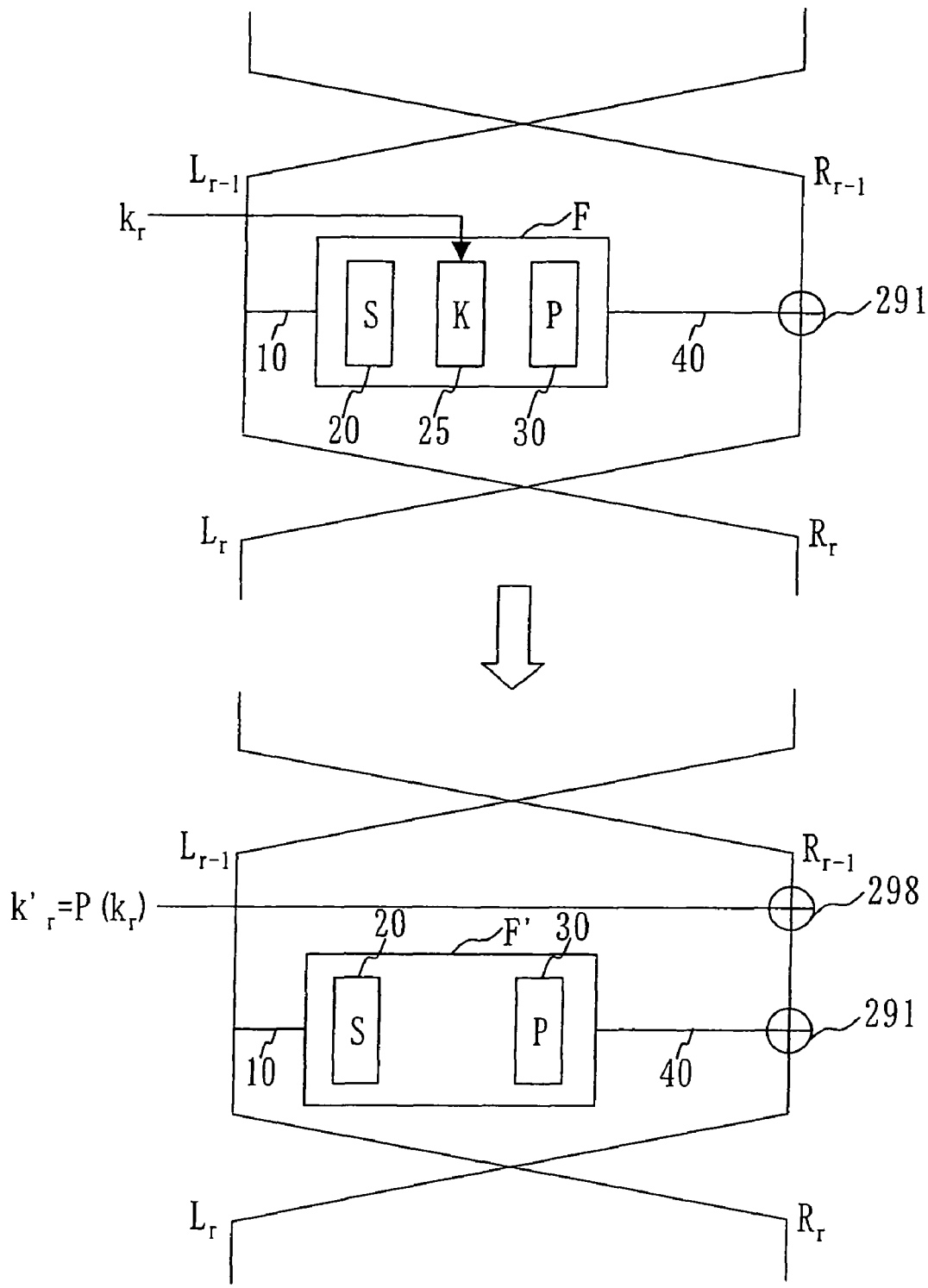
FIG. 47 shows a modified configuration in which the key function unit 25 is removed from the non-linear function unit F and in which a non-linearly transformed extension key k' is supplied to the XOR circuit 298, when the non-linear function unit F is configured as shown in FIG. 30.

FIG. 47 shows a case in which the key function unit 25 is removed from the non-linear function unit F, and instead, the key generating unit supplies the non-linearly transformed extension key $k'=P(k)$ to the XOR circuit 298 when the non-linear function unit F is configured as shown in FIG. 30. In the case of FIG. 47, the same operation as performed by the P function process is performed on the key data to generate non-linearly transformed key data, and the non-linearly transformed key data is supplied to the processes other than the non-linear function process (F) for processing data to be operated with the data as the key data for processing data. In both cases of FIGS. 46 and 47, because the key function unit 25 is eliminated from the non-linear function unit F, the operation load of the non-linear function unit F is reduced, and the operation of the XOR circuit 298 located outside the non-linear function unit F can be performed in parallel with the operations performed by the non-linear function unit F, which enables a high-speed processing.

Embodiment 3

Figure 16:
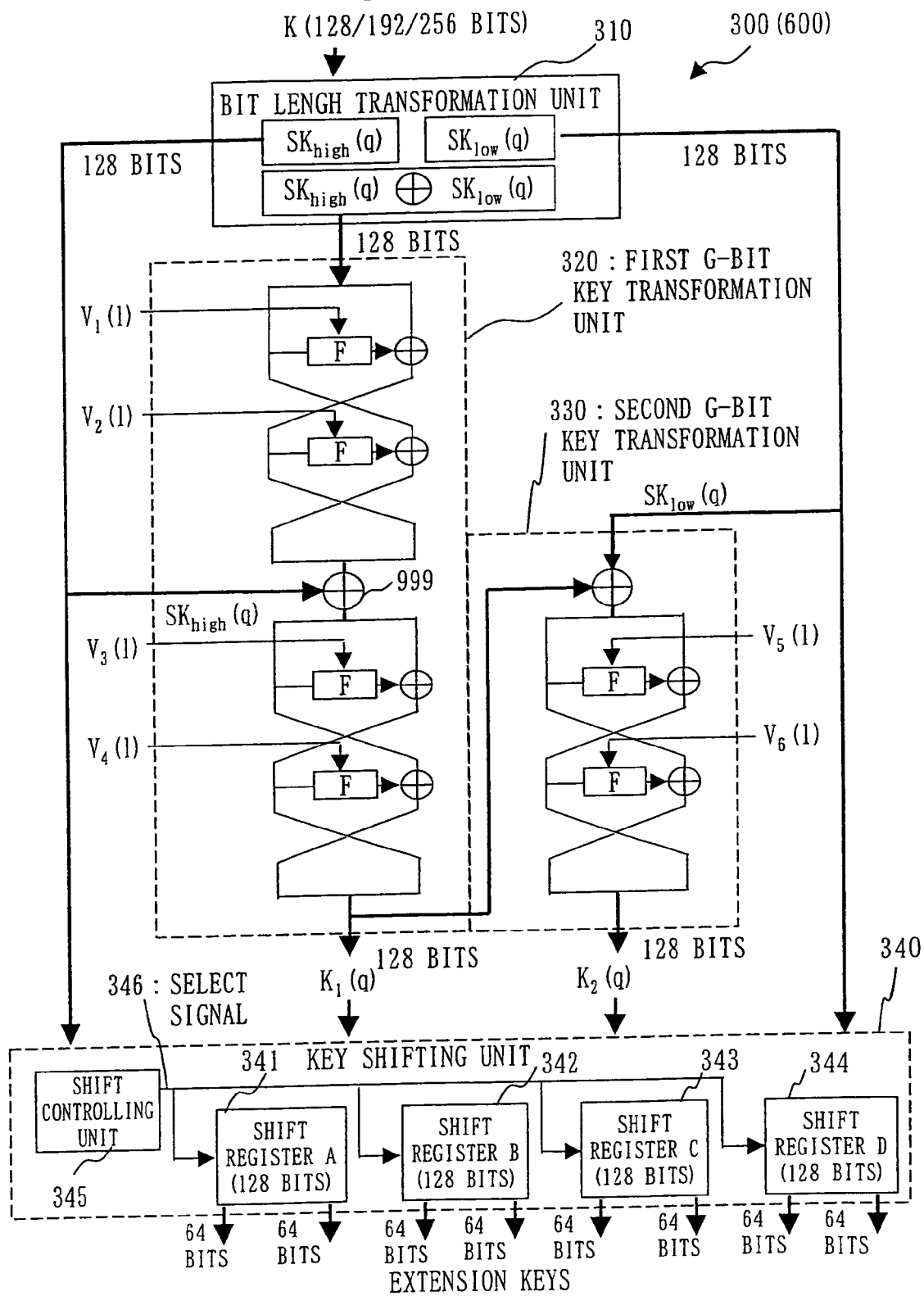
FIG. 16 shows a configuration of a key generating unit 300 or a key generating unit 600.

FIG. 16 shows a configuration of the key generating unit 300 (or the key generating unit 600) shown in FIG. 1.

The key generating unit 300 includes a bit length transformation unit 310, a first G-bit key transformation unit 320, a second G-bit key transformation unit 330, and a key shifting unit 340. From the input key data having 128 bits, 192 bits, or 256 bits, the key generating unit 300 generates 128-bit key data $K_1$ and 128-bit key data $K_2$, and outputs plural 64-bit extension keys. The bit length transformation unit 310 converts the bit length of the key data to be output so that the bit length of the output key data becomes fixed even if the key data having different number of bits is input. In other words, the bit length transformation unit 310 generates key data $SK_{high}$ of upper 128 bits and key data $SK_{low}$ of lower 128 bits and outputs the former to the first G-bit key transformation unit 320 and the key shifting unit 340. Further, the latter is output to the second G-bit key transformation unit 330 and the key shifting unit 340. Further, 128-bit key data which is an XORed result of the former and the latter is output to the first G-bit key transformation unit 320.

Figure 17:
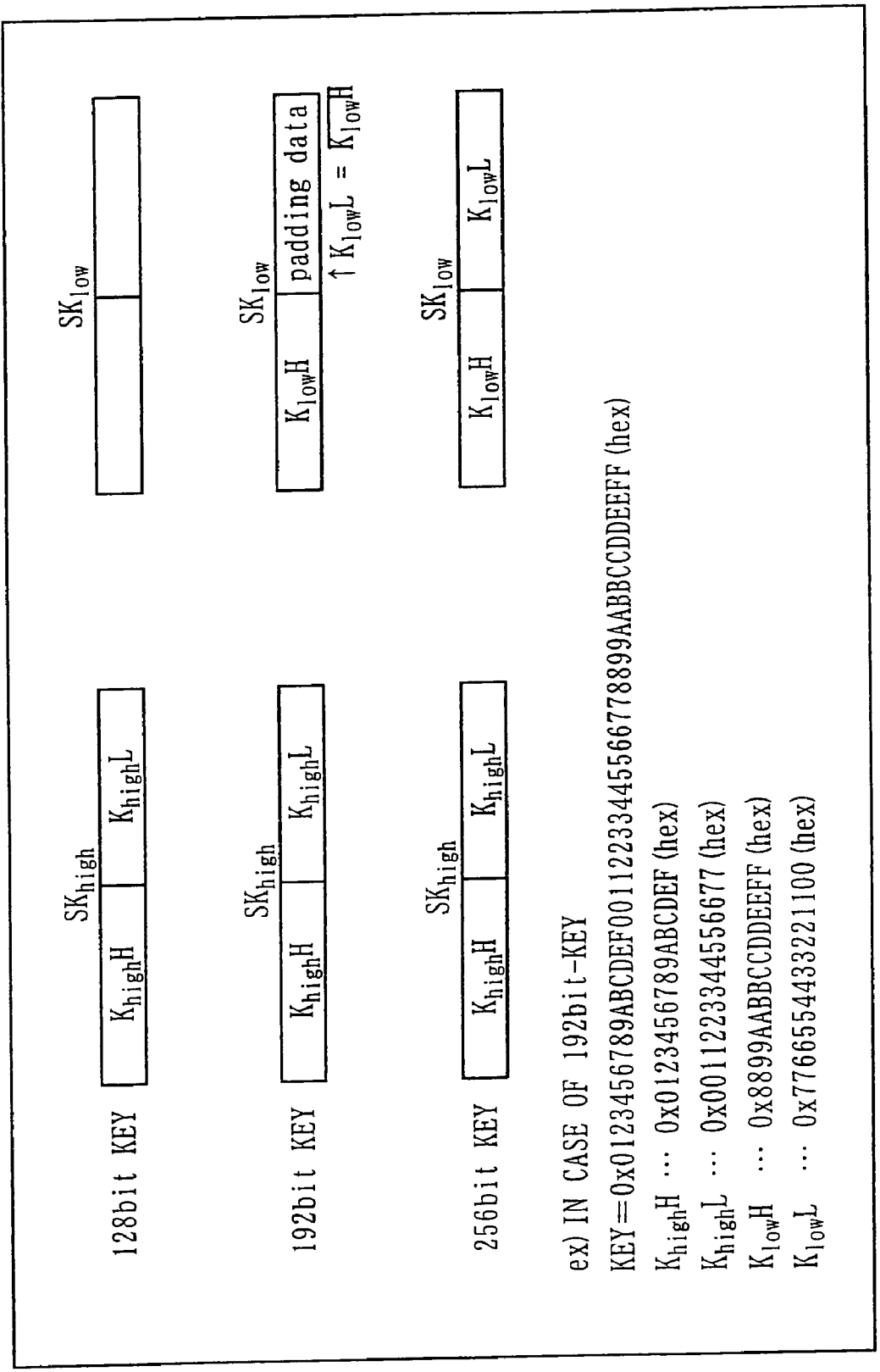
FIG. 17 explains operations of a bit length transformation unit 310.

FIG. 17 shows inside operations of the bit length transformation unit 310.

When the 128-bit key data is input to the bit length transformation unit 310, the input key data is output as key data $SK_{high}$ of the upper 128 bits without any change. Further, key data $SK_{low}$ of the lower 128 bits is set to 0 and output.

When the 192-bit key data is input to the bit length transformation unit 310, the upper 128-bit data of the input key data is output as the upper 128-bit key data $SK_{high}$ without any change. Further, the lower 128-bit key data $SK_{low}$ is generated by combining the lower 64 bits of the input 192-bit key data and the inverse 64-bit data, which is generated by inverting the lower 64-bit data of the input 192-bit key data, and output.

When 256-bit key data is input, the upper 128-bit data of the input key data is output as $SK_{high}$, and the lower 128-bit data is output as $SK_{low}$.

An XOR data of the 128-bit key data $SK_{high}$ and $SK_{low}$ is input to the first G-bit key transformation unit 320 from the bit length transformation unit 310, operated by two round non-linear transformations, XORed with the upper 128-bit key data $SK_{high}$, further operated by two round non-linear transformations, and 128-bit key data $K_1$ is output.

When the length of the key data input to the bit length transformation unit 310 is 128 bits, the key shifting unit 340 generates the extension key using the 128-bit key data output from the first G-bit key transformation unit 320 and the key data originally input. When the length of the key data input to the bit length transformation unit 310 is 192 bits or 256 bits, the 128-bit key data output from the first G-bit key transformation unit 320 is further input to the second G-bit key transformation unit 330, XORed with the lower 128-bit key data $SK_{low}$, operated by two round non-linear transformations, and 128-bit key data $K_2$ is output. Two pieces of 128-bit key data, from the first G-bit key transformation unit 320 and the second G-bit key transformation unit 330, are output to the key shifting unit 340. The key shifting unit 340 generates the extension key using the two pieces of 128-bit key data and the key data originally input.

The key shifting unit 340 includes a shift register A 341, a shift register B 342, a shift register C 343, a shift register D 344, and a shift control unit 345. The shift control unit 345 outputs a select signal 346 to each of the shift registers to control the operations of the shift registers.

Figure 18:
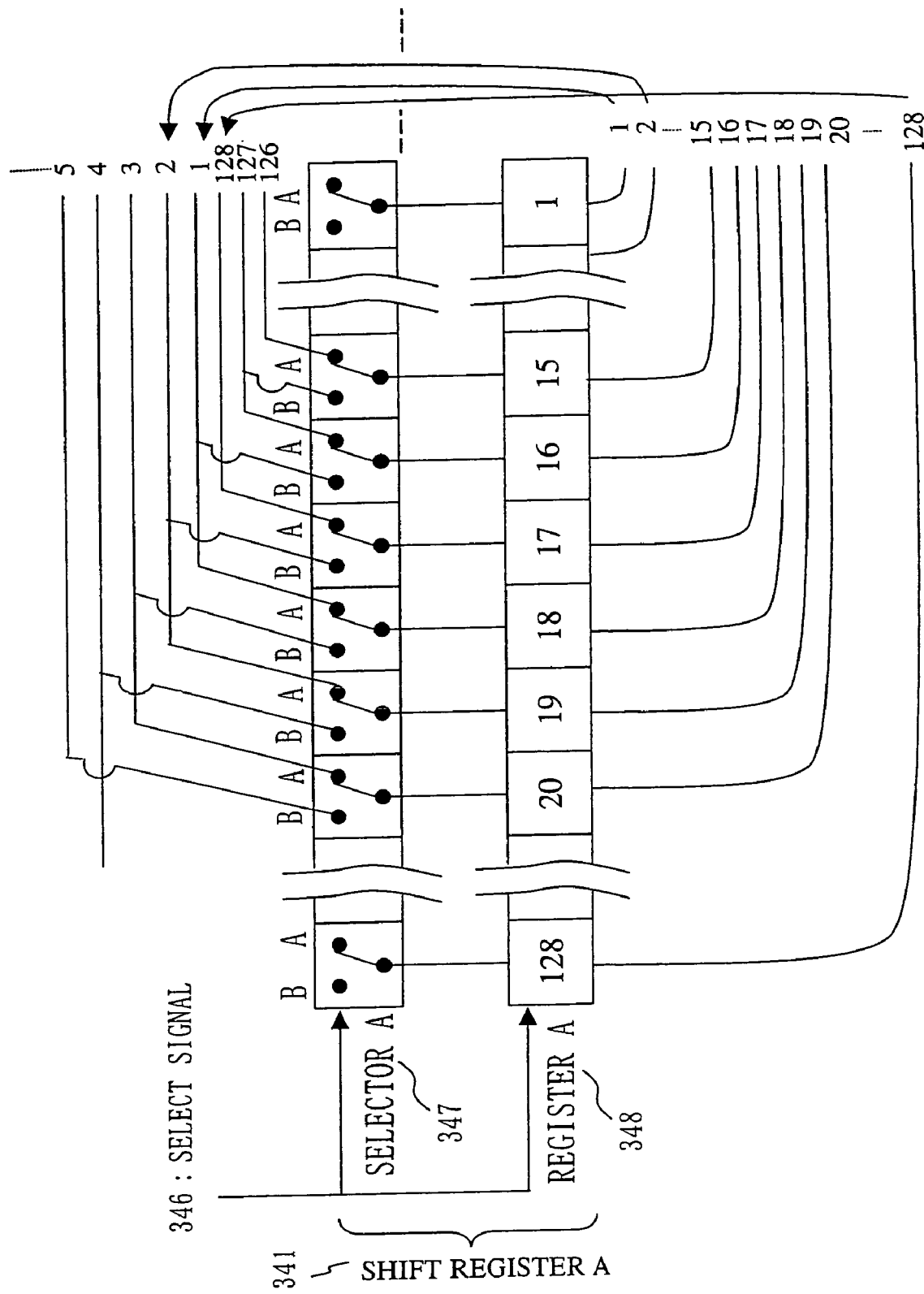
FIG. 18 shows a configuration of a shift register A 341.

FIG. 18 shows a configuration of the shift register A341.

The shift register A 341 includes a selector A 347 having a group of switches for 128 bits and a register A 348 having 128 bits. A select signal 346 includes a switch signal to indicate to connect all the switches of the selector A 347 at the same time to either of A side and B side. The figure shows a case in which the group of switches of the selector A 347 has selected A based on the select signal 346, and in this case, the register A 348 performs a rotational shift to the left by 17 bits. Further, when the group of switches is connected to B, the register A performs the rotational shift to the left by 15 bits. The 15-bit shift or 17-bit shift is performed by one clock cycle.

The number of shifting bits (15, 17) is one of examples, and other number of shifting bits can be applied.

FIG. 19 shows a part of a control table stored in the shift control unit 345.

The control table is a table storing how many bits the register shifts at each clock. For example, in the register A control table, at the first clock, it is specified to shift by 15 bits. And, at the second clock, it is specified to shift by further 15 bits. Similarly, at each of the third clock and the fourth clock, it is specified to shift by 15 bits. At each of the fifth through the eighth clock, it is specified to shift by 17 bits.

Figure 20:
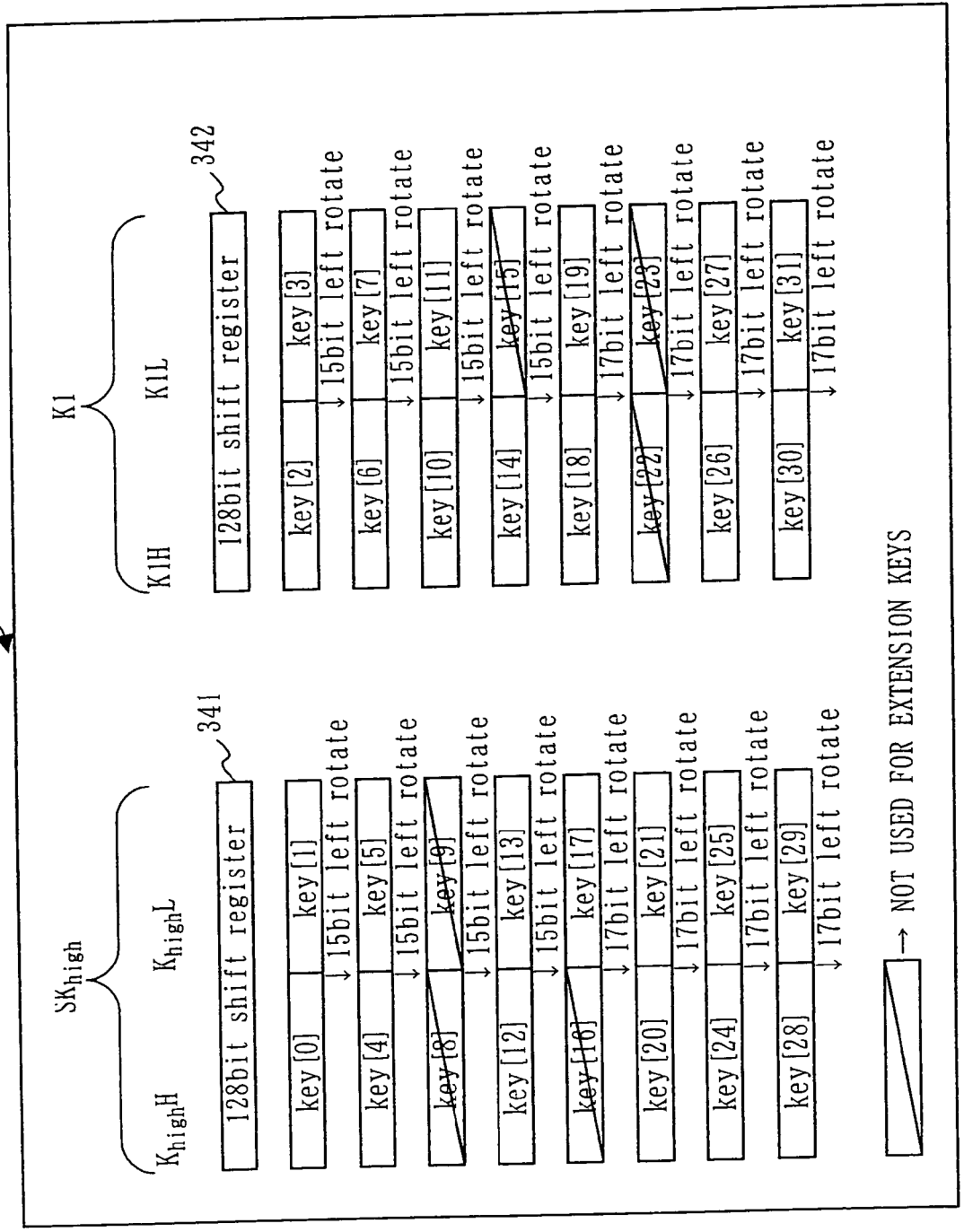
FIG. 20 shows operations of the shift register A 341 and a shift register B 342.

FIG. 20 shows a control result under which the shift control unit 345 controls each shift register using the table shown in FIG. 19 in case of generating the extension key from the 128-bit key data.

The upper 128-bit key data $SK_{high}$ input from the bit length transformation unit 310 is set in the shift register A 341. The 128-bit key data $K_1$ output from the first G-bit key transformation unit 320 is set in the shift register B 342. Under this condition, the shift register A 341 and the shift register B 342 operate based on the control table shown in FIG. 19. In FIG. 20, data in a column having a slant shows to be ignored and not to be output. Data in the other columns are output as extension keys as shown in FIG. 21.

FIG. 21 shows a correspondence between the value of the registers and the extension key.

FIG. 20 shows a case in which four shifts are performed by 15 bits at each clock, and from the fifth clock, shifts are performed by 17 bits at each clock. Decision to output or not to output the upper 64 bits and the lower 64 bits from the shift register A 341 and the shift register B 342 as the extension key and its outputting order are specified in the control table, which is not shown in the figure. And according to the control table, by outputting the select signal 346 including an output instruction signal to the shift register, the extension key is output from each shift register by 64 bits.

Figure 22:
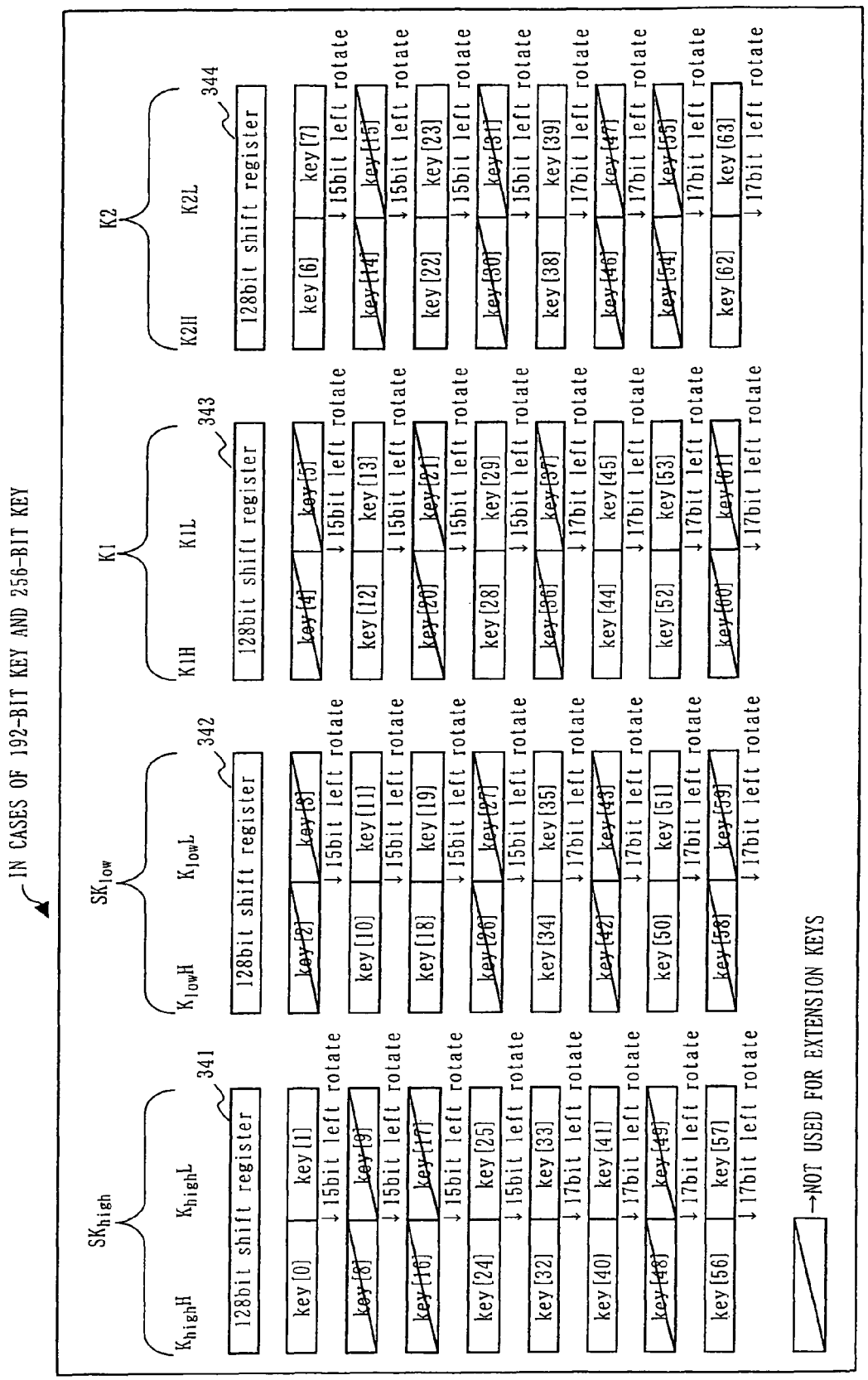
FIG. 22 shows operations of the shift registers A 341 through D 344.

FIG. 22 shows a case in which the extension key is generated from the 192-bit or 256-bit key data.

Namely, the upper 128-bit key data $SK_{high}$ input from the bit length transformation unit 310 is set in the shift register A 341, the lower 128-bit key data $SK_{low}$ is set in the shift register B 342, the 128-bit key data $K_1$ output from the first G-bit key transformation unit 320 is set in the shift register C 343, and the 128-bit key data $K_2$ output from the second G-bit key transformation unit 330 is set in the shift register D 344.

Data in a column having a slant shows keys not used for the extension keys.

FIG. 23 shows a correspondence between the value of the register and the extension key.

The keys not used for the extension keys and the correspondence between the value of the register and the extension key shown in FIG. 23 are stored in the control table located in the controller.

As shown in FIG. 19, the shift control unit 345 stores the number of bits for shifting the key data set in the shift register A 341. Namely, the extension keys are generated sequentially by shifting the key data set in the shift register A 341 by $Z_0=0$ bit, $Z_1=15$ bits, $Z_2=45$ bits, $Z_3=60$ bits, $Z_4=77$ bits, $Z_5=94$ bits, $Z_6=111$ bits, and $Z_7=128$ bits as shown in the shift register A control table.

The sum of the number of shifting bits becomes 15+15+15+15+17+17+17+17=128, so that the 128-bit register performs the 128-bit rotational shift and the register returns to the initial status.

The reason why the sum of the number of shifting bits is made 128 bits (the number of bits of the register) to return to the initial status is that the next processing can be started at once if the next processing is assigned to the register of the initial status. Further, in case of performing an inverse transformation (decryption), the process for generating the extension key is started from the initial status, and accordingly, both of the transformation (encryption) and the inverse transformation (decryption) can be performed by setting the initial status. Further, the reason why the sum of the number of shifting bits is not made greater than 128 bits (the number of bits of the register) is to prevent the generation of identical values as the status within the same shift register due to performing the shift more than one cycle (greater than 128 bits of shift). This is because, for example, performing the rotational shift by 2 bits, which is less than 128 bits (the number of bits of the register) and performing the rotational shift of 130 bits, which is greater than 128 bits (the number of bits of the register), produce the identical value. It is desirable to set such values in the register A control table that, on performing the shifts of the register by one cycle, the number of shifting bits varies irregularly through the one cycle. However, in order to facilitate the configuration of the shift register, it is desired to shift by the fixed number of bits. Therefore, one register is configured to perform two kinds of shifts by 15 bits and 17 bits (at one clock), and the shift operation by different number of bits can be implemented using the two kinds of shifts, according to the following procedure.

Set the relation so that $Z_1-Z_0=15$ (here, $Z_1-Z_0=B_1$), $Z_2-Z_1=30$ (namely, $Z_2-Z_1=2B_1$), therefore, $Z_2-Z_1=2(Z_1-Z_0)$. Further, as shown in the shift register B control table, set the relation so that $Z_5-Z_4=34$ (here, $Z_5-Z_4=2B_2$), $Z_6-Z_5=17$ (namely, $Z_6-Z_5=B_2$), therefore, $Z_5-Z_4=2(Z_6-Z_5)$. Namely, the differences between the numbers of shifting bits are made 15 bits and 30 bits, or 17 bits and 34 bits, and the number of shifting bits (30 bits or 34 bits) is set to an integral multiple (2 times=I times) of the number of bits (15 bits and 17 bits) for one time shifting.

In this way, as the differences of the number of shifting bits are set to either the number of shifting bits for one time or the multiple by the integer which is greater than two (I times, I is an integer greater than 2) and the number of shifting bits for one time, by operating the shift register A 341 one time or two times (I times), it is possible to easily implement shift operations of which the number of shifting bits stored in the control table. To operate two times (I times) means that the shift operation finishes with two clocks (I clocks) of the operation clock supplied for operating the shift register A 341.

Here, on shifting I times (two times), both the higher data and the lower data of the shifted data up to I−1 times (2−1=1 time) are ignored and are not used for the extension key. For example, in case of shifting from $Z_1=15$ to $Z_2=45$, $I=(Z_2-Z_1)/$(the number of shifting bits at one time)$=(45-15)/15=2$, and both the higher data and the lower data of the shifted data after shifting I−1 times (2−1=1 time) are ignored and are not used for the extension key. This can be seen in FIG. 20, in which the columns of key[8] and key[9] have slants, showing that these keys are not used for the extension keys. And either or both of the higher data and the lower data of the shifted data after shifting I times (2 times) is or are used as the extension key. This can be seen in FIG. 20, which shows key[12] and key[13] are output as the extension keys.

The reasons why the shift operation based on multiple by the integer greater than two is employed as described above are to enable to perform the shifting of not only 15 bits or 17 bits, but also 30 (=15×2) bits, 34 (=17×2) bits (or 45 (=15×3) bits or 51 (=17×3) bits, etc.), which varies the number of shifts and further to improve the security. And, the reason why the cases are provided in which the shifted data is not used for the extension key is also to improve the security.

It is desired to generate the data which is not used for the extension key (in FIGS. 20 and 22, keys of columns having slants, which are not used for the extension keys) when, for example, the processing of the hardware or the processing of the program is not consecutively performed. For concrete examples, in FIG. 3, it is desired to generate such data when the operations of the normal data transformation unit (FL) and the inverse data transformation unit (FL$^{-1}$) are performed, or before or after such operations or at idle times of processes or switching times of processes such as a function call by a program, a subroutine call, or an interrupt handling process.

The characteristics of the control table shown in FIG. 19 is that the control table specifies the number of shifting bits of $B_1=8\times2-1=15$ ($B_1=8\times J_1-1$, where $J_1$ is an integer greater than 1) and the number of shifting bits of $B_2=8\times2+1=17$ ($B_2=8\times J_2+1$, where $J_2$ is an integer greater than 0, $J_1=J_2$ or $J_1 \neq J_2$). To set the shifting amount to a ±1 of the integral multiple of 8 is to perform the shift by odd bits, which improves the security compared with performing the shift only by even bits, since the operation of the extension key in the data processing unit is made by 8-bit unit, that is, even bits unit. And since the shifting amount can be set by adding/subtracting 1 bit to/from the multiple of 8, for example, on some CPU which has only 1-bit shifting command, the shift operation such as above performs a high-speed processing compared with shifting by 3 bits or 5 bits. And also, in case that this shift operation using the hardware which can shift only 1 bit, there are cases possible to perform a high-speed processing.

In the above description of the bit length transformation unit 310, three kinds of bit widths of key data are input. Even when the key data having Q bit length, in which Q is between 128 bits (G bits) and 256 bits (2G bits) (G<Q<2G), the bit length transformation unit 310 can extend the key data to the same size of the key data when the 256-bit key data is input, using some kind of algorithm. Namely, when the key data having length of Q, which is between G bits and 2G bits, is input, the bit length transformation unit 310 can convert the key data of Q bits into the key data of 2G bits.

Next, non-existence proof of an equivalent key will be explained referring to FIG. 34.

In the following explanation of FIG. 34, "+" denotes an XOR operation.

Here, it is assumed to input two 128-bit key data SK1 and SK2 (SK1≠SK2), and that the bit length transformation unit 310 outputs SK1$_{high}$=SK1=(SKH1|SKL1) from SK1 and SK2$_{high}$=SK2=(SKH2|SKL2) from SK2. Here, SKHi (i=1,2) means the upper 64-bit data of SKi and SKLi (i=1,2) means the lower 64-bit data of SKi.

Assuming that XOR data of SKH1 and SKH2 is ΔA and XOR data of SKL1 and SKL2 is ΔB, it can be said "at least ΔA≠0 or ΔB≠0" since SK1≠SK2.

Figure 34:
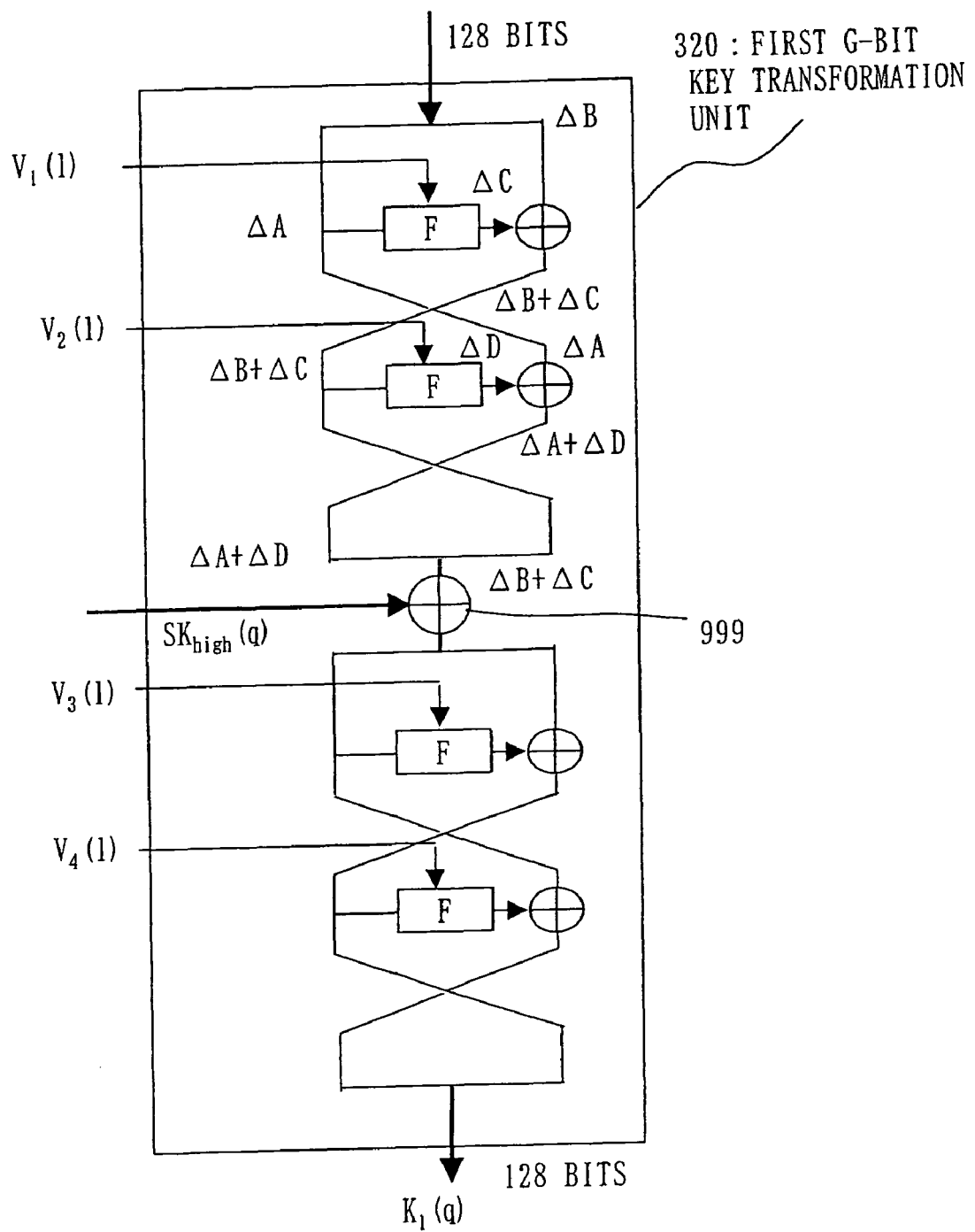
FIG. 34 shows a proof of non-existence of an equivalent keys.

As shown in FIG. 34, these ΔA and ΔB become ΔA+ΔD, ΔB+ΔC, respectively, by receiving the two rounds of non-linear transformations. This means that XOR data (ΔA|ΔB) of SK1$_{high}$ and SK2$_{high}$ becomes XOR data (ΔA+ΔD|ΔB+ΔC) after performing the two rounds of non-linear transformations to SK1$_{high}$ and the transformed data after performing the two rounds of non-linear transformations to SK2$_{high}$. Accordingly, when these pieces of data after performing the two rounds of non-linear transformations are XORed with SK1$_{high}$ and SK2$_{high}$, respectively, at an XOR circuit 999, the XORed results of two pieces of data become (ΔD|ΔC). If the non-linear transformation is a bijective function, inputting ΔX≠0 always causes to output ΔY≠0, so that when "at least ΔA≠0 or ΔB≠0", it can be said "at least ΔC≠0 or ΔD≠0". Therefore, since it is impossible to output the same data from SK1$_{high}$ and SK2$_{high}$ through the two rounds of non-linear transformations, non-existence of the equivalent key is proved.

Figure 35:
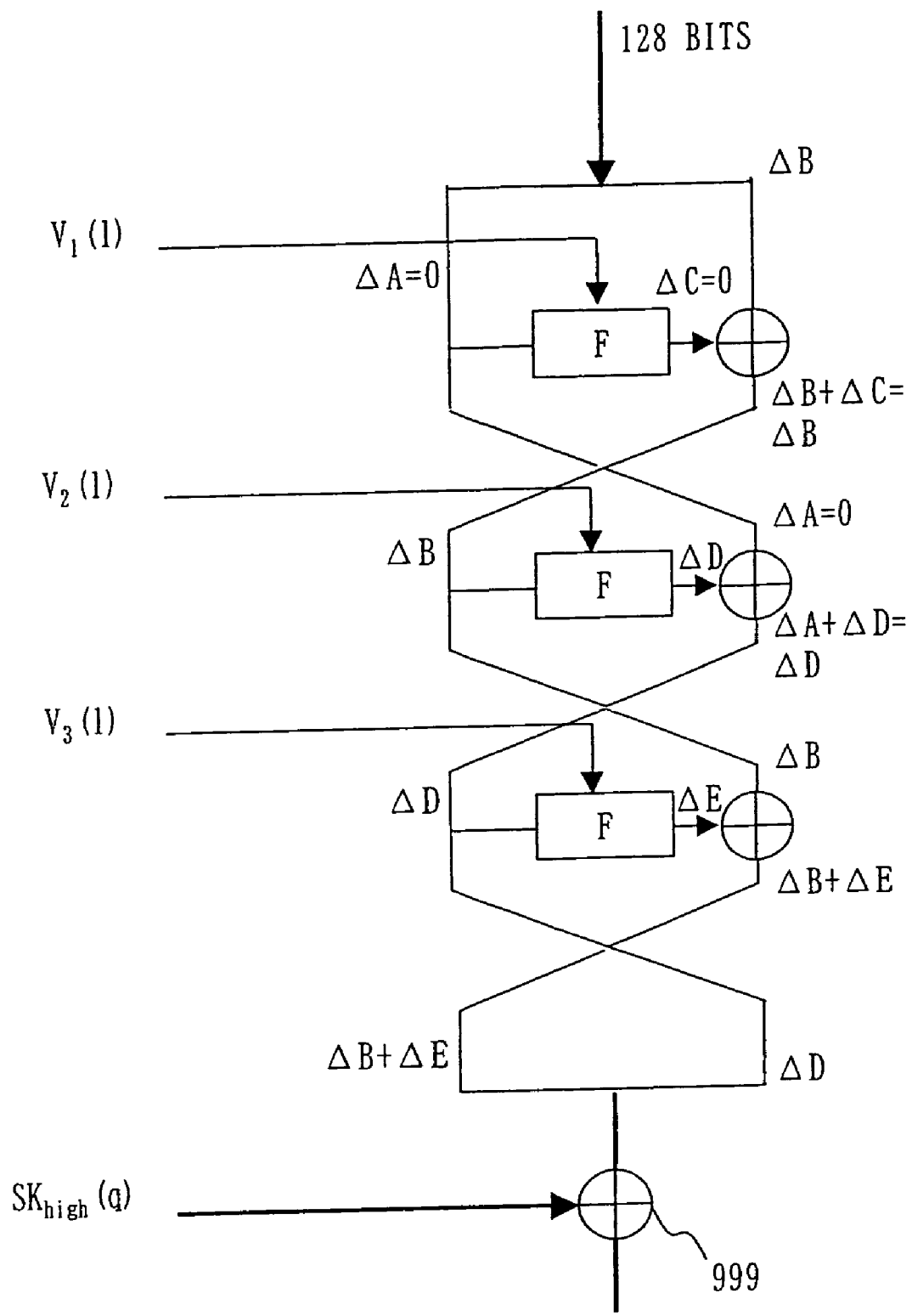
FIG. 35 shows a proof of non-existence of an equivalent keys.

On the other hand, as shown in FIG. 35, another case will be considered, in which the three rounds of non-linear transformations are performed instead of two rounds of non-linear transformations. Since it can be said "at least ΔA≠0 or ΔB≠0", there may be a case such that either ΔA or ΔB can be 0. If ΔA=0, ΔC=0, and in the same manner as discussed above, the XOR data (0|ΔB) of $SK1_{high}$ and $SK2_{high}$ becomes the XOR data (ΔB+ΔE|ΔD) after performing the three rounds of non-linear transformations to $SK1_{high}$ and the transformed data after performing the three rounds of non-linear transformations to $SK2_{high}$. Accordingly, when these pieces of data after receiving the three rounds of non-linear transformations are XORed with $SK1_{high}$ and $SK2_{high}$, respectively, at the XOR circuit 999, the XORed results of two pieces of data become (ΔB+ΔE|ΔB+ΔD). Here, when it is assumed ΔB=ΔD=ΔE≠0, the following is true: (ΔB+ΔE|ΔB+ΔD)=(0|0). That is, when these pieces of data after performing the three rounds of non-linear transformations are XORed with $SK1_{high}$ and $SK2_{high}$, respectively, the operation results are the same. Namely, $SK1_{high}$ and $SK2_{high}$ output the same data, so that the equivalent keys exist, which are troublesome in respect of the security.

Not only the above-mentioned case of three-round non-linear transformation, a general non-linear transformation may output the equivalent $K_1$ from different SK1 and SK2, that means an equivalent key may exist. However, it is possible to prove the non-existence of the equivalent key when the two-round non-linear transformation according to the present embodiment is employed.

Further, there may be another case in which the non-existence of the equivalent key is proved other than the two-round non-linear transformation according to the present embodiment, however, it is preferable to use the two-round non-linear transformation because of a simple configuration in addition to the proved non-existence of the equivalent key.

Figure 24:
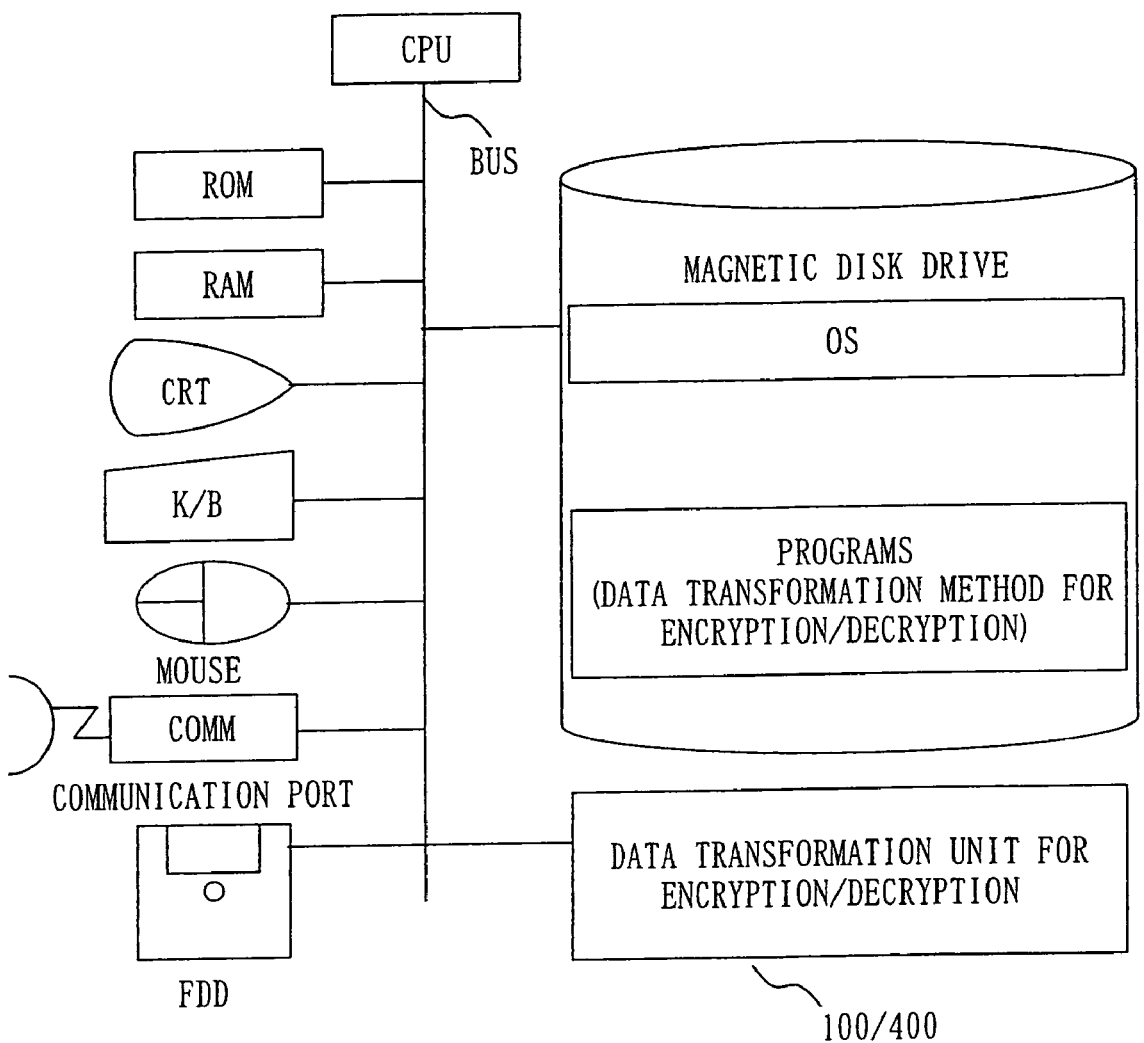
FIG. 24 shows a computer which is equipped with the data transformation unit for encryption 100 and the data transformation unit for decryption 400.
Figure 25:
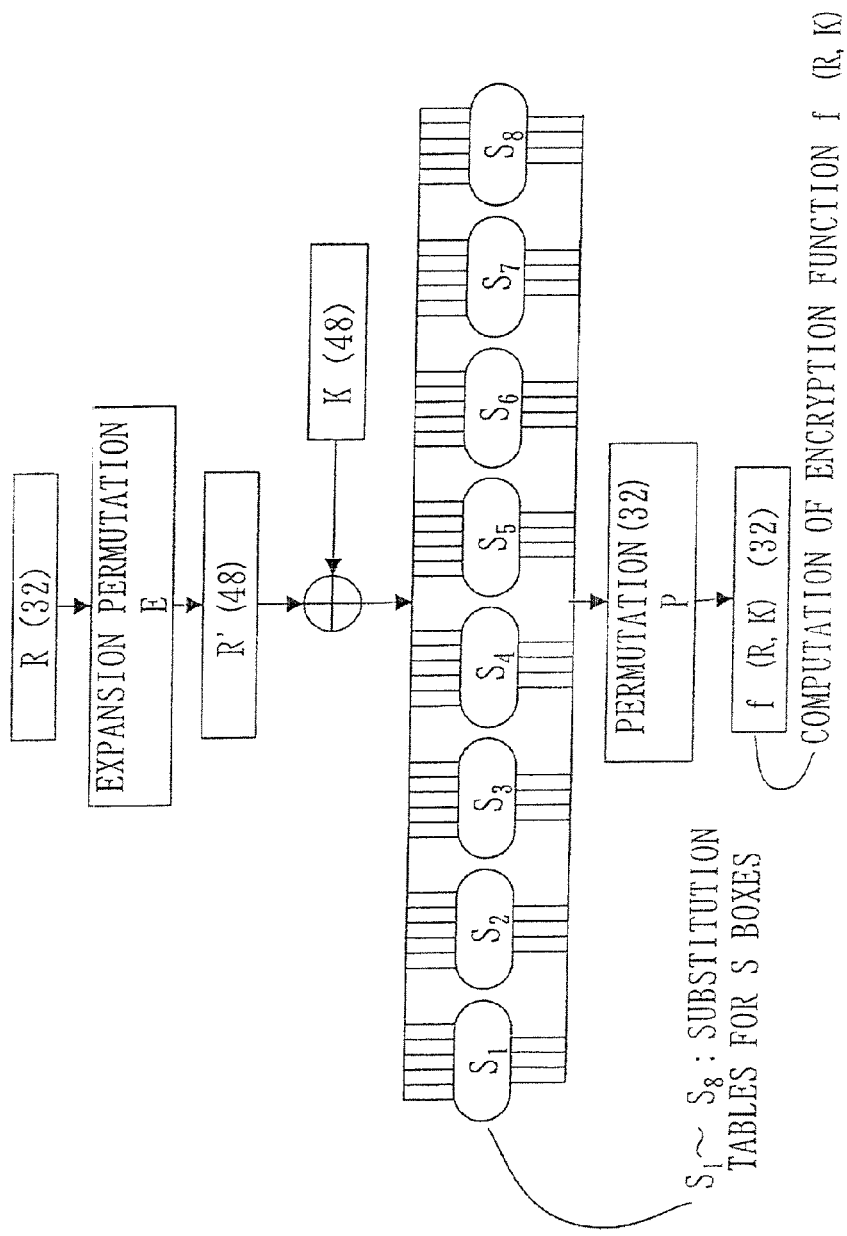
FIG. 25 shows a configuration of the encryption function of DES.

FIG. 24 shows a computer for installing the data transformation unit for encryption 100 or the data transformation unit for decryption 400.

The data transformation unit for encryption 100 and/or the data transformation unit for decryption 400 is connected to the bus as a printed circuit board. This printed circuit board is provided with a CPU, a memory, and a logical circuit element, and encrypts plaintexts supplied from the CPU into ciphertexts using the above-mentioned operation and returns the data to the CPU. Or it decrypts ciphertexts supplied from the CPU and returns the plaintexts to the CPU.

In this way, the data transformation unit for encryption 100 or the data transformation unit for decryption 400 can be implemented by the hardware. Further, the data transformation unit for encryption 100 or the data transformation unit for decryption 400 can be also implemented by the software as the data transformation method. Namely, the above operation can be performed using the program stored in a magnetic disk drive or a flexible disk drive. In another way, the above operation can be implemented by combining the hardware and the software, though this is not shown in the figure. Further, it is not required to implement all the above operation using one computer, but it is possible to implement the above operation by a distributed system such as a server and a client, or a host computer and a terminal computer, though this is not shown in the figure.

In the foregoing FIGS. 1 through 47, an arrow shows a direction of the operation flow, and the figures having the arrow are block diagrams of the data transformation unit and also flowcharts. "... unit" shown in the above block diagrams can be replaced with "... step" or "... process", so that the diagrams can be considered as operation flowcharts or program flowcharts showing the data transformation method.

In the foregoing embodiments, a case in which 128-bit plaintexts and ciphertexts are used has been explained, but the data can be 256-bit plaintexts and ciphertexts, or plaintexts and ciphertexts having another number of bits.

Further, in the foregoing embodiments, a case in which 128-bit, 192-bit, 256-bit key data and 64-bit extension keys are used, but the key data can have another number of bits.

If the bit length of the plaintexts and the ciphertexts, the key data and the extension key are changed, of course, the bit length to be processed by each unit, each step, or each process is changed according to the bit length.

INDUSTRIAL AVAILABILITY

According to the embodiment of the present invention, the normal data transformation unit (FL) 251 and the inverse data transformation unit ($FL^{-1}$) are provided for implementing the encryption and the decryption using the same algorithm, so that the encryption unit 200 and the decryption unit 500 can share the circuit.

Further, according to the embodiment of the present invention, the transformation table T is shared by the S-box first transformation unit 13 and the S-box second transformation unit 14, so that the configuration is simplified.

Further, according to the embodiment of the present invention, the subfield transformation unit 18 is used, which makes the configuration simpler, and the linear transformation unit 85 and the linear transformation unit 87 are provided, so that the security is improved even if the subfield transformation unit 18 is used.

Further, according to the embodiment of the present invention, the shift control unit 345 can make the shift register operate integer number of times to perform the shifting of the key data with the number of shifting bits (for example, 30 bits or 34 bits) which is not a fixed number of bits such as only 15 bits or 17 bits, and improves the security.

Further, according to the embodiment of the present invention, a case is provided in which the shifted data in the shift register is not used for the extension key, which further improves the security.

Further, according to the embodiment of the present invention, even if the key data having different number of bits is input, the bit length transformation unit 310 changes to the key data with a fixed length, which enables to operate a flexible key generation.

Further, according to the embodiment of the present invention, the two-round non-linear transformation is used in the first G-bit key transformation unit 320, so that non-existence of the key being equivalent to $K_1$ can be proved, which improves the security.

Further, according to the embodiment of the present invention, the location of the key function 25 is altered, which enables a high-speed processing.

The invention claimed is:

1. A data transformation apparatus comprising:
   a data processing unit configured to receive input data and key data, and perform at least one of encryption decryption of the input data using the key data,
   wherein the data processing unit comprises a non-linear transformation unit configured to receive at least part of the input data as data to be transformed, and perform a non-linear transformation of the data to be transformed,
   wherein the non-linear transformation unit includes:
      a first transformation unit configured to:
         receive a part of the data to be transformed as first partial data,
         transform the first partial data by performing a lookup of a transformation table based on a value of the first partial data to obtain a transformed value of the first partial data, and
         output the transformed value of the first partial data;

a second transformation unit configured to:
  receive at least another part of the data to be transformed as second partial data,
  transform the second partial data by performing a lookup of the transformation table based on a value of the second partial data to obtain a corresponding value of the second partial data, and performing an operation on the corresponding value of the second partial data to obtain a transformed value of the second partial data, and
  output the transformed value of the second partial data; and
a third transformation unit configured to:
  receive a part of the data to be transformed, which is different from the first and second partial data, as third partial data,
  transform the third partial data by performing an operation on a value of the third partial data to obtain a corresponding value of the third partial data, and performing a lookup of the transformation table based on the corresponding value of the third partial data, to obtain a transformed value of the third partial data, and
  output the transformed value of the third partial data,
wherein the non-linear transformation unit is implemented using at least one of a computer processor and a logical operation circuit.

2. The data transformation apparatus of claim 1, wherein the data processing unit further includes a fourth transformation unit configured to:
  receive a part of the data to be transformed which is different from the first partial data, the second partial data, and the third partial data as fourth partial data,
  transform the fourth partial data by performing a lookup of the transformation table based on a value of the fourth partial data to obtain a corresponding value of the fourth partial data, and performing an operation on the corresponding value of the fourth partial data, which is different from the operation performed on the corresponding value of the second partial data, to obtain a transformed value of the fourth partial data, and
  output the transformed value of the fourth partial data.

3. A data transformation apparatus comprising:
a data processing unit configured to receive key data and input data, and perform at least one of encryption of and decryption of the input data using the key data;
a key generating unit configured to generate the key data to be used by the data processing unit, and supply the key data to the data processing unit; and
a non-linear function unit configured to receive at least part of the input data as data to be transformed, the non-linear function unit including:
  a key function unit configured to perform a logical operation of the data to be transformed, or data which is derived from the data to be transformed, and the key data;
  an S function unit configured to convert the data to be transformed, or data which is derived from the data to be transformed, into other data; and
  a P function unit configured to perform a logical operation among pieces of the data to be transformed, or data which is derived from the data to be transformed,
wherein the key function unit is placed within the non-linear function unit at one of the following: before the S function unit and the P function unit, after the S function unit and the P function unit, and between the S function unit and the P function unit,
wherein the P function unit receives eight pieces of 4n-bit data $z_1, z_2, \ldots z_8$ as the data to be transformed or data which is derived from the data to be transformed, n being an integer greater than 1, and the P function unit includes:
  a circuit which calculates the XOR of at least two of the four pieces of data $z_1, z_3, z_4$ to obtain a 4n-bit operation result $U_1$;
  a circuit which calculates the XOR of at least two of the four pieces of data $z_5, z_6, z_7, z_8$ to obtain a 4n-bit operation result $U_2$;
  a circuit which calculates the XOR of $U_1$ and $U_2$ to obtain the 4n-bit operation result $U_3$;
  a rotational circuit which performs a rotational shift on $U_1$; and
  a circuit which calculates the XOR of an output of the rotational circuit and $U_3$ to obtain a 4n-bit operation result $U_4$, and
wherein the data transformation apparatus divides $U_3$ and $U_4$ into four pieces of data, respectively, to output eight pieces of n-bit data $z'_1, z'_2, \ldots z'_8$.

4. A data transformation apparatus comprising:
a data processing unit configured to receive key data and input data, and performing at least one of encryption and decryption of the input data using the key data;
a key generating unit for generating key data to be used by the data processing unit and supplying the key data to the data processing unit;
a non-linear function unit configured to receive at least part of the input data as data to be transformed, and perform a non-linear transformation of the data to be transformed, the non-linear transformation unit including the following units connected in series:
  a key function unit configured to perform a logical operation of data input thereto based on the key data;
  an S function unit configured to convert data input thereto; and
  a P function unit configured to perform a logical operation among pieces of data input thereto, and
wherein the key function unit is placed one of before the S function unit and the P function unit and after the S function unit and the P function unit in the non-linear function unit,
wherein, depending on the placement of the key function unit, the logical operation performed by either the key function unit or the P function unit produces transformed data which is output by the non-linear transformation unit, and
wherein the non-linear function unit is implemented using at least one of a computer processor and a logical operation circuit.

5. The data transformation unit of claim 4, wherein the S function unit includes:
  a first transformation unit configured to:
    receive a part of data to be transformed as first partial data,
    transform the first partial data by performing a lookup of a transformation table based on a value of the first partial data to obtain a transformed value of the first partial data, and
    output the transformed value of the first partial data; and
  a second transformation unit configured to:
    receive at least another part of the data to be transformed as second partial data, transform the second partial data by performing a lookup of the transformation table based on a value of the second partial data to obtain a corresponding value of the second partial data, and performing an operation on the corresponding value of the second partial data to obtain a transformed value of the second partial data, and output the transformed value of the second partial data.

6. A data transformation apparatus having a data processing unit configured to receive key data and input data, and perform at least one of encryption and decryption of the input data using the key data, the data transformation apparatus comprising:

a non-linear function unit including a P function unit which performs a logical operation among pieces of data to be transformed, wherein the P function unit inputs eight pieces of 4n-bit data (n being an integer greater than 1) $z_1, z_2, \ldots, z_8$ and includes:

a circuit which performs an XOR operation of at least two of the four pieces of data $z_1, z_2, z_3, z_4$ to obtain 4n-bit operation result $U_1$;

a circuit which performs an XOR operation of at least two of the four pieces of data $z_5, z_6, z_7, z_8$ to obtain 4n-bit operation result $U_2$;

a circuit which performs an XOR operation of $U_1$ and $U_2$ to obtain 4n-bit operation result $U_3$;

a rotational circuit which performs a rotational shift on $U_1$; and a circuit which performs an XOR operation of output from the rotational circuit and $U_3$ to obtain 4n-bit operation result $U_4$, and wherein the data transformation apparatus divides $U_3$ and $U_4$ into four pieces of data, respectively, and outputs eight pieces of n-bit data $z'_1, z'_2, \ldots, z'_8$.

7. A data transformation method comprising:

executing a data processing process which receives key data and input data, and performs at least one of encryption and decryption of the input data using the key data, wherein the data processing process comprises a non-linear transformation process for which receives at least part of the input data as data to be transformed, and performs a non-linear transformation of the data to be transformed, wherein the non-linear transformation process includes:

a first transformation process which includes:

receiving a part of the data to be transformed as first partial data, transforming the first partial data by performing a lookup of a transformation table based on a value of the first partial data to obtain a transformed value of the first partial data, and outputting the transformed value of the first partial data;

a second transformation process which includes:

receiving at least another part of the data to be transformed as second partial data, transforming the second partial data by performing a lookup of the transformation table based on a value of the second partial data to obtain a corresponding value of the second partial data, and performing an operation on the corresponding value of the second partial data to obtain a transformed value of the second partial data, and outputting the transformed value of the second partial data; and a third transformation process which includes:

receiving a part of the data to be transformed, which is different from the first and second partial data, as third partial data, transforming the third partial data by performing an operation on a value of the third partial data to obtain a corresponding value of the third partial data, and performing a lookup of the transformation table based on the corresponding value of the third partial data, to obtain a transformed value of the third partial data.

8. A data transformation method comprising:

executing a key generating process which generates key data;

executing a data processing process which receives input data and the key data, and performs at least one of encryption and decryption of the input data using the key data;

executing a non-linear function process including:

a key function process which performs a logical operation of data to be transformed, or data which is derived from the data to be transformed, and the key data;

an S function process which converts the data to be transformed, or data which is derived from the data to be transformed, into other data; and a P function process which performs a logical operation among pieces of data to be transformed, or data which is derived from the data to be transformed, wherein the key function process is placed executed within the non-linear process at one of the following: before the S function process and the P function process, after the S function process and the P function process, and between the S function process and the P function process in the non-linear function process, wherein the P function process receives eight pieces of 4n-bit data $z_1, z_2, \ldots z_8$ as the data to be transformed or data which is derived from the data to be transformed, n being an integer greater than 1, and the P function process includes:

calculating the XOR of at least two of the four pieces of data $z_1, z_2, z_3, z_4$ to obtain a 4n-bit operation result $U_1$;

calculating the XOR of at least two of the four pieces of data $z_5, z_6, z_7, z_8$ to obtain a 4n-bit operation result $U_2$;

calculating the XOR of $U_1$ and $U_2$ to obtain the 4n-bit operation result $U_3$;

performing a rotational shift on $U_1$; and calculating the XOR of an output of the rotational circuit and $U_3$ to obtain a 4n-bit operation result $U_4$, and wherein the data transformation process divides $U_3$ and $U_4$ into four pieces of data, respectively, to output eight pieces of n-bit data $z'_1, z'_2, \ldots z'_8$.

9. A data transformation method comprising:

executing a key generating process which generates key data;

executing a data processing process which receives input data and the key data, and performs at least one of encryption and decryption of the input data using the key data; and executing a non-linear function process which receives at least part of the input data as data to be transformed, and performs a non-linear transformation of the data to be transformed, the non-linear function process including the following processes:

a key function process which performs a logical operation of data based on the key data;

an S function process which converts data; and a P function process which performs a logical operation among pieces of data, wherein the non-linear function process is executed according to one of the following sequences:

the key function process is executed before the S function process and the P function process the key function process being applied to the data to be transformed, the S function process and P function process being sequentially applied to data obtained as a result of the key function process, the P function process producing transformed data which is output by the non-linear function process, and the key function process is executed after the S function process and the P function process, the S function process and the P function process being sequentially applied to the data to be transformed, the key function process being applied to data obtained as a result of the S function and P function processes, the key function process producing transformed data which is output by the non-linear function process.

10. A data transformation apparatus comprising:

a key generating unit configured to output key data based on input key data; and a data processing unit configured to receive input data, and perform at least one of encryption and decryption of the input data based on the output key data using a key function process, wherein the data processing unit divides at least part of the input data into first and second data, wherein the data processing unit comprises:

a non-linear function unit configured to perform a non-linear transformation on the first data to produce first transformed data during a first round of transformation by the data processing unit;

a first XOR circuit configured to perform an XOR operation on the second data and the output key data to produce second transformed data during the first round of transformation by the data processing unit; and a second XOR circuit configured to perform an XOR operation on the first transformed data and the second transformed data during the first round of transformation by the data processing unit, wherein the key generating unit is further configured to process the output key data in order to generate modified key data, and supply the modified key data to the non-linear function unit, wherein during a second round of data transformation by the data processing unit, the first XOR circuit is configured to perform an XOR operation on the first data and the modified key data such that, during the first and second rounds of data transformation by the data processing unit, the key function process of the data processing unit is performed outside of the non-linear function unit, and wherein the data processing unit is implemented using at least one of a computer processor and a logical operation circuit.

11. A data transformation method comprising:

executing a key generating process which outputs key data, the second key data being generated by processing the first key data; and executing a data processing process which receives input data, and performs at least one of encryption and decryption of the input data based on the output key data using a key function process, wherein the data processing process divides at least part of the input data into first and second data, wherein the data processing process comprises:

a non-linear function process which performs a non-linear transformation on the first data to produce first transformed data during a first round of transformation by the data processing process;

a first XOR process which performs an XOR operation on the second data and the output key data to produce second transformed data during the first round of transformation by the data processing process; and a second XOR process which performs an XOR operation on the first transformed data and the second transformed data during the first round of transformation by the data processing process, and wherein the key generating process processes the output key data in order to generate modified key data, and supply the modified key data to the non-linear function process, and wherein during a second round of data transformation by the data transformation process, the first XOR process performs an XOR operation on the first data and the modified key data such that, during the first and second rounds of data transformation by the data processing process, the key function process of the data processing process is performed outside of the non-linear function process.

12. A program embodied on a non-transitory computer-readable storage medium, the program comprising instructions which, when executed, causes a computer to perform the data transformation method of claim 7.

13. A program embodied on a non-transitory computer-readable storage medium, the program comprising instructions which, when executed, causes a computer to perform the data transformation method of claim 8.

14. A program embodied on a non-transitory computer-readable storage medium, the program comprising instructions which, when executed, causes a computer to perform the data transformation method of claim 9.

15. A program embodied on a non-transitory computer-readable storage medium, the program comprising instructions which, when executed, causes a computer to perform the data transformation method of claim 11.

* * * * *